(12) United States Patent
Sugimoto

(10) Patent No.: US 9,131,138 B2
(45) Date of Patent: Sep. 8, 2015

(54) PHOTOGRAPHING APPARATUS

(75) Inventor: Masahiko Sugimoto, Tokyo (JP)

(73) Assignee: FUJIFILM Corporation, Tokyo (JP)

( * ) Notice: Subject to any disclaimer, the term of this patent is extended or adjusted under 35 U.S.C. 154(b) by 463 days.

(21) Appl. No.: 13/153,192

(22) Filed: Jun. 3, 2011

(65) Prior Publication Data
US 2011/0254951 A1 Oct. 20, 2011

Related U.S. Application Data

(62) Division of application No. 12/138,232, filed on Jun. 12, 2008, now abandoned.

(30) Foreign Application Priority Data

Jun. 14, 2007 (JP) ................................. 2007-157532
Jun. 14, 2007 (JP) ................................. 2007-157533
Jun. 14, 2007 (JP) ................................. 2007-157534

(51) Int. Cl.
*H04N 5/228* (2006.01)
*H04N 5/222* (2006.01)
*H04N 5/232* (2006.01)
*H04N 1/00* (2006.01)
*H04N 101/00* (2006.01)

(52) U.S. Cl.
CPC ........... *H04N 5/232* (2013.01); *H04N 5/23219* (2013.01); *H04N 1/00328* (2013.01); *H04N 2101/00* (2013.01)

(58) Field of Classification Search
CPC .............. H04N 5/23219; H04N 5/232; H04N 1/00328; H04N 2101/00; H04N 5/23212; H04N 5/23296; H04N 5/23241; H04N 5/23245

USPC ................... 348/211.4, 211.6–211.8, 211.13, 348/333.02
See application file for complete search history.

(56) References Cited

U.S. PATENT DOCUMENTS

| | | | |
|---|---|---|---|
| 7,978,248 B2 * | 7/2011 | Terashima | 348/333.05 |
| 8,077,216 B2 * | 12/2011 | Ishihara | 348/222.1 |
| 8,144,207 B2 * | 3/2012 | Abe | 348/222.1 |
| 8,199,203 B2 * | 6/2012 | Sugimoto | 348/208.14 |
| 2001/0053292 A1 | 12/2001 | Nakamura | |
| 2003/0071908 A1 | 4/2003 | Sannoh et al. | |
| 2004/0233296 A1 | 11/2004 | Sugimoto | |

(Continued)

FOREIGN PATENT DOCUMENTS

| | | |
|---|---|---|
| JP | 2001-051338 A | 2/2001 |
| JP | 2001-257933 A | 9/2001 |

(Continued)

OTHER PUBLICATIONS

Chinese Office Action for Chinese Application No. 200810130236.1 dated May 18, 2011 with English translation.

(Continued)

*Primary Examiner* — Twyler Haskins
*Assistant Examiner* — Carramah J Quiett
(74) *Attorney, Agent, or Firm* — Birch, Stewart, Kolasch & Birch, LLP

(57) ABSTRACT

A photographing apparatus including an imaging unit to photograph a subject to acquire image data; an object detection unit to detect a predetermined object from the image data; and a detection condition setting unit to allow a detection condition for the object detection unit to be set according to a photographing mode.

22 Claims, 64 Drawing Sheets

(56) References Cited

U.S. PATENT DOCUMENTS

| | | | |
|---|---|---|---|
| 2005/0174448 A1 | 8/2005 | Kuboi | |
| 2006/0182433 A1 | 8/2006 | Kawahara et al. | |
| 2006/0192784 A1* | 8/2006 | Yamaji et al. | 345/473 |
| 2006/0227385 A1 | 10/2006 | Kawada | |
| 2007/0024723 A1 | 2/2007 | Ichimasa et al. | |
| 2007/0110321 A1 | 5/2007 | Okada et al. | |
| 2007/0122010 A1 | 5/2007 | Kitamura et al. | |
| 2007/0183638 A1 | 8/2007 | Nakamura | |
| 2007/0291999 A1 | 12/2007 | Ito et al. | |
| 2007/0292001 A1 | 12/2007 | Baba et al. | |
| 2008/0211938 A1 | 9/2008 | Kuboi | |
| 2008/0284867 A1* | 11/2008 | Ishihara | 348/222.1 |
| 2009/0002509 A1 | 1/2009 | Sugimoto | |
| 2009/0073285 A1* | 3/2009 | Terashima | 348/231.99 |

FOREIGN PATENT DOCUMENTS

| | | |
|---|---|---|
| JP | 2001-357404 A | 12/2001 |
| JP | 2002-288670 A | 10/2002 |
| JP | 2003-163827 A | 6/2003 |
| JP | 2004-336265 A | 11/2004 |
| JP | 2004-349750 A | 12/2004 |
| JP | 2005-223858 A | 8/2005 |
| JP | 2005-297411 A | 10/2005 |
| JP | 2006-133941 A | 5/2006 |
| JP | 2006-148557 A | 6/2006 |
| JP | 2006-208558 A | 8/2006 |
| JP | 2006-211139 A | 8/2006 |
| JP | 2006-229367 A | 8/2006 |
| JP | 2006-261914 A | 9/2006 |
| JP | 2006-295646 A | 10/2006 |
| JP | 2007-36603 A | 2/2007 |
| JP | 2007-68149 A | 3/2007 |
| JP | 2007-128127 A | 5/2007 |
| WO | WO 2006/087789 A1 | 8/2006 |
| WO | WO 2006/090449 A1 | 8/2006 |

OTHER PUBLICATIONS

Extended European Search Report for European Application No. 08252030.5 dated Jan. 19, 2012.

Japanese Office Action for Japanese Application No. 2007-157532 dated Apr. 26, 2011 with partial English translation.

Japanese Office Action for Japanese Application No. 2007-157532 dated Jul. 19, 2011 with partial English translation.

Japanese Office Action for Japanese Application No. 2007-157533 dated Jan. 24, 2012 with partial English translation.

Japanese Office Action for Japanese Application No. 2007-157533 dated May 17, 2011 with partial English translation.

Japanese Office Action for Japanese Application No. 2007-157534 dated Jan. 24, 2012 with partial English translation.

Japanese Office Action for Japanese Application No. 2007-157534 dated May 17, 2011 with partial English translation.

Partial European Search Report for European Application No. 08252030.5 dated Sep. 13, 2011.

Japanese Patent Office Action dated May 28, 2013 for Japanese Application No. 2012-098854, with partial English language translation.

Chinese Office Action, dated Nov. 20, 2013, for Chinese Application No. 201110423201.9 with an English translation.

Chinese Office Action issued on Dec. 3, 2013 in corresponding Application No. 201110423199.5.

Chinese Search Report issued in corresponding Application No. 201110423199.5.

Taiwan Office Action issued in Taiwan Application No. 97122033 on Oct. 29, 2014, and a partial English translation.

Korean Office Action issued in Korean Patent Application No. 2008-56021 on Sep. 11, 2014.

Chinese Office Action issued in Chinese Application No. 201110423199.5 on Jul. 24, 2014.

* cited by examiner

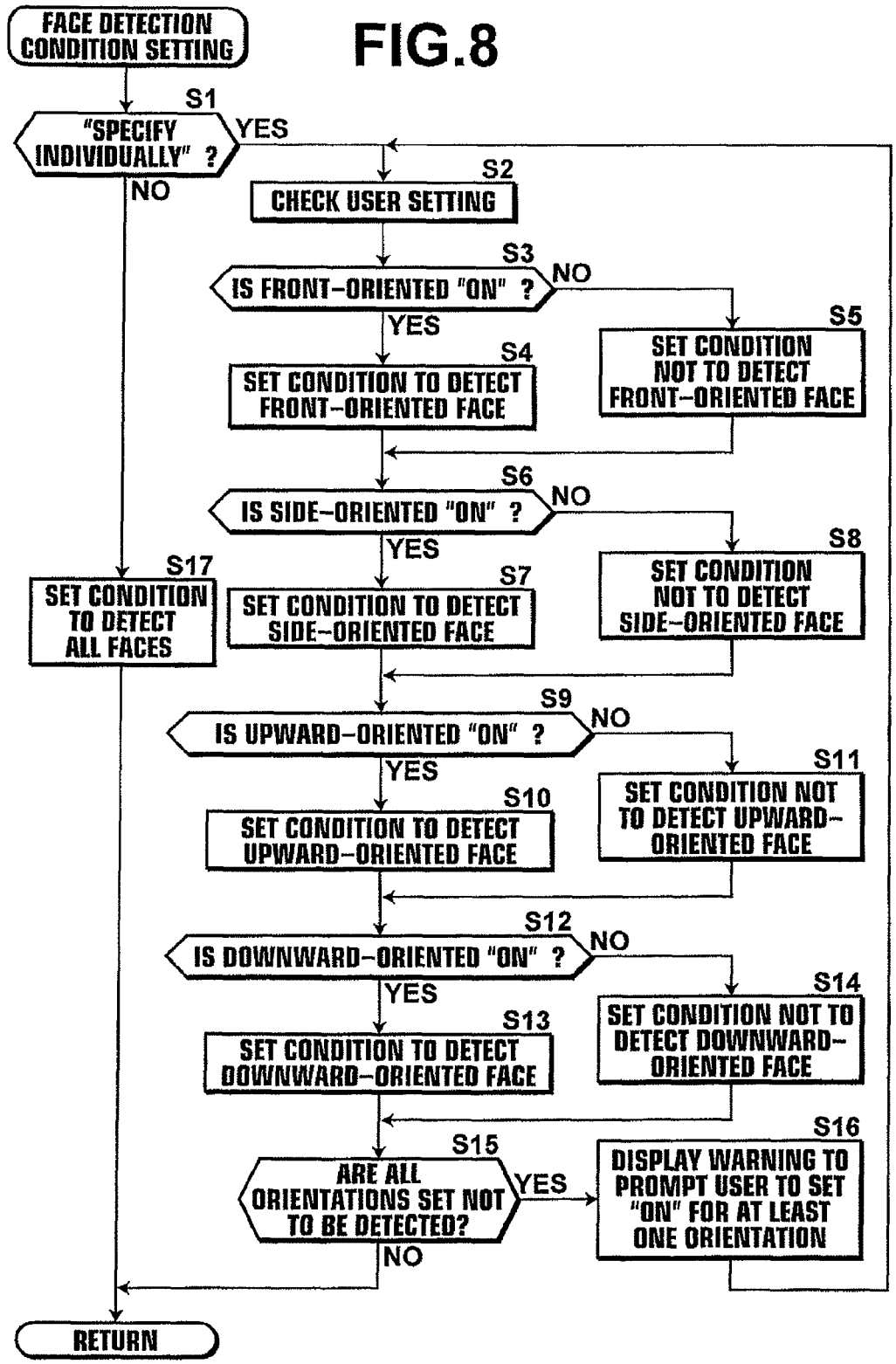

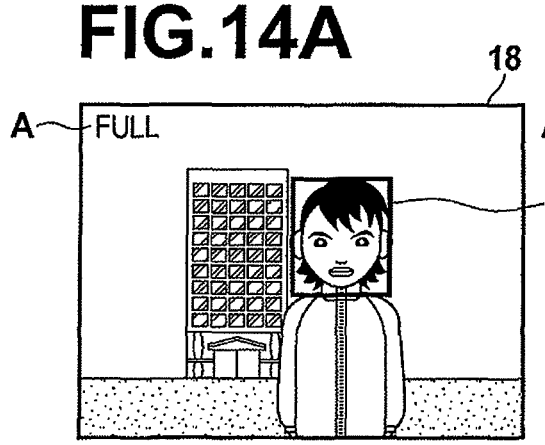
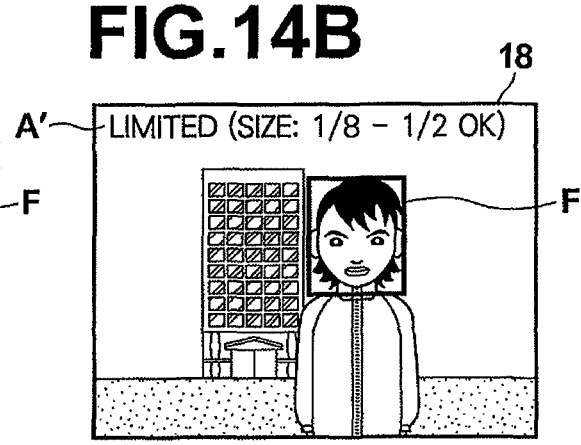

FIG.17

| | FACE DETECTION SETTING | 120 |
|---|---|---|
| 121 | FACE DETECTION ON/OFF | ON |
| 122 | ORIENTATION | FRONT-ORIENTED |
| 123 | INCLINATION | ALL DIRECTIONS |
| 124 | SIZE | 1/8 – 1/2 |
| 125 | AREA | CENTER 50% (INSIDE) |

RESULT OF FACE DETECTION UNDER SETTING DURING PHOTOGRAPHING OPERATION

RESULT OF FACE DETECTION AFTER IMAGE HAS BEEN RECORDED

FIG.22

| FACE DETECTION | | | |
|---|---|---|---|
| DURING PHOTOGRAPHING | SETTING | FACE DETECTION ON/OFF | ON |
| | | ORIENTATION | FRONT-ORIENTED |
| | | INCLINATION | ALL DIRECTIONS |
| | | SIZE | 1/8 – 1/2 |
| | | AREA | CENTER 50% (INSIDE) |
| | | NUMBER OF DETECTED FACES | 1 |
| | RESULT | POSITION | ... |
| | | SIZE | ... |
| AFTER RECORDING | SETTING | NO LIMITATION ON FACE TO BE DETECTED | |
| | RESULT | NUMBER OF DETECTED FACES | 2 |
| | | POSITION | ... |
| | | SIZE | ... |

FIG.43

| FACE DETECTION SETTING | 220 |
|---|---|
| FACE DETECTION ON/OFF | ON |
| ORIENTATION | FRONT-ORIENTED |
| INCLINATION | ALL DIRECTIONS |
| SIZE | 1/8 – 1/2 |
| AREA | CENTER 50% (INSIDE) |

221 — FACE DETECTION ON/OFF
222 — ORIENTATION
223 — INCLINATION
224 — SIZE
225 — AREA

RESULT OF FACE DETECTION UNDER SETTING DURING PHOTOGRAPHING OPERATION

RESULT OF FACE DETECTION AFTER IMAGE HAS BEEN RECORDED

FIG.48

| FACE DETECTION | DURING PHOTOGRAPHING | SETTING | FACE DETECTION ON/OFF | ON | |
|---|---|---|---|---|---|
| | | | ORIENTATION | FRONT-ORIENTED | |
| | | | INCLINATION | ALL DIRECTIONS | |
| | | | SIZE | 1/8 – 1/2 | |
| | | | AREA | CENTER 50% (INSIDE) | |
| | | RESULT | NUMBER OF DETECTED FACES | 1 | |
| | | | POSITION | ... | |
| | | | SIZE | ... | |
| | AFTER RECORDING | SETTING | NO LIMITATION ON FACE TO BE DETECTED | | |
| | | RESULT | NUMBER OF DETECTED FACES | 2 | |
| | | | POSITION | ... | |
| | | | SIZE | ... | |

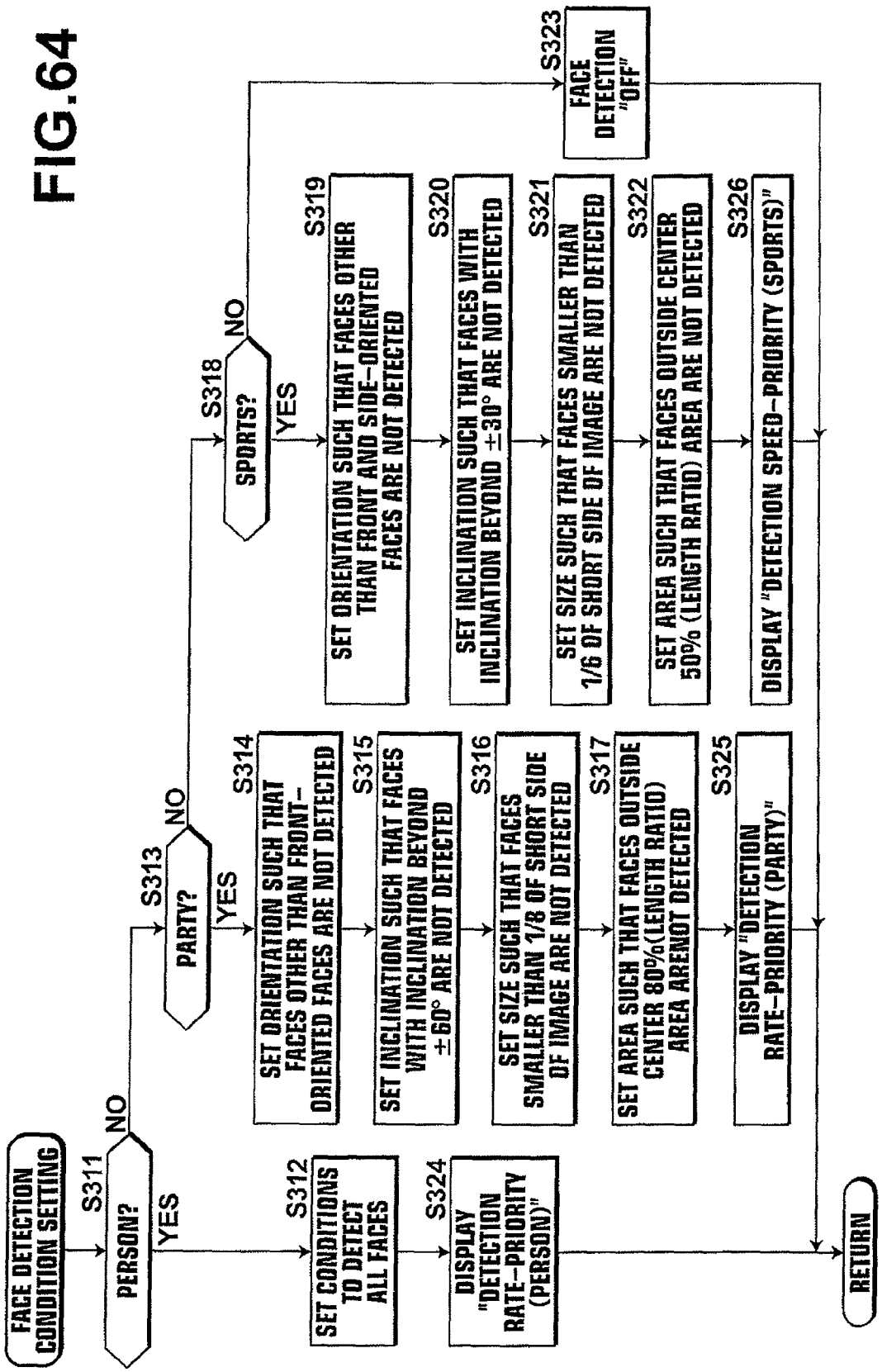

FIG.66

| | FACE DETECTION SETTING | 320 |
|---|---|---|
| 321 | FACE DETECTION ON/OFF | ON |
| 322 | ORIENTATION | FRONT-ORIENTED |
| 323 | INCLINATION | ALL DIRECTIONS |
| 324 | SIZE | 1/8 – 1/2 |
| 325 | AREA | CENTER 50% (INSIDE) |

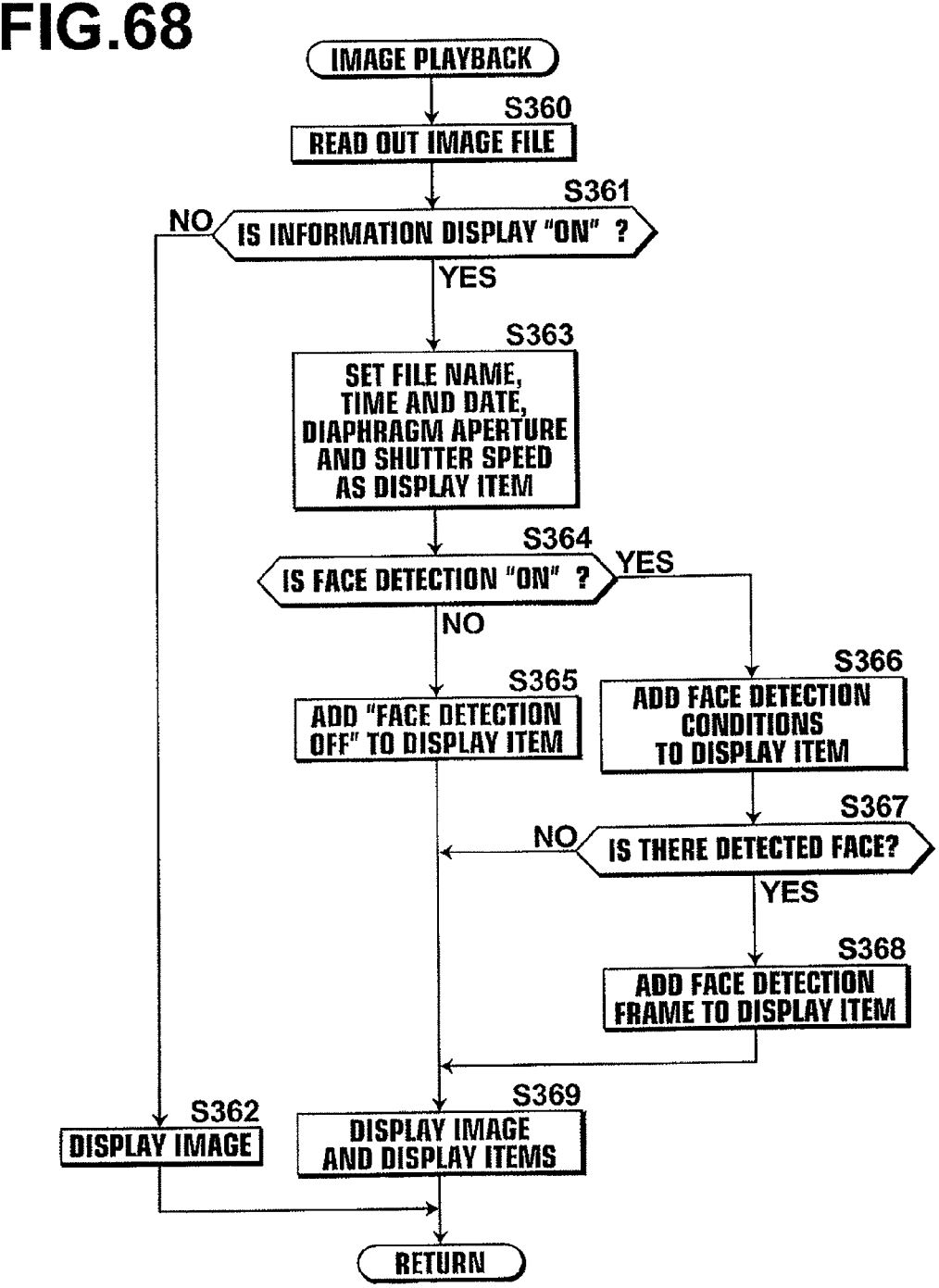

RESULT OF FACE DETECTION UNDER SETTING DURING PHOTOGRAPHING OPERATION

RESULT OF FACE DETECTION AFTER IMAGE HAS BEEN RECORDED

PHOTOGRAPHING APPARATUS

CROSS REFERENCE OF RELATED APPLICATIONS

This application is a Divisional of co-pending application Ser. No. 12/138,232, filed on Jun. 12, 2008 now abandoned, which claims the benefit of foreign priority from Application Nos. 2007/157532, 2007/157533 and 2007/157534, all filed in Japan on Jun. 14, 2007. The entire contents of each of the above applications are hereby incorporated by reference. The entire disclosure of parent application Ser. No. 12/138,232 is germane to the invention as claimed in the present divisional application.

BACKGROUND OF THE INVENTION

1. Field of the Invention

The present invention relates to a photographing apparatus such as a digital camera, and in particular to a photographing apparatus provided with an object detection function.

2. Description of the Related Art

Among photographing apparatuses such as digital cameras and digital video cameras in recent years, those provided with an object detection function to detect an object, such as a face, from a photographed image have been proposed. For example, a photographing method for use with such photographing apparatuses, in which exposure and focusing operations for photographing a subject are automatically controlled based on a result of object detection achieved by the object detection function, and a photographing apparatus that determines the orientation of a face detected by the face detection function, and records the subject according to the result of the determination to reliably photograph a front-oriented face (Japanese Unexamined Patent Publication No. 2001-051338) have been proposed.

Further, an authentication apparatus that automatically detects the orientation of a face contained in photographed images, and selects one of the images containing a front-oriented face to compare the front-oriented face with each of front-oriented faces contained in images for checking, thereby authenticating a certain individual (Japanese Unexamined Patent Publication No. 2002-288670).

Further, the face detection function may have a problem such that face detection cannot reliably be carried out depending on a photographing environment during face detection, resulting in poor detection accuracy. To address this problem, a photographing apparatus disclosed in Japanese Unexamined Patent Publication No. 2006-229367 carries out the face detection only while a photographing mode which is assumed to be used for photographing a scene containing a person is set.

When the face detection function is used with a detection range that is widened to detect faces in various different conditions, such as faces with various orientations and/or sizes, the faces in various different conditions can be detected; however, a rate of erroneous detection may be increased. In addition, the face detection with the widened detection range takes a longer time, and this may result in poor followability. The "detection range" used herein means not only a spatial detection range (positions), but also variation of the conditions of objects to be detected (size, orientation, inclination, and the like).

When a photographing operation is carried out using the face detection function, demands of the user may vary depending on the scene to be photographed, such that putting a priority on the speed of the face detection or on the rate of the face detection. In this case, it is difficult for the above described conventional face detection function to set or change the face detection conditions.

SUMMARY OF THE INVENTION

In view of the above-described circumstances, the present invention is directed to providing a photographing apparatus that is able to carry out the object detection at a balance desired by the user between the detection rate and the detection speed.

One aspect of the photographing apparatus of the invention includes: an imaging unit to photograph a subject to acquire image data; an object detection unit to detect a predetermined object from the image data; and a detection condition setting unit to allow a user to arbitrarily set a detection condition for the object detection unit.

It should be noted that the term "set" as used herein also includes the meaning of "change".

Another aspect of the photographing apparatus of the invention includes: an imaging unit to photograph a subject to acquire image data; an object detection unit to detect a predetermined object from the image data; and a detection condition setting unit to allow a user to set a detection condition for the object detection unit by selecting one of detection rate-priority and detection speed-priority.

Yet another aspect of the photographing apparatus of the invention includes: an imaging unit to photograph a subject to acquire image data; an object detection unit to detect a predetermined object from the image data; and a detection condition setting unit to allow a user to set a detection condition for the object detection unit by selecting one of levels set in a stepwise fashion between detection rate-priority and detection speed-priority, the levels including maximum levels of the detection rate-priority and the detection speed-priority.

Still another aspect of the photographing apparatus of the invention includes: an imaging unit to photograph a subject to acquire image data; an object detection unit to detect a predetermined object from the image data; and a detection condition setting unit to allow a detection condition for the object detection unit to be set according to a photographing mode.

In the photographing apparatus of the invention, the detection condition may limit at least one of an orientation of the object, a size of the object, an inclination of the object and a detection area.

The photographing apparatus of the invention may further include a detection condition displaying unit to display the detection condition set via the detection condition setting unit.

In this case, the detection condition displaying unit may display a pictorial display of the detection condition.

The detection condition displaying unit may display the detection condition during a photographing operation carried out by the imaging unit.

The photographing apparatus of the invention may further include: a recording unit to record an image file generated from the image data in an external recording medium or an internal memory; and a tag information writing unit to write the detection condition in tag information of the image file when the image file is recorded.

In this case, the photographing apparatus may further include: a displaying unit; a display controlling unit to display, on the displaying unit, the image file recorded in the external recording medium or the internal memory; and a tag information display controlling unit to display, on the displaying unit, the detection condition written in the tag information of the image file when the image file is displayed on the displaying unit.

The detection condition setting unit may be able to reset the detection condition written in the tag information of the image file to a different detection condition, and the object detection unit may carry out the detection on image data of the image file recorded in the external recording medium or the internal memory based on the detection condition reset by the detection condition setting unit.

A detection range of the different detection condition may be wider or narrower than a detection range of the detection condition written in the tag information of the image file.

In the photographing apparatus of the invention, the detection condition setting unit may be able to acquire the detection condition written in the tag information of the image file and retain the acquired detection condition, and the object detection unit may carry out the detection based on the retained detection condition.

In this case, the detection based on the retained detection condition may be carried out on the image data acquired by the imaging unit or on image data of the image file recorded in the external recording medium or the internal memory.

The photographing apparatus of the invention may further include: a photographing instructing unit to instruct the imaging unit to carry out an actual photographing operation; and one of a self-timer photographing unit to cause the actual photographing operation to be carried out when a predetermined time has elapsed after the photographing instructing unit has instructed to carry out the actual photographing operation and an automatic photographing unit to cause the photographing instructing unit to instruct to carry out the actual photographing operation at a predetermined timing, wherein the object detection unit may carry out the detection under the detection condition set via the detection condition setting unit only when the actual photographing operation is carried out using the self-timer photographing unit or the automatic photographing unit.

In the photographing apparatus of the invention, the detection condition setting unit may set the detection condition by selecting, for each photographing mode, one of detection rate-priority, detection speed-priority and detection-off.

In the photographing apparatus of the invention, the detection condition setting unit may set the detection condition by selecting, for each photographing mode, one of levels set in a stepwise fashion between detection rate-priority and detection speed-priority, the levels including maximum levels of the detection rate-priority and the detection speed-priority.

A detection range of the detection condition corresponding to the detection speed-priority may be narrower than a detection range of the detection condition corresponding to the detection rate-priority.

In the photographing apparatus of the invention, the photographing mode may include at least one of an automatic mode, a person mode, a sports mode, a party mode, a landscape mode and a night-scene mode.

BRIEF DESCRIPTION OF THE DRAWINGS

FIG. 8 is a flow chart of a face detection setting process that is carried out when the orientation of the face to be detected is set as the detection condition, FIGS. 14A and 14B illustrate examples of a setting confirmation display that is displayed when the size of the face to be detected is set as the detection condition, FIG. 17 illustrates one example of tag information, FIG. 22 illustrates one example of added tag information, FIG. 43 illustrates one example of tag information, FIG. 48 illustrates one example of added tag information, FIG. 64 is a flow chart of a face detection condition setting process according to setting shown in FIGS. 63A-63C, FIG. 66 illustrates one example of tag information, FIG. 68 is a flow chart of an image playback process.

DESCRIPTION OF THE PREFERRED EMBODIMENTS

Hereinafter, embodiments of a photographing apparatus of the present invention will be described in detail with reference to the drawings. It should be noted that the following description of the embodiments is given in conjunction with a digital camera, which is an example of the photographing apparatus of the invention. However, the applicable scope of the invention is not limited to digital cameras, and the invention is also applicable to other electronic devices with an electronic photographing function, such as a mobile phone with camera and a PDA with camera.

Figure 1:
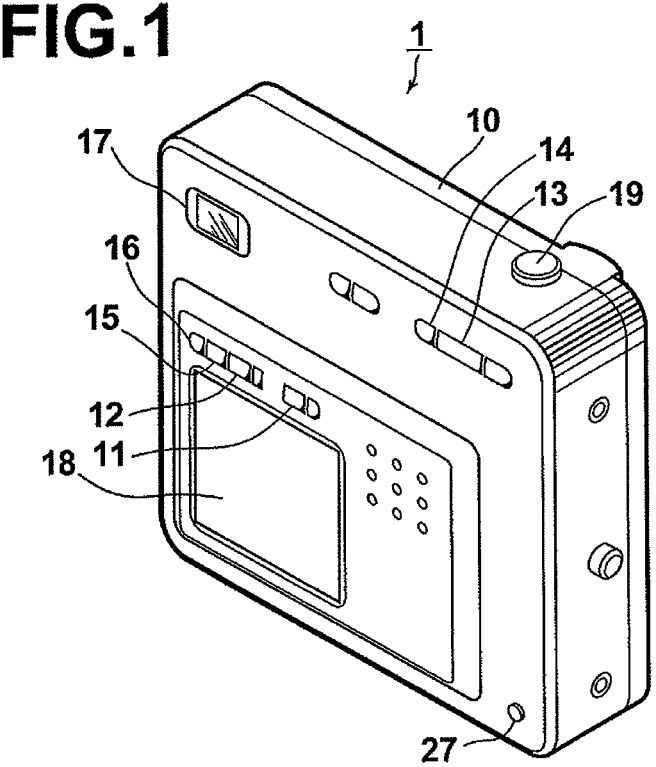
FIG. 1 is a perspective view illustrating a rear side of a digital camera.
Figure 2:
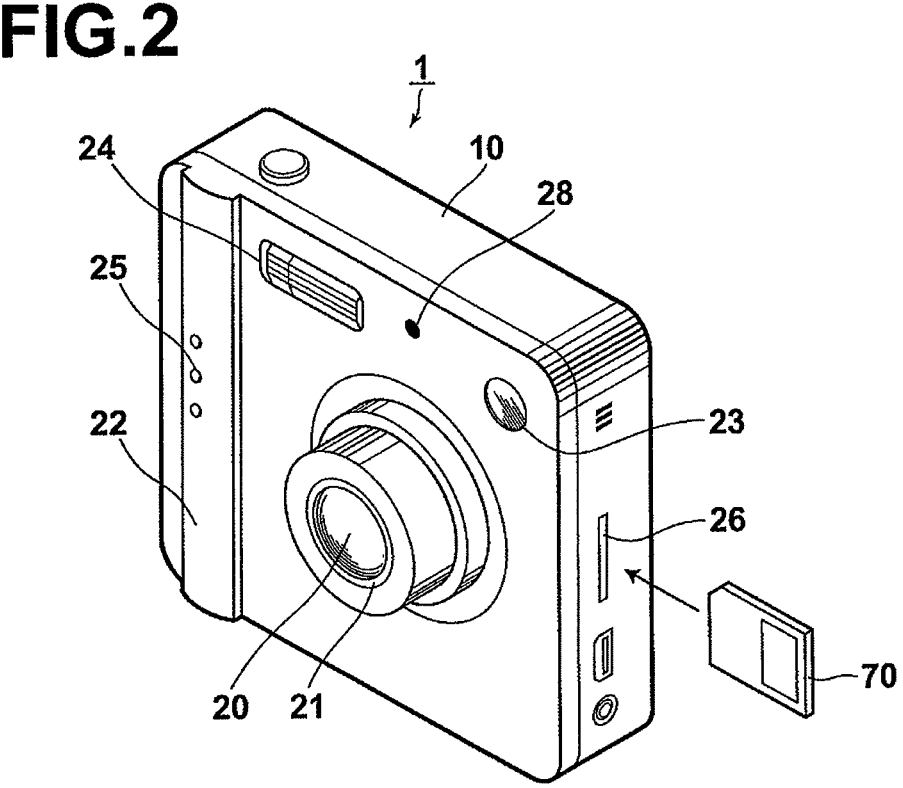
FIG. 2 is a perspective view illustrating a front side of the digital camera.

FIGS. 1 and 2 illustrate one example of the appearance of the digital camera 1 according to a first embodiment of a first aspect of the invention viewed from front and rear, respectively. As shown in FIG. 1, the digital camera 1 includes, on the back side of a body 10 thereof, an operation mode switch 11, a menu/OK button 12, a zoom/up-down lever 13, a right-left button 14, a Back (return) button 15 and a display switching button 16, which serve as an interface for manipulation by the user, as well as a finder 17 for photographing, a monitor 18 for photographing and playback, a release button (photographing instructing unit) 19, and a face detection button 27.

The operation mode switch 11 is a slide switch for switching between operation modes, i.e., a still image photographing mode, a moving image photographing mode and a playback mode. The menu/OK button 12 is a button to be pressed to display on the monitor 18 various menus in turn, such as a menu for setting a photographing mode, a flash mode, ON/OFF of the self-timer, the number of pixels to be recorded, sensitivity, or the like, or to be pressed to make decision on a selection or setting based on the menu displayed on the monitor 18.

The zoom/up-down lever 13 is to be tilted up or down to adjust the telephoto/wide-angle position during a photographing operation, or to move a cursor up or down within the menu screen displayed on the monitor 18 during various setting operations. The right-left button 14 is used to move the cursor rightward or leftward within the menu screen displayed on the monitor 18 during various setting operations.

The Back (return) button 15 is a button to be pressed to terminate a current setting operation and display a previous screen on the monitor 18. The display switching button 16 is a button to be pressed to switch between ON and OFF of the display on the monitor 18, ON and OFF of various guidance displays, ON and OFF of text display, or the like. The finder 17 is used by the user to see and adjust the picture composition and the point of focus for photographing a subject. An image of the subject viewed through the finder 17 is captured via a finder window 23, which is provided at the front side of the body 10 of the digital camera 1. The face detection button 27 is a button to switch between ON and OFF of the face detection by a face detection unit 65, which will be described later.

Contents of the setting made by the user through manipulation of the above-described buttons and/or the lever can be visually confirmed with the display on the monitor 18, with the lamp in the finder 17, with the position of the slide lever, or the like. The monitor 18 serves as an electronic view finder by displaying a live view for viewing the subject during a photographing operation. The monitor 18 also displays a playback view of a photographed still image or moving image, as well as various setting menus. As the user half-presses the release button 19, AE processing and AF processing, which will be described later, are carried out. As the user fully presses the release button 19, a photographing operation is carried out based on data outputted by the AE processing and the AF processing, and the image displayed on the monitor 18 is recorded as a photographed image.

As shown in FIG. 2, the digital camera 1 further includes, on the front side of the body 10 thereof, an imaging lens 20, a lens cover 21, a power switch 22, the finder window 23, a flash light 24, a self-timer lamp 25, and an AF assisting light 28. Further, a media slot 26 is provided on a lateral side of the body 10.

The imaging lens 20 focuses an image of the subject on a predetermined imaging surface (such as a CCD provided within the body 10). The imaging lens 20 is formed, for example, by a focusing lens and a zooming lens. The lens cover 21 covers the surface of the imaging lens 20 when the digital camera 1 is powered off or in the playback mode to protect the imaging lens 20 from dust and other contaminants.

The power switch 22 is used to power on or power off the digital camera 1. The flash light 24 is used to momentarily emit necessary light for a photographing operation toward the subject when the release button 19 is pressed and while the shutter within the body 10 is open. The self-timer lamp 25 serves to inform the subject a timing of opening and closing of the shutter, i.e., the start and the end of exposure, during a photographing operation using a self-timer.

The AF assisting light 28 is formed, for example, by LEDs and assists the AF processing, which will be described later, by illuminating the subject for a long time with light of a narrow range, i.e., narrow light. The media slot 26 is a port for an external recording medium 70, such as a memory card, to be loaded therein. As the external recording medium 70 is loaded in the media slot 26, writing and reading of data are carried out, as necessary.

Figure 3:
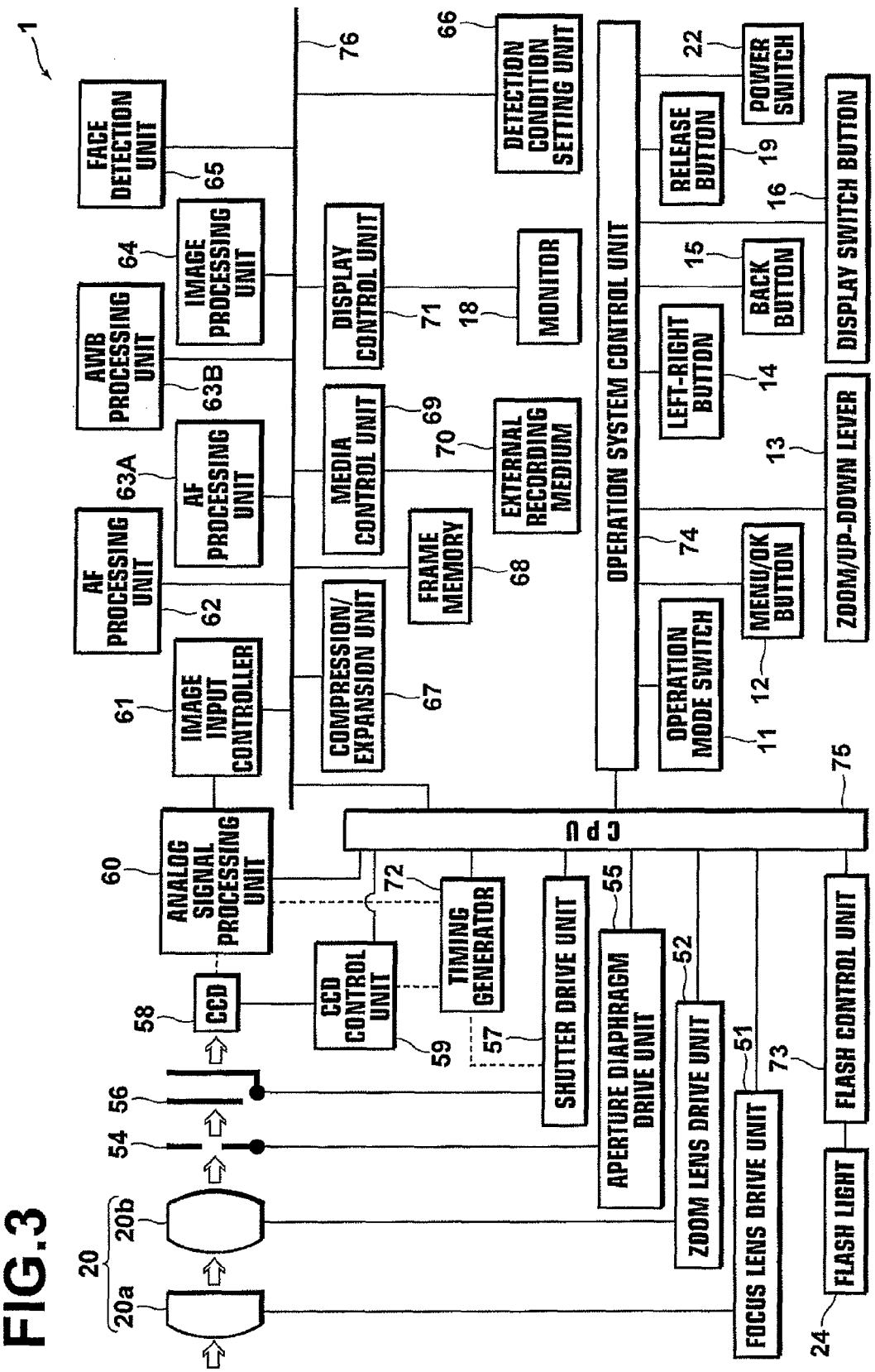
FIG. 3 is a functional block diagram of the digital camera according to a first embodiment of a first aspect of the invention.

FIG. 3 is a block diagram illustrating the functional configuration of the digital camera 1. As shown in FIG. 3, as a manipulation system of the digital camera 1, the operation mode switch 11, the menu/OK button 12, the zoom/up-down lever 13, the right-left button 14, the Back (return) button 15, the display switching button 16, the release button 19 and the power switch 22 described above, and a manipulation system controlling unit 74 serving as an interface between the CPU 75 and manipulation by the user through these switches, buttons and lever are provided.

Further, a focusing lens 20a and a zooming lens 20b, which form the imaging lens 20, are provided. These lenses are respectively driven stepwise along the optical axis by a focusing lens driving unit 51 and a zooming lens driving unit 52, each formed by a motor and a motor driver. The focusing lens driving unit 51 drives the focusing lens 20a stepwise based on focusing lens driving amount data outputted from an AF processing unit 62. The zooming lens driving unit 52 controls stepwise driving of the zooming lens 20b based on data representing a manipulation amount of the zoom/up-down lever 13.

An aperture diaphragm 54 is driven by an aperture diaphragm driving unit 55, which is formed by a motor and a motor driver. The aperture diaphragm driving unit 55 adjusts the aperture diameter of the aperture diaphragm 54 based on aperture value data outputted from an AE (automatic exposure) processing unit 63A.

The shutter 56 is a mechanical shutter, and is driven by a shutter driving unit 57, which is formed by a motor and a motor driver. The shutter driving unit 57 controls opening and closing of the shutter 56 according to a signal that is outputted when the release button 19 is pressed and shutter speed data that is outputted from the AE processing unit 63A.

A CCD (imaging unit) 58, which is an image pickup device, is disposed downstream the optical system. The CCD 58 includes a photoelectric surface formed by a large number of light receiving elements arranged in a matrix. An image of the subject passing through the optical system is focused on the photoelectric surface and is subjected to photoelectric conversion. A micro lens array (not shown) for converging the light at respective pixels and a color filter array (not shown) formed by regularly arrayed R, G and B color filters are disposed upstream the photoelectric surface. The CCD 58 reads electric charges accumulated at the respective pixels line by line and outputs them as an image signal synchronously with a vertical transfer clock signal and a horizontal transfer clock signal, which are supplied from a CCD controlling unit 59. A time for accumulating the charges at the pixels, i.e., an exposure time, is determined by an electronic shutter driving signal supplied from the CCD controlling unit 59.

The image signal outputted from the CCD 58 is inputted to an analog signal processing unit 60. The analog signal processing unit 60 includes a correlation double sampling circuit (CDS) for removing noise from the image signal, an automatic gain controller (AGC) for controlling a gain of the image signal, and an A/D converter (ADC) for converting the image signal into a digital signal data. The digital signal data is CCD-RAW data, which includes R, G and B density values of the respective pixels.

A timing generator 72 generates timing signals. The timing signals are inputted to the shutter driving unit 57, the CCD controlling unit 59 and the analog signal processing unit 60, thereby synchronizing the manipulation of the release button 19 with opening/closing of the shutter 56, transfer of the electric charges of the CCD 58 and processing by the analog signal processing unit 60. The flash controlling unit 73 controls emission of the flash light 24.

An image input controller 61 writes the CCD-RAW data, which is inputted from the analog signal processing unit 60, in a frame memory 68. The frame memory 68 provides a workspace for various digital image processing (signal processing) applied to the image data, which will be described later. The frame memory 68 is formed, for example, by a SDRAM (Synchronous Dynamic Random Access Memory) that transfers data synchronously with a bus clock signal of a constant frequency.

A display controlling unit 71 causes the image data stored in the frame memory 68 to be displayed on the monitor 18 as a live view. The display controlling unit 71 converts the image data into a composite signal by combining a luminance (Y) signal and chromatic (C) signals together and outputs the composite signal to the monitor 18. The live view is taken at predetermined time intervals and is displayed on the monitor 18 while a photographing mode is selected. The display controlling unit 71 also causes an image, which is based on the image data contained in the image file stored in the external recording medium 70 and read out by a media controlling unit 69, to be displayed on the monitor 18.

A face detection unit (object detection unit) 65 detects a person's face from the image data stored in the frame memory 68, i.e., the live view. Specifically, the face detection unit 65 detects, as a face region, a region having a characteristic feature of a face, such as, but not limited to, a region having a color of skin, a region containing an eye or eyes and/or a region having the shape of a face. When the face detection button 27 is set as ON, the face detection operation is continuously carried out on the live view.

It should be noted that, although the face detection in this embodiment is carried out to detect the face from the live view, the face may be detected from a preliminary image, or from image data recorded in the external recording medium 70, an internal memory (not shown), or the like. The preliminary image is an image based on image data, which is stored in the frame memory 68 when the CPU 75, upon detecting a half-press signal generated when the release button 19 is half-pressed, causes the CCD 58 to carry out a preliminary photographing operation. The face detection unit 65 of the invention may be formed by software or an IC that implements the function of the face detection unit 65.

A detection condition setting unit 66 allows the user to arbitrarily set detection conditions for the face detection unit 65. The detection condition setting unit 66 will be described in detail later. The AF processing unit 62 detects the focal position according to a result of face detection carried out on the image data by the face detection unit 65, and outputs the focusing lens driving amount data (AF processing). In this embodiment, a passive method is used for detecting the focused focal point. The passive method utilizes the fact that a focused image has a higher focus evaluation value (contrast value) than unfocused images.

The AE processing unit 63A measures the brightness of the subject according to the result of face detection carried out on the image data by the face detection unit 65, and then determines the aperture value, the shutter speed, and the like, based on the measured brightness of the subject, and outputs the determined aperture value data and shutter speed data.

An AWB processing unit 63B automatically adjusts the white balance of a photographed image.

An image processing unit 64 applies, to the image data of an actually photographed image, image quality correction processing, such as gamma correction, sharpness correction and contrast correction, and YC processing to convert the CCD-RAW data into YC data formed by Y data representing a luminance signal, Cb data representing a blue color-difference signal and Cr data representing a red color-difference signal. The actually photographed image is an image based on image data of an image signal which is outputted from the CCD 58 when the release button 19 is fully pressed and is stored in the frame memory 68 via the analog signal processing unit 60 and the image input controller 61.

The upper limit for the number of pixels forming the actually photographed image is determined by the number of pixels of the CCD 58. The number of pixels of an image to be recorded can be changed according to image quality setting made by the user, such as fine or normal. The number of pixels forming the live view or the preliminary image may be smaller than that of the actually photographed image and may be, for example, about 1/16 of the number of pixels forming the actually photographed image.

A compression/decompression processing unit 65 compresses the image data, which has been subjected to the image quality correction and the YC processing by the image processing unit 64, according to a certain compression format, such as JPEG, and generates an image file. Accompanying information is added to this image file based on corresponding one of various data formats. In the playback mode, the compression/decompression processing unit 65 reads out the compressed image file from the external recording medium 70, and decompresses the image file. The decompressed image data is outputted to the display controlling unit 71, and the display controlling unit 71 displays an image based on the image data on the monitor 18.

The media controlling unit 69 corresponds to the media slot 26 shown in FIG. 2. The media controlling unit 69 reads out an image file stored in the external recording medium 70 or writes an image file in the external recording medium 70.

The CPU 75 controls the individual parts of the body of the digital camera 1 according to manipulation of the various buttons, levers and switches by the user and signals supplied from the respective functional blocks. The data bus 76 is connected to the image input controller 61, the processing units 62 to 64 and 67, the face detection unit 65, the detection condition setting unit 66, the frame memory 68, the controlling units 69, 71 and the CPU 75, so that various signals and data are sent and received via the data bus 76.

It should be noted that, when an image file is recorded in the external recording medium 70, the media controlling unit 69 serves as the recording unit, and when an image file is recorded in the internal memory (not shown), the CPU 75 serves as the recording unit.

Figure 4A:
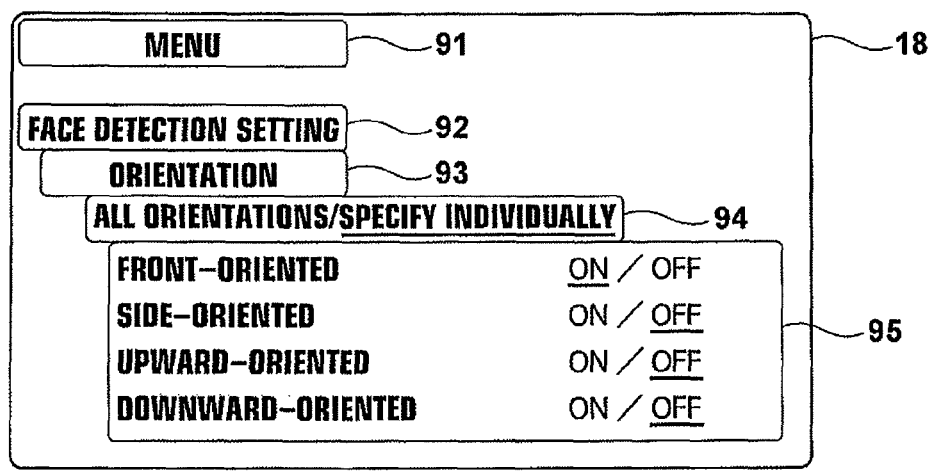
FIGS. 4A and 4B illustrate examples of a menu screen that is displayed when an orientation of a face to be detected is set as a detection condition.
Figure 4B:
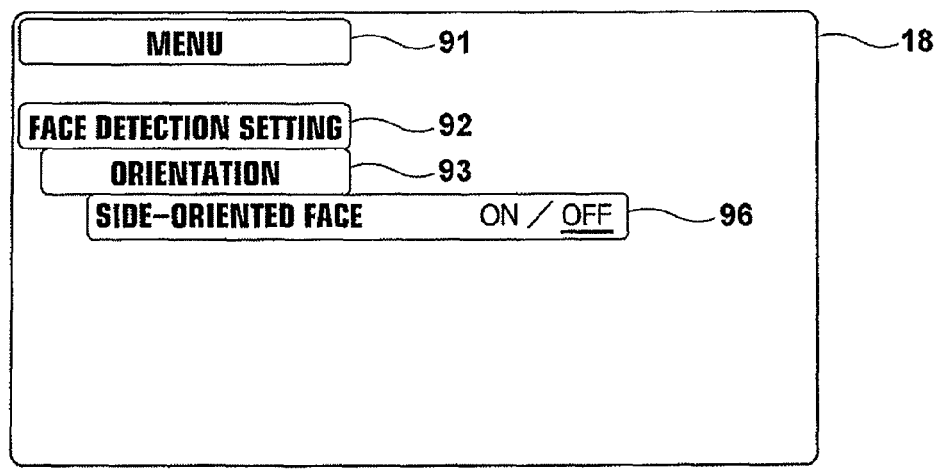
Figure 5A:
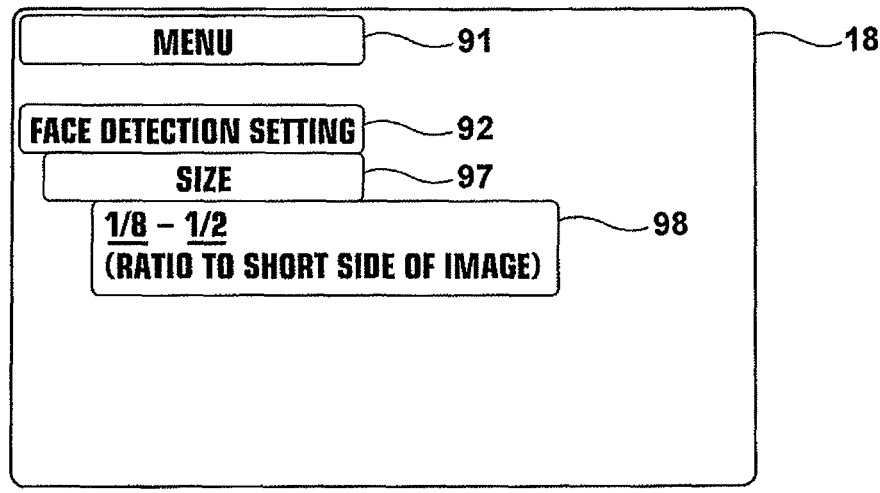
FIGS. 5A and 5B illustrate examples of a menu screen that is displayed when a size of the face to be detected is set as the detection condition.
Figure 5B:
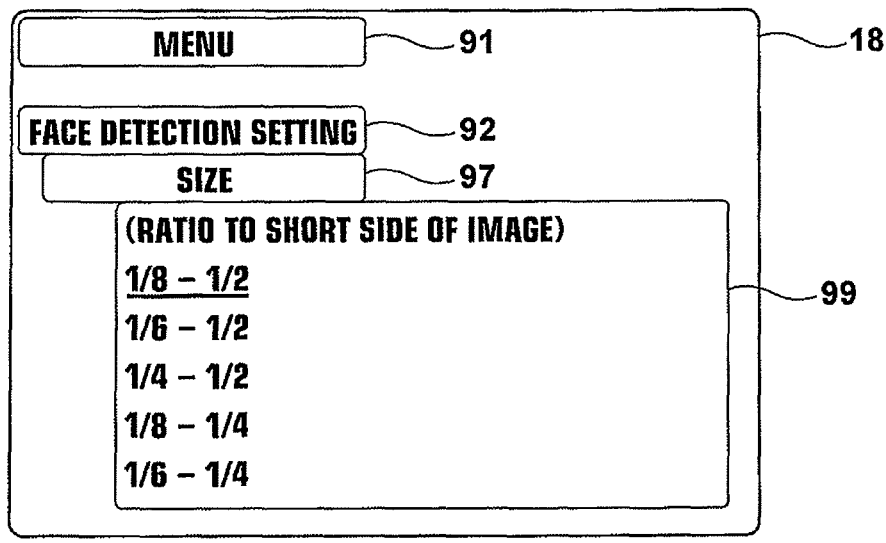
Figure 6A:
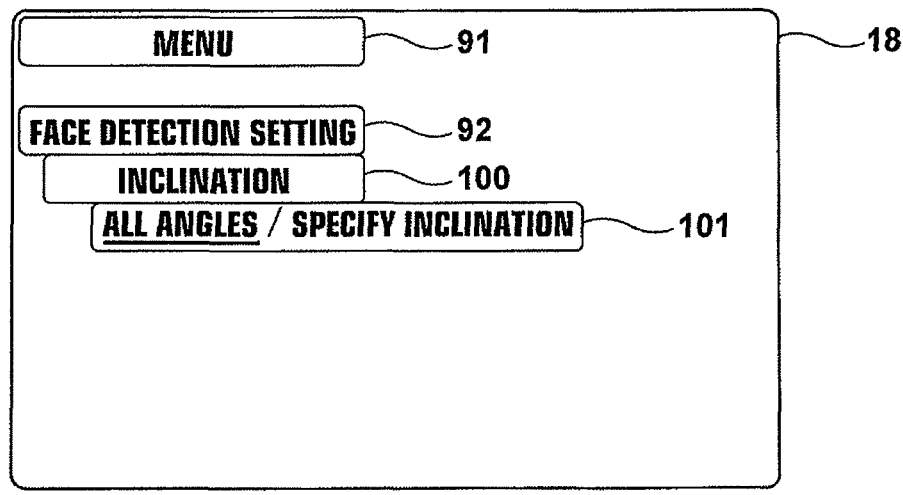
FIGS. 6A and 6B illustrate examples of a menu screen that is displayed when an inclination of the face to be detected is set as the detection condition.
Figure 6B:
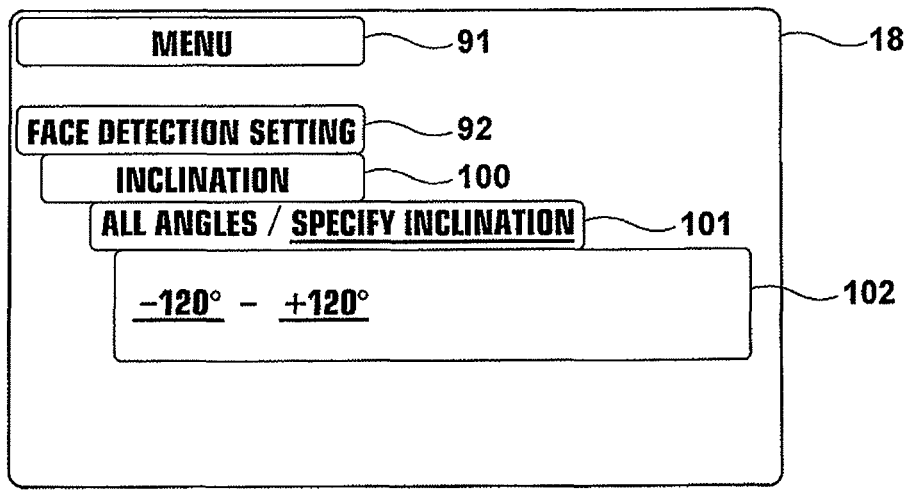
Figure 7A:
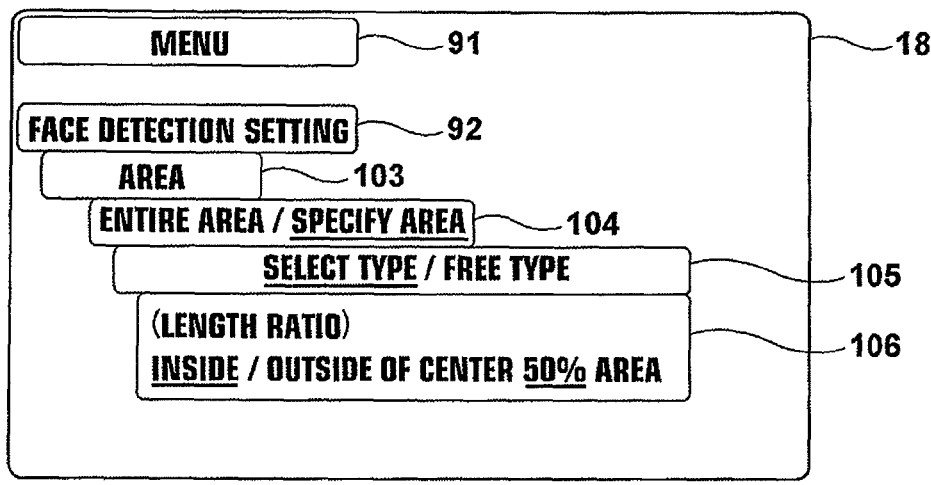
FIGS. 7A and 7B illustrate examples of a menu screen that is displayed when a detection area is set as the detection condition.
Figure 7B:
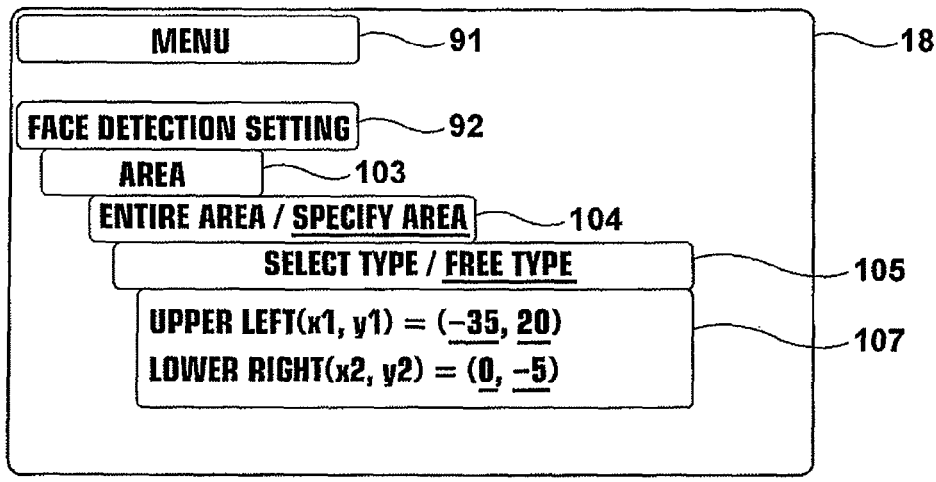

Next, the detection condition setting unit 66 of the digital camera 1 having the above-described configuration is described in detail with reference to the drawings. FIGS. 4A and 4B illustrate examples of a menu screen that is displayed when an orientation of the face to be detected is set as a detection condition, FIGS. 5A and 5B illustrate examples an example of a menu screen that is displayed when a size of the face to be detected is set as the detection condition, FIGS. 6A and 6B illustrate examples of a menu screen that is displayed when an inclination of the face to be detected is set as the detection condition, and FIGS. 7A and 7B illustrate examples of a menu screen that is displayed when a detection area is set as the detection condition.

The detection condition setting unit 66 allows the user to set an orientation, a size and an inclination of the face to be detected and a detection area as the face detection conditions. If an orientation of the face is to be set, as shown in FIG. 4A for example, the user selects an "orientation" item 93 under a "face detection setting" item 92 on the menu screen 91, and then selects at 94 an "all orientations" item for detecting a face with any orientation, or an "specify individually" item which allows the user to individually specify the orientation of the face to be detected. If the user has selected the "specify individually" item, the user can select the orientation(s) of the face to be detected by selecting ON or OFF at an "ON/OFF" item 95 for each of "front-oriented", "side-oriented", "upward-oriented" and "downward-oriented" items.

FIG. 8 illustrates a flow chart of a face detection setting process that is carried out according to the setting made on the menu shown in FIG. 4A. As shown in FIG. 8, the CPU 75 determines whether or not the "specify individually" item is selected (step S1). If the "specify individually" item is selected (step S1: YES), the detection condition setting unit 66 checks the setting made by the user (step S2).

The detection condition setting unit 66 determines, first, whether or not "ON" is set for the "front-oriented" item (step S3). If "ON" is set for the "front-oriented" (step S3: YES), a front-oriented face is to be detected (step S4). If "ON" is not set for the "front-oriented" (step S3: NO), a front-oriented face is not to be detected (step S5).

Then, the detection condition setting unit 66 determines whether or not "ON" is set for the "side-oriented" item (step S6). If "ON" is set for the "side-oriented" (step S6: YES), a side-oriented face is to be detected (step S7). If "ON" is set for the "side-oriented" (step S6: NO), a side-oriented face is not to be detected (step S8).

Then, the detection condition setting unit 66 determines whether or not "ON" is set for the "upward-oriented" item (step S9). If "ON" is set for the "upward-oriented" (step S9: YES), an upward-oriented face is to be detected (step S10). If "ON" is not set for the "upward-oriented" (step S9: NO), an upward-oriented face is not to be detected (step S11).

Then, the detection condition setting unit 66 determines whether or not "ON" is set for the "downward-oriented" item (step S12). If "ON" is set for the "downward-oriented" (step S12: YES), a downward-oriented face is to be detected (step S13). If "ON" is not set for the "downward-oriented" (step S12: NO), a downward-oriented face is not to be detected (step S14).

Then, the detection condition setting unit 66 further determine whether or not all the "ON/OFF" items at 95 shown in FIG. 4A are set "OFF", i.e., whether or not setting is made such that all the orientations of the face to be detected are not to be detected (step S15). If all the orientations are set not to be detected (step S15: YES), a warning to prompt the user to set at least one of the "ON/OFF" items at 95 as "ON" is displayed, for example, on the monitor 18 (step S16). Then, the CPU 75 displays the menu screen 91 shown in FIG. 4A to allow the user to set again and moves the process to step S2. In contrast, If not all of the orientations are set not to be detected (step S15: NO), the orientation(s) of the face to be detected determined by the operations in steps S3-S4 is set as the face detection condition.

If it is determined in step S1 that the "specify individually" item is not selected (step S1: NO), the face detection condition is set so that all the faces are to be detected (step S17). In this manner, the detection condition setting unit 66 sets the face detection condition according to manual setting by the user.

Although the orientations such as front-oriented, side-oriented, upward-oriented and/or downward-oriented are set as the condition of the face to be detected in this embodiment, only ON or OFF for the side-oriented face, for example, may be selected by the user at an "ON/OFF" item 96, as shown in FIG. 4B, with respect to the orientation of the face to be detected when the user has selected the "orientation" item 93.

In a case where a size of the face to be detected is set as the face detection condition, as shown in FIG. 5A, the user selects a "size" item 97 under the "face detection setting" item 92 on the menu screen 91, and arbitrarily sets, at an "upper and lower limits" item 98, upper and lower limits for the size of the face to be detected, specifically, upper and lower limits for the ratio of the size of the face to be detected to the short side of the photographed image by manipulating, for example, the zoom/up-down lever 13 and the right-left button 14. The upper and lower limits for the size may be arbitrarily set by the user as described above, or alternatively, more than one candidate values 99 for the upper and lower limits of the range of the size of the face to be detected, as shown in FIG. 5B, may be presented when the user has selected the "size" item 97 to allow the user to select one of the candidate values by manipulating, for example, the zoom/up-down lever 13.

In a case where an inclination of the face to be detected is set as the face detection condition, as shown in FIG. 6A, the user selects an "inclination" item 100 under the "face detection setting" item 92 on the menu screen 91, and selects at 101 an "all angles" item for detecting a face with any inclination angle or a "specify inclination" item which allows the user to specify an inclination of the face to be detected. If the user has selected the "specify inclination" item, the user arbitrarily specifies upper and lower limits for the range of the inclination angle of the face to be detected at 102, as shown in FIG. 6B, by manipulating, for example, the zoom/up-down lever 13 and the right-left button 14. The upper and lower limits for the inclination may arbitrarily specified by the user as described above, or alternatively, more than one candidate values for the upper and lower limits of the range of the inclination may be presented in the similar manner as the size of the face to be detected, so that the user can select one of the candidate values.

In a case where a detection area is set as the face detection condition, as shown in FIGS. 7A and 7B, the user selects an area item 103 under the "face detection setting" item 92 on the menu screen 91, and selects at 104 an "entire area" item for detecting a face(s) from the entire image area or a "specify area" item which allows the user to specify the detection area. If the "specify area" item is selected, then, the user selects at 105 a "select type" item which allows the user to specify the detection area from candidate areas, or "free type" which allows the user to arbitrarily specify coordinates of the detection area in the image.

If the "select type" item is selected at 105, the user can change and set a numerical value of a length ratio and whether the area is inside or outside at 106, as shown in FIG. 7A, such that, for example, the detection area is inside the center 50% (in length ratio) area of the photographed image, by manipulating, for example, the zoom/up-down lever 13 and the right-left button 14.

If the "free type" item is selected at 105, the user can change and set values x1, x2, y1 and y2 of coordinates of the upper left corner (x1,y1) and the lower right corner (x2,y2), for example, for specifying the search area, as shown in FIG. 7B, by manipulating, for example, the zoom/up-down lever 13 and the right-left button 14. The origin of the coordinates may be set at the center of the image.

A face detection condition setting process by the detection condition setting unit 66 with respect to the size of the face, the inclination of the face or the detection area is substantially the same as the above-described face detection condition setting process for setting the orientation of the face to be detected.

Figure 9:
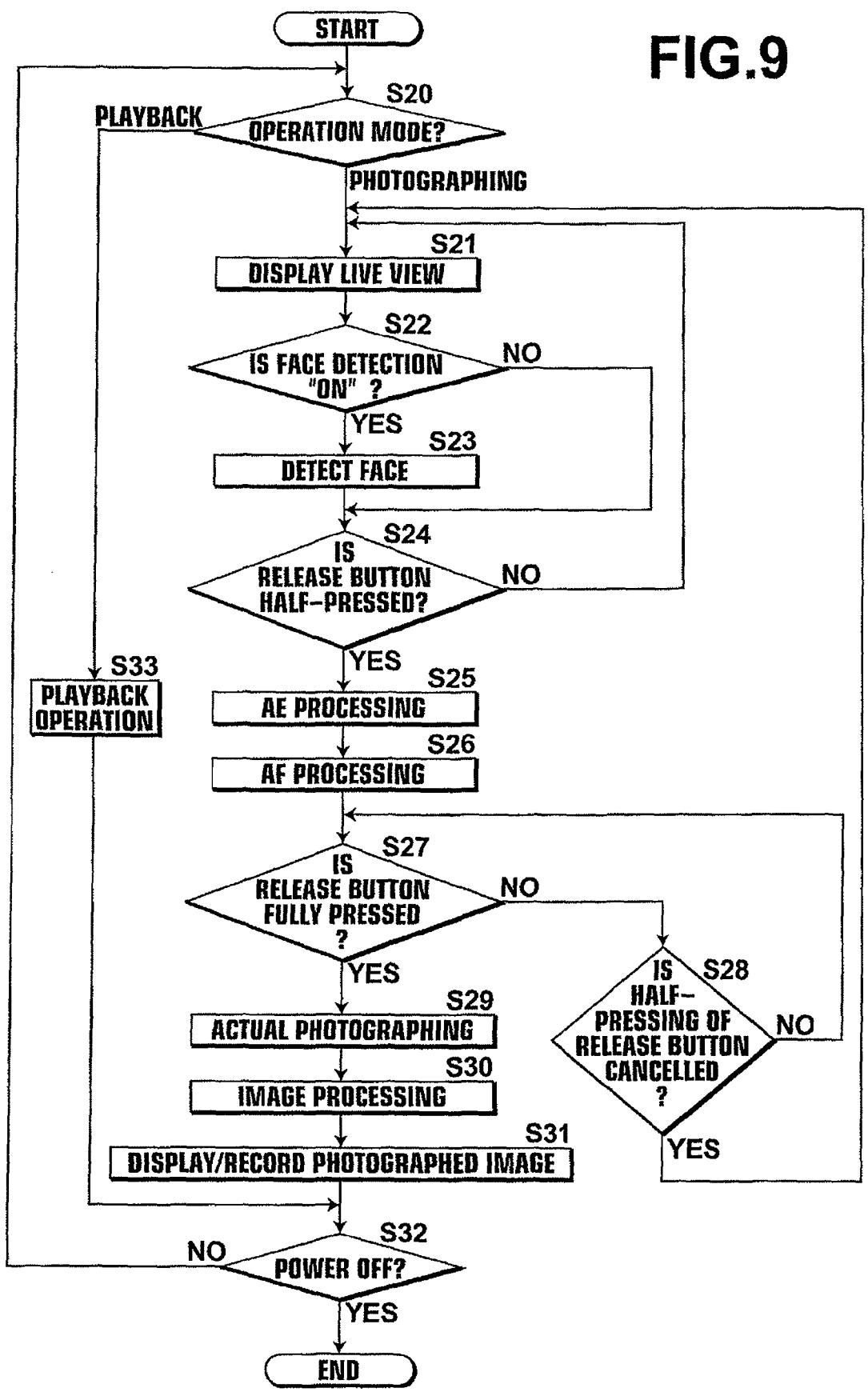
FIG. 9 is a flow chart of a series of operations carried out in the digital camera.

Now, a series of operations carried out in the digital camera 1 with the face detection conditions being set as described above are described. FIG. 9 is a flow chart of the series of operations carried out in the digital camera 1.

First, as shown in FIG. 9, the CPU 75 determines whether the operation mode is the photographing mode or the playback mode according to the setting of the operation mode switch 11 (step S20). If the operation mode is the playback mode (step S20: play back), a playback operation is carried out (step S33). In the playback operation, the media controlling unit 69 reads out an image file stored in the external recording medium 70 and displays on the monitor 18 an image based on image data contained in the image file. When the playback operation has been finished, the CPU 75 determines whether or not the power switch 22 of the digital camera 1 has been turned off (step S32). If the power switch 22 is not turned off (step S32: NO), the CPU 75 moves the process to step S20. If the power switch 22 has been turned off (step S32: YES), the digital camera 1 is powered off and the process ends.

In contrast, if it is determined in step S20 that the operation mode is the photographing mode (step S20: photographing), the CPU 75 controls the display of the live view (step S21). Then, the CPU 75 determines whether or not the face detection button 27 is set as "ON" (step S22). If the face detection button 27 is set as "ON" (step S22: YES), the face detection unit 65 continuously carries out the face detection operation on the live view based on the detection conditions set as described above by the detection condition setting unit 66 (step S23). If the face detection button 27 is not set as "ON" (step S22: NO), the CPU 75 moves the process to step S24.

Then, the CPU 75 determines whether or not the release button 19 is half-pressed (step S24). If the release button 19 is not half-pressed (step S24: NO), the CPU 75 moves the process to step S21, and repeats the operations in step S21 and the following steps.

If the release button 19 is half-pressed (step S24: YES), the AE processing unit 63A carries out the AE processing (step S25), and the AF processing unit 62 carries out the AF processing (step S26). At this time, the AWB processing unit 63B may carry out the AWB processing.

Then, the CPU 75 determines whether or not the release button 19 is fully pressed (step S27). If the release button 19 is not fully pressed (step S27: NO), then, the CPU 75 determines whether or not the half-pressing of the release button 19 is cancelled (step S28). If the half-pressing is not cancelled (step S28: NO), the CPU 75 moves the process to step S27. If the half-pressing is cancelled (step S28: YES), the CPU 75 moves the process to step S21.

In contrast, if the release button 19 is fully pressed (step S27: YES), an actual photographing operation is carried out (step S29). As the actual photographing operation has been carried out (step S29), the image processing unit 64 applies image processing to an actually photographed image acquired by the actual photographing operation (step S30). At this time, the data of the actually photographed image subjected to the image processing may further be compressed by the compression/decompression processing unit 67 to generate an image file.

Then, the CPU 75 displays the actually photographed image, which has been subjected to the image processing, on the monitor 18 via the display controlling unit 71, and records the data of the actually photographed image on the external recording medium 70 via the media controlling unit 69 (step S31). Subsequently, the CPU 75 determines whether or not the power switch 22 has been turned off (step S32). If the power switch 22 has been turned off (step S32: YES), the digital camera 1 is powered off and the process ends. If the power switch 22 is not turned off (step S32: NO). The CPU 75 moves the process to step S20, and repeats the operations in step S20 and the following steps. In this manner, photographing with the digital camera 1 is carried out.

As described above, in the digital camera 1 of this embodiment, the user can set the individual face detection conditions to cause the face detection unit 65 to detect a face with the conditions intended by the user. This allows the face detection to be carried out with a balance as desired by the user between the detection rate and the detection speed. Therefore, in a case where it is known in advance that only faces having large sizes are photographed, for example, the face detection may be carried out under the detection conditions which are set so as not to detect faces having small sizes. In this manner, unnecessary face detection operations can be avoided, thereby preventing erroneous detection and shortening the processing time.

Figure 10:
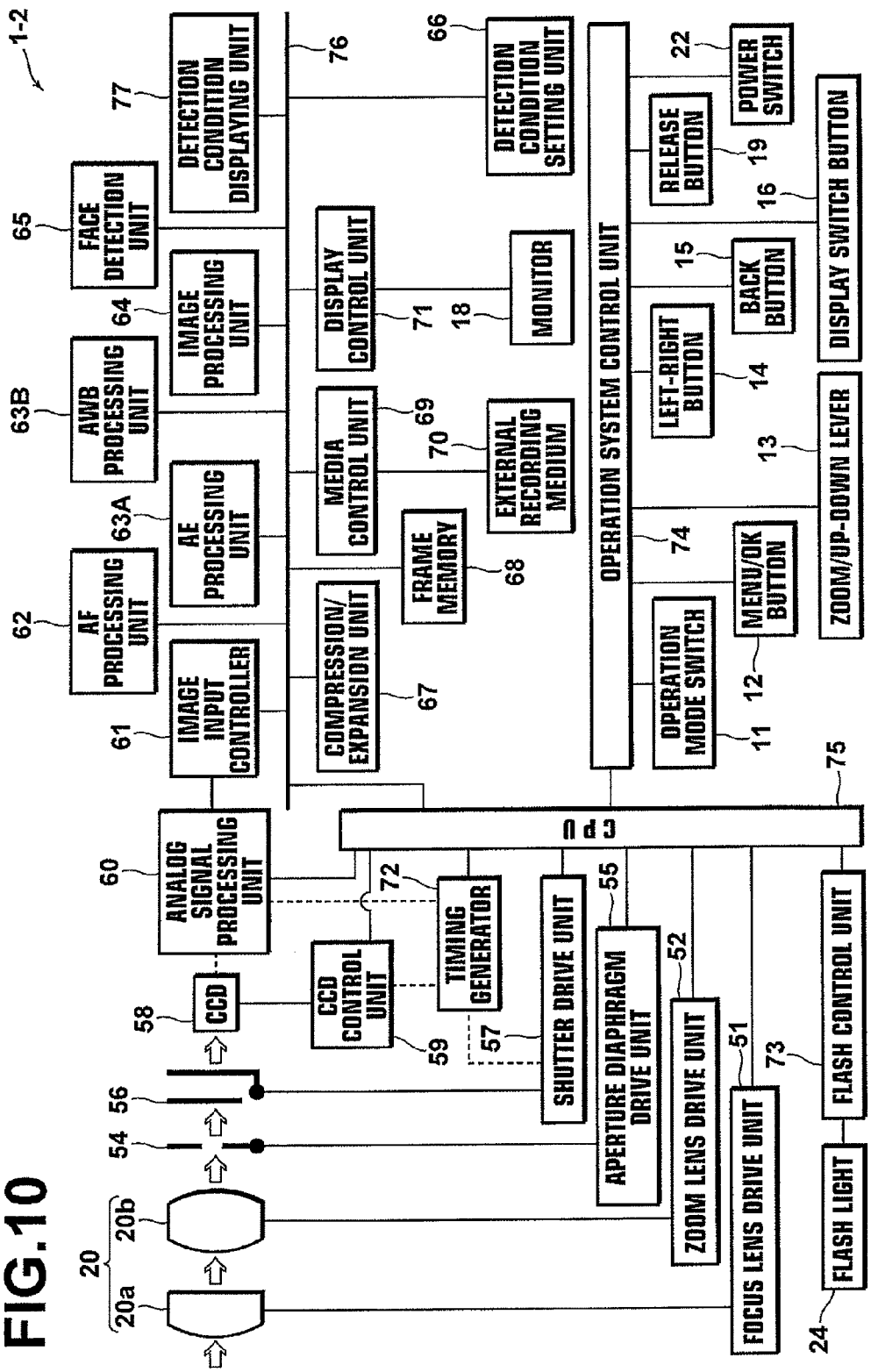
FIG. 10 is a functional block diagram of a digital camera according to a second embodiment of the first aspect of the invention.

Next, a digital camera 1-2 according to a second embodiment of the first aspect of the invention will be described in detail with reference to the drawings. FIG. 10 is a block diagram illustrating the functional configuration of the digital camera 1-2, FIG. 11A illustrates an example of a menu screen that is displayed when the inclination of the face to be detected is set as the detection condition, and FIG. 11B illustrates an example of a pictorial display that is displayed in this case.

As shown in FIG. 10, the digital camera 1-2 of this embodiment includes a detection condition displaying unit 77 in addition to the configuration of the digital camera 1 of the above-described embodiment. It should be noted that components of the digital camera 1-2 of this embodiment that are the same as the components of the digital camera 1 of the above-described embodiment are designated by the same symbols and are not described again here.

The detection condition displaying unit 77 displays the detection conditions set by the detection condition setting unit 66. In the case where the inclination of the face to be detected is set as the detection condition, for example, a selection item 110 for allowing the user to select "ON" or "OFF" of a setting confirmation pictorial display is displayed on the monitor 18, as shown in FIG. 11A. If the user has selected "ON" by manipulating, for example, the right-left button 14, a text "inclination setting" 111 is displayed at the left of the screen, and a pictorial display of the result of the setting of the inclination, i.e., the face detection condition, is displayed at the right of the screen, as shown in FIG. 11B.

Figure 11A:
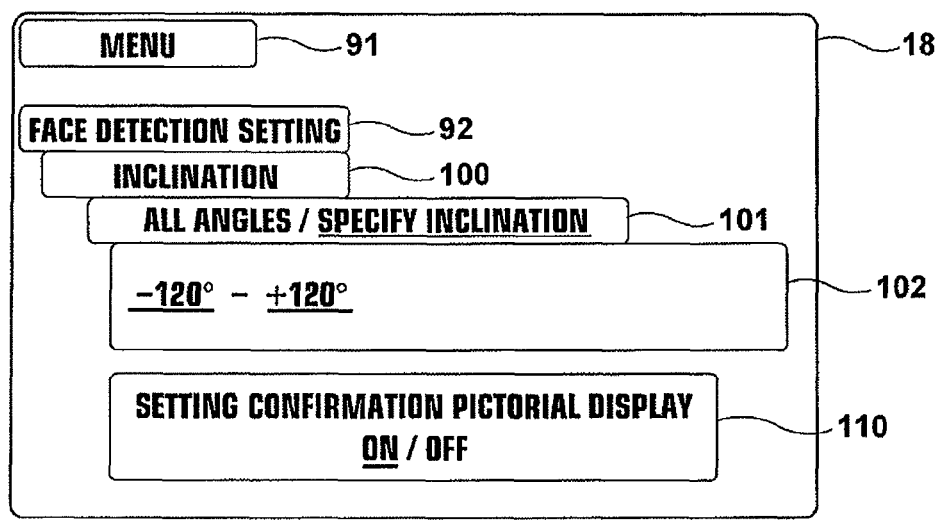
FIG. 11A illustrates an example of a menu screen that is displayed when the inclination of the face to be detected is set as the detection condition in the digital camera of FIG. 10.
Figure 11B:
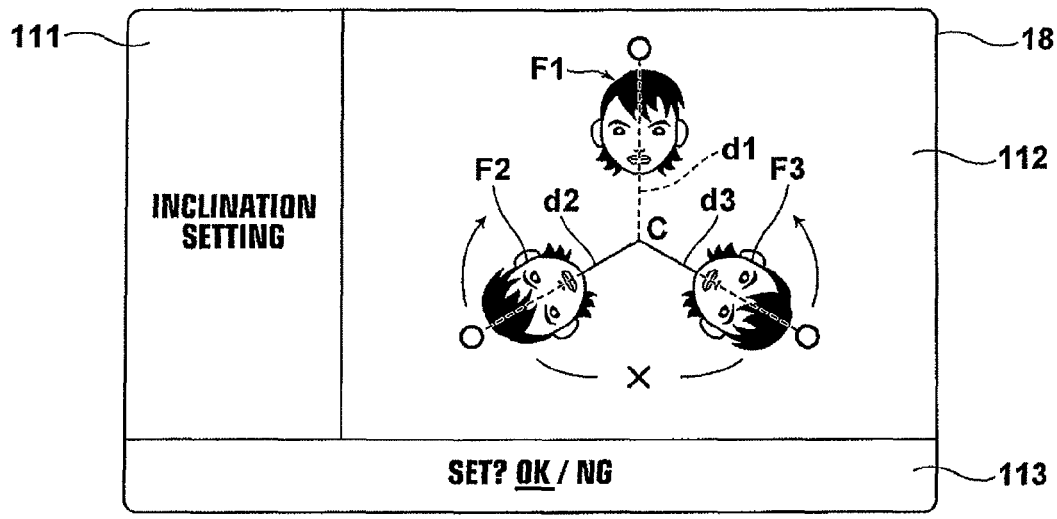
FIG. 11B illustrates an example of a pictorial display in this case.

As shown in FIG. 11B, the pictorial display in this case contains, for example, a face icon F1 with the central axis thereof being aligned with a straight line d1 with an inclination of 0°, which extends substantially vertically from a substantial center C of the right-side area of the screen, a face icon F2 with the central axis thereof being aligned with a straight line d2 which is rotated counter-clockwise around the center C by an angle of 120° from the straight line d1, and a face icon F3 with the central axis thereof being aligned with a straight line d3 which is rotated clockwise around the center C by an angle of 120° from the straight line d1, based on the values of the upper and lower limits for the inclination angle of the face to be detected set at 102 in FIG. 11A (−120° and +120° in this embodiment). Further, circles are displayed in the vicinity of the face icons F1, F2 and F3, respectively, which indicate that the inclinations of the displayed face icons are within the range of the inclination angle of the face to be detected, arrows are displayed from the face icon F2 and the face icon F3 toward the face icon F1, and a mark "X" is displayed at a position between the face icon F2 and face icon F3, which is opposite from the face icon F1, i.e., about a position corresponding to ±180°, which indicates that the range between the face icons F2 and F3 is out of the range of the inclination angle of the face to be detected.

Further, an item 113 for allowing the user to select whether or not the detection condition represented by the pictorial display should be set is displayed at the bottom area of the screen, for example, so that the user can select "OK" or "NG" by manipulating, for example, the right-left button 14.

This allows the user to visually check whether the range of the inclination of the face to be detected based on the detection condition set by the detection condition setting unit 66 is intended by the user, to avoid a detection condition not intended by the user being set.

Figure 12:
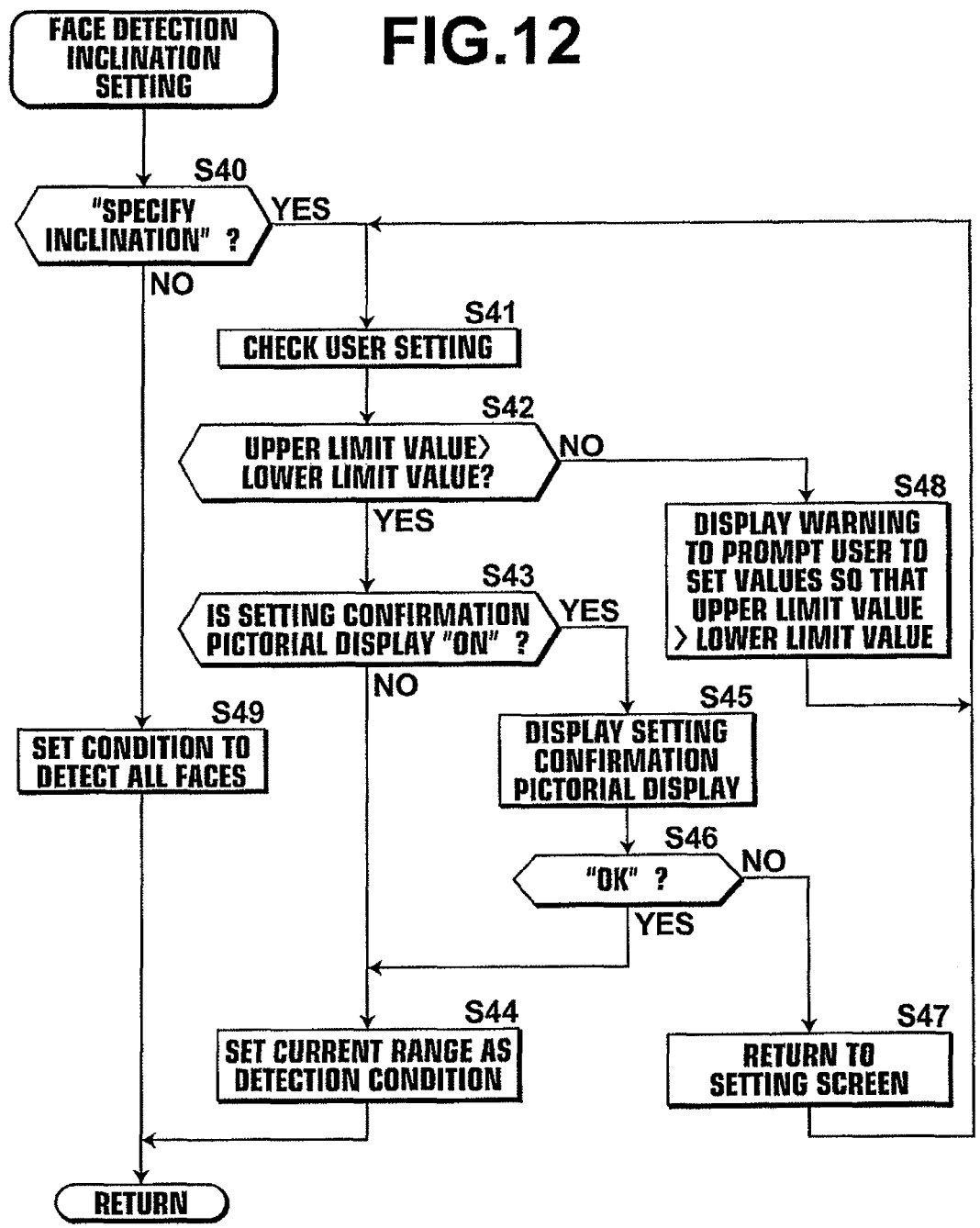
FIG. 12 is a flow chart of a face detection inclination setting process according to setting shown in FIG. 11A and FIG. 11B.

FIG. 12 is a flow chart of a face detection inclination setting process according to the setting made on the screens shown in FIGS. 11A and 11B. First, the CPU 75 determines whether or not the "specify inclination" item is selected at 101 on the screen shown in FIG. 11A (step S40). If the "specify inclination" item is selected at 101 (step S40: YES), the CPU 75 checks the setting made by the user (step S41), and determines whether or not the upper limit value of the inclination angle is larger than the lower limit value (step S42).

If the upper limit value of the inclination angle is larger than the lower limit value (step S42: YES), the CPU 75 determines whether or not "ON" is selected for the setting confirmation pictorial display at 110 on the screen shown in FIG. 11A (step S43). If "ON" is not selected (step S43: NO), the currently set range of the detection condition shown at 102 is set as the inclination of the face to be detected without displaying the pictorial display (step S44).

In contrast, if "ON" is selected (step S43: YES), the detection condition displaying unit 77 displays the pictorial display of the inclination of the face to be detected based on the current range of the detection condition shown at 102 set by the detection condition setting unit 66, as shown in FIG. 11B (step S45), and the CPU 75 determines whether or not "OK" is selected for the current setting (step S46).

If "OK" is selected for the current setting (step S46: YES), the CPU 75 moves the process to step S44, and sets the current range of the detection condition for the face to be detected (step S44). If "OK" is not selected for the current setting, the CPU 75 determines that the current detection range is not desired by the user. Then, the CPU 75 returns the display on the monitor 18 to the setting screen shown in FIG. 11A so that the user can set the detection condition again (step S47), and moves the process to step S41.

If it is determined in step S42 that the upper limit value of the inclination angle is smaller than the lower limit value (step S42: NO), the CPU 75 displays a warning on the monitor 18 via the display controlling unit 71, for example, to prompt the user to set the upper and lower limits again so that the upper limit value of the inclination angle is larger than the lower limit value (step S48), and moves the process to step S41.

If it is determined in step S40 that the "specify inclination" item is not selected (step S40: NO), the face detection condition is set to detect all faces (step S49). In this manner, the face detection inclination setting process is carried out.

Figure 13A:
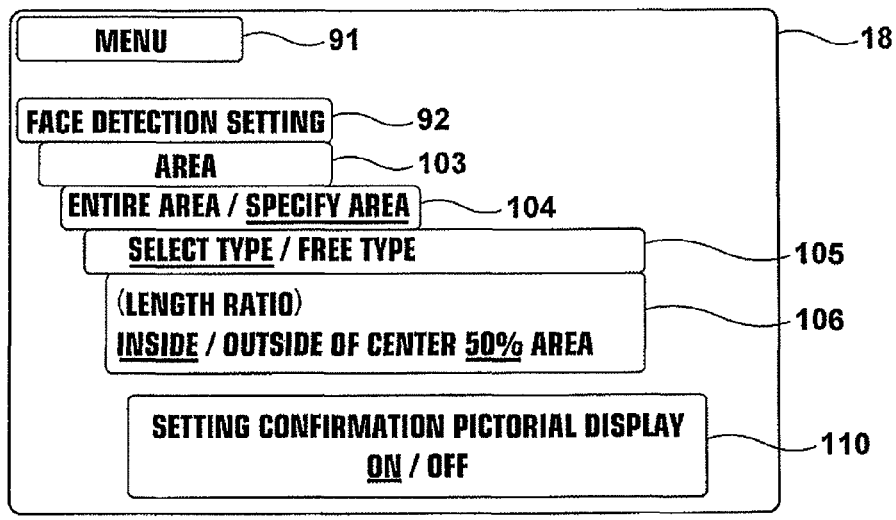
FIG. 13A illustrates an example of a menu screen that is displayed when the detection area is set as the detection condition in the digital camera of FIG. 10.

Although the case where the inclination of the face to be detected is set as the detection condition is described above, the detection area for the face detection may be set as the detection condition. FIG. 13A illustrates an example of a menu screen that is displayed when the detection area is set as the detection condition, and FIG. 13B illustrates an example of a pictorial display that is displayed in this case.

In the case where the detection area is set as the face detection condition, the selection item 110 for allowing the user to select "ON" or "OFF" for the setting confirmation pictorial display is displayed in the similar manner as described above, as shown in FIG. 13A. If the user has selected "ON", a text "area setting" 114 is displayed at the left of the screen, and the pictorial display of the result of the setting of the area, i.e., the face detection condition, is displayed at the right of the screen, as shown in FIG. 13B.

Figure 13B:
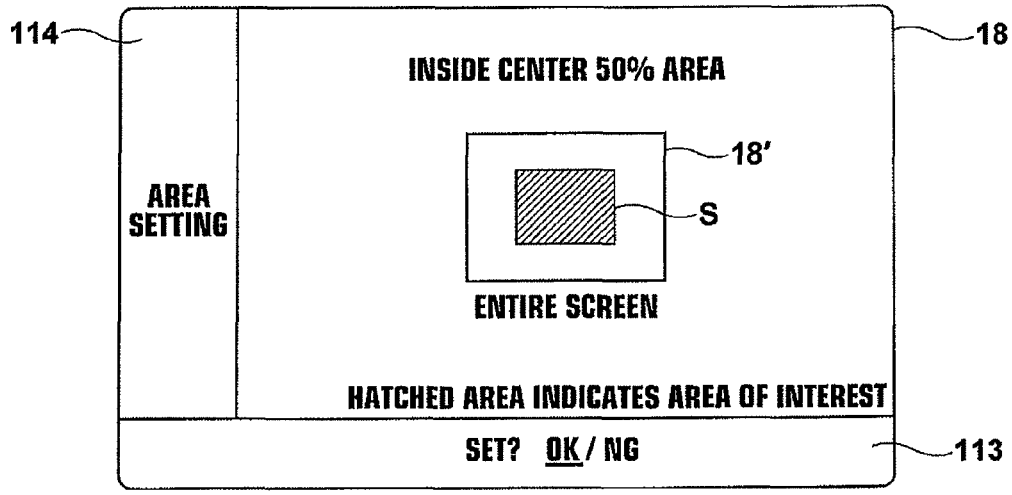
FIG. 13B illustrates an example of the pictorial display in this case.

As shown in FIG. 13B, the pictorial display in this case contains an "entire screen" figure 18' representing the monitor 18 and a "detection area of interest" figure S representing a search area within the "entire screen" figure 18'. Further, a text "inside center 50% area" based on the length ratio value (50% in this embodiment) set at the item 106 shown in FIG. 13A is displayed above the "entire screen" figure 18', for example, and a text "hatched area indicates area of interest" is displayed at the lower right area.

Then, in the same manner as described above, the item 113 for allowing the user to select whether or not the detection condition represented by the pictorial display should be set is displayed at the bottom area of the setting screen, so that the user can select "OK" or "NG" by manipulating, for example, the right-left button 14. This allows the user to visually check whether the range of the detection area based on the detection condition set by the detection condition setting unit 66 is intended by the user, to avoid a detection condition not intended by the user being set.

As described above, the detection condition displaying unit 77 displays the pictorial display representing the detection condition arbitrarily set by the user to allow the user to visually check whether the current range of the detection area is intended by the user. Thus, erroneous setting of the detection condition can be avoided, so that faces with an orientation and/or a size which are not intended by the user are not detected.

Although the pictorial display is displayed for confirming the face detection condition in the digital camera 1-2 of this embodiment, this is not intended to limit the invention. For example, a textual display for confirming the face detection condition may be displayed. In this case, different texts may be displayed depending on whether there is a limitation on the face to be detected, for example. FIGS. 14A and 14B illustrates examples of the textual display that is displayed when the size of the face to be detected is set as the detection condition.

In the case where the size of the face to be detected is set as the detection condition, as described above with respect to FIG. 5, if there is no limitation on the face to be detected, i.e., if the detection condition is set so that a face having any size is detected, a text "FULL" may be displayed at the upper left area of the screen as shown in FIG. 14A, for example. In contrast, if the detection condition is set so that only a face that has a size within a range of ratios from 1/8 to 1/2 to the length of the short side of the photographed image is detected, a text "LIMITED (SIZE: 1/8-1/2 OK)" or just "LIMITED" may be displayed at the upper area of the screen as shown in FIG. 14B, for example.

Figure 15:
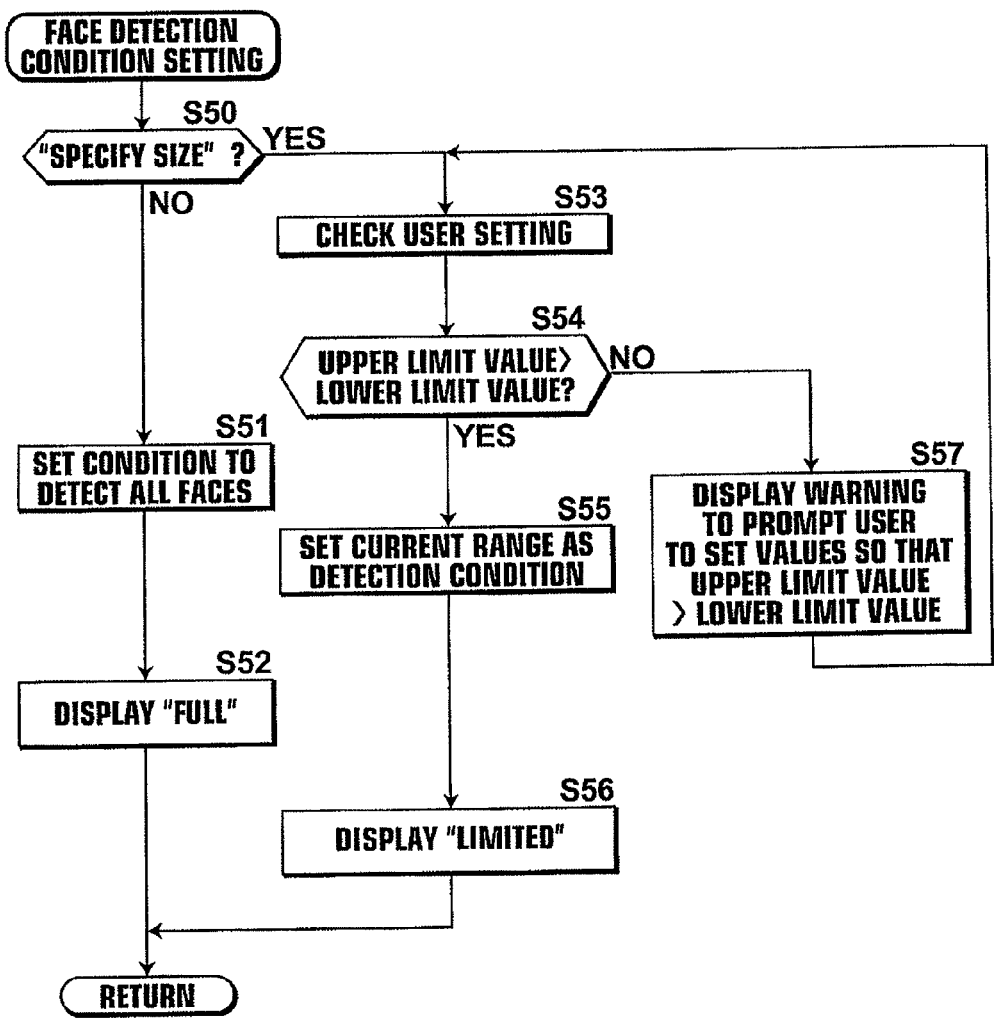
FIG. 15 is a flow chart of a face detection condition setting process according to setting shown in FIGS. 14A and 14B.

FIG. 15 is a flow chart of a face detection setting process that is carried out when the size of the face to be detected is set as the detection condition. First, as shown in FIG. 15, the CPU 75 determines whether or not the "specify size" item is selected (see 97 in FIGS. 5A and 5B) (step S50). If the "specify size" item is not selected (step S50: NO), the face detection condition is set so that all faces are detected (step S51), and the text "FULL" is displayed on the screen of the monitor 18, as shown in FIG. 14A (step S52).

In contrast, if the "specify size" item is selected (step S50: YES), the CPU 75 checks the setting made by the user (step S53), and determines whether or not the upper limit value for the size of the face to be detected is larger than the lower limit value (step S54).

If the upper limit value for the size is larger than the lower limit value (step S54: YES), the CPU 75 sets the currently set detection range (1/8-1/2 in this example, see 98 in FIG. 5A or 99 in FIG. 5B) as the detection condition (step S55), and displays the text "LIMITED (SIZE: 1/8-1/2 OK)" on the screen of the monitor 18, as shown in FIG. 14B (step S56).

If it is determined in step S54 that the upper limit value for the size is smaller than the lower limit value (step S54: NO), the CPU 75 displays a warning on the monitor 18 via the display controlling unit 71, for example, to prompt the user to set the upper and lower limits again so that the upper limit value is larger than the lower limit value (step S57), and moves the process to step S53. In this manner, the setting process is carried out.

The setting confirmation display which indicates the presence or absence of a limitation on the face to be detected may be displayed before the face detection by the face detection unit 65 is started, to prompt the user to select whether or not the currently displayed detection condition should be set, in the same manner as described above, for example. This allows the user to visually check whether the range of the size of the face to be detected set by the detection condition setting unit 66 is intended by the user, to avoid a detection condition not intended by the user being set.

Further, as shown in FIGS. 14A and 14B, the setting confirmation display indicating the presence or absence of a limitation on the face to be detected may be displayed on the live view together with a face detection frame F, which indicates the result of the face detection by the face detection unit 65. Since the detection condition set by the user is displayed on the imaging screen in this case, a situation such that a face detection result obtained under a detection condition which is not intended by the user is used, for example, for AF processing can be avoided.

Figure 16:
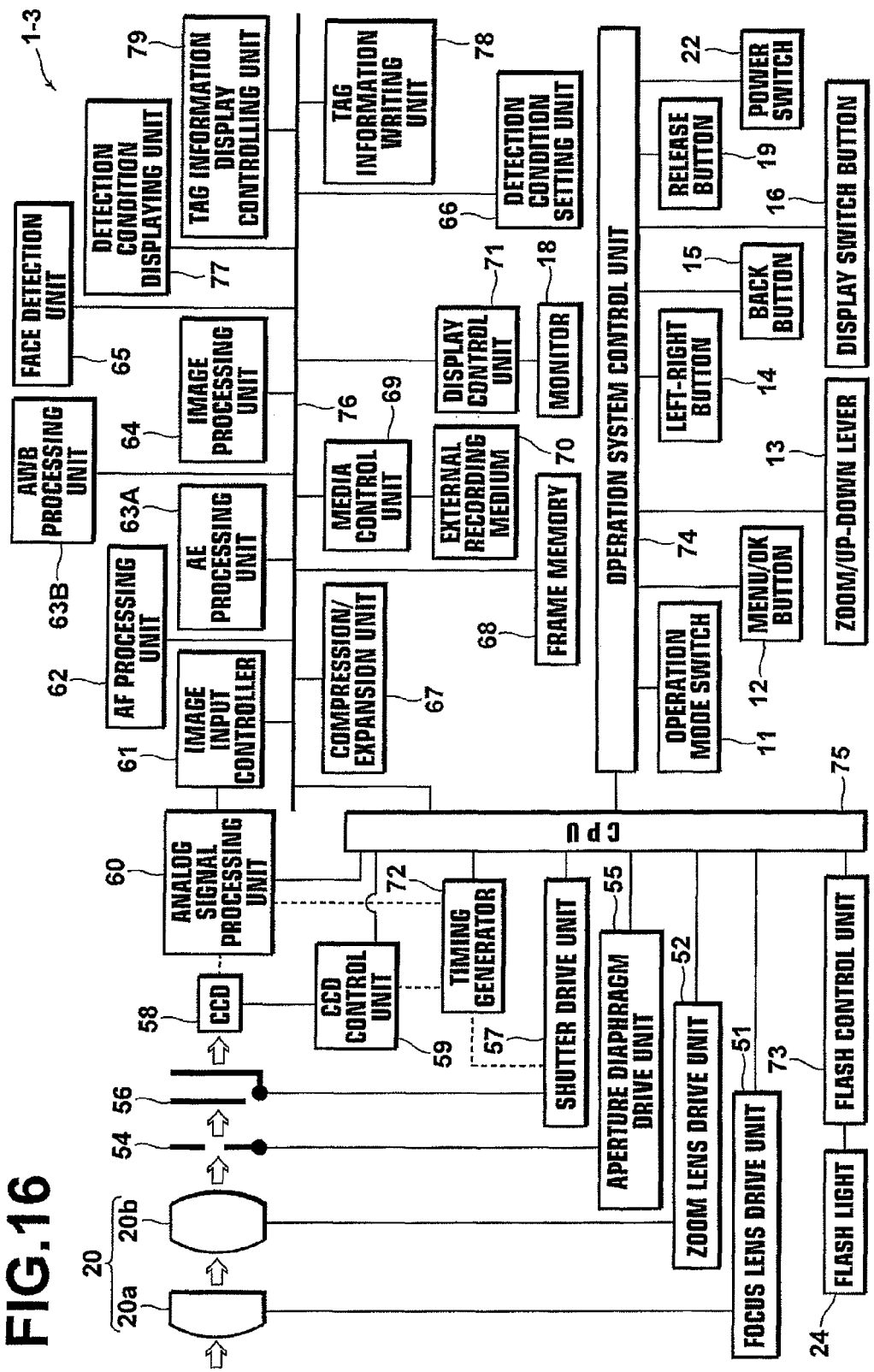
FIG. 16 is a functional block diagram of a digital camera according to a third embodiment of the first aspect of the invention.

Next, a digital camera 1-3 according to a third embodiment of the first aspect of the invention will be described in detail with reference to the drawings. FIG. 16 is a block diagram illustrating the functional configuration of the digital camera 1-3, FIG. 17 illustrates one example of tag information written in an image file, and FIGS. 18A-18D illustrate examples of the tag information displayed when image files are played back.

As shown in FIG. 16, the digital camera 1-3 of this embodiment includes a tag information writing unit 78 and a tag information display controlling unit 79 in addition to the configuration of the digital camera 1-2 of the above-described embodiment. It should be noted that components of the digital camera 1-3 of this embodiment that are the same as the components of the digital camera 1-2 of the above-described embodiment are designated by the same symbols and are not described again here.

When an image file, which has been generated by the compression/decompression processing unit 67, and the like, is recorded in the external recording medium 70 or the internal memory (not shown), the tag information writing unit 78 writes the detection conditions in the tag information of the image file. As shown in FIG. 17, the tag information to be written may include setting items under a "face detection setting" item 120, such as a "face detection ON/OFF" item 121, an "orientation" item 122, an "inclination" item 123, a "size" item 124 and an "area" item 125. In this example, the "face detection ON/OFF" 121 is "ON", the "orientation" 122 is "front-oriented", the "inclination" 123 is "all directions", the "size" 124 is "1/8-1/2", and the "area" 125 is "center 50% (inside)". With the detection conditions written in the tag information in this manner, compatibility with an application for, for example, lightness correction or color correction, which uses the result of the face detection, can be enhanced.

Figure 19:
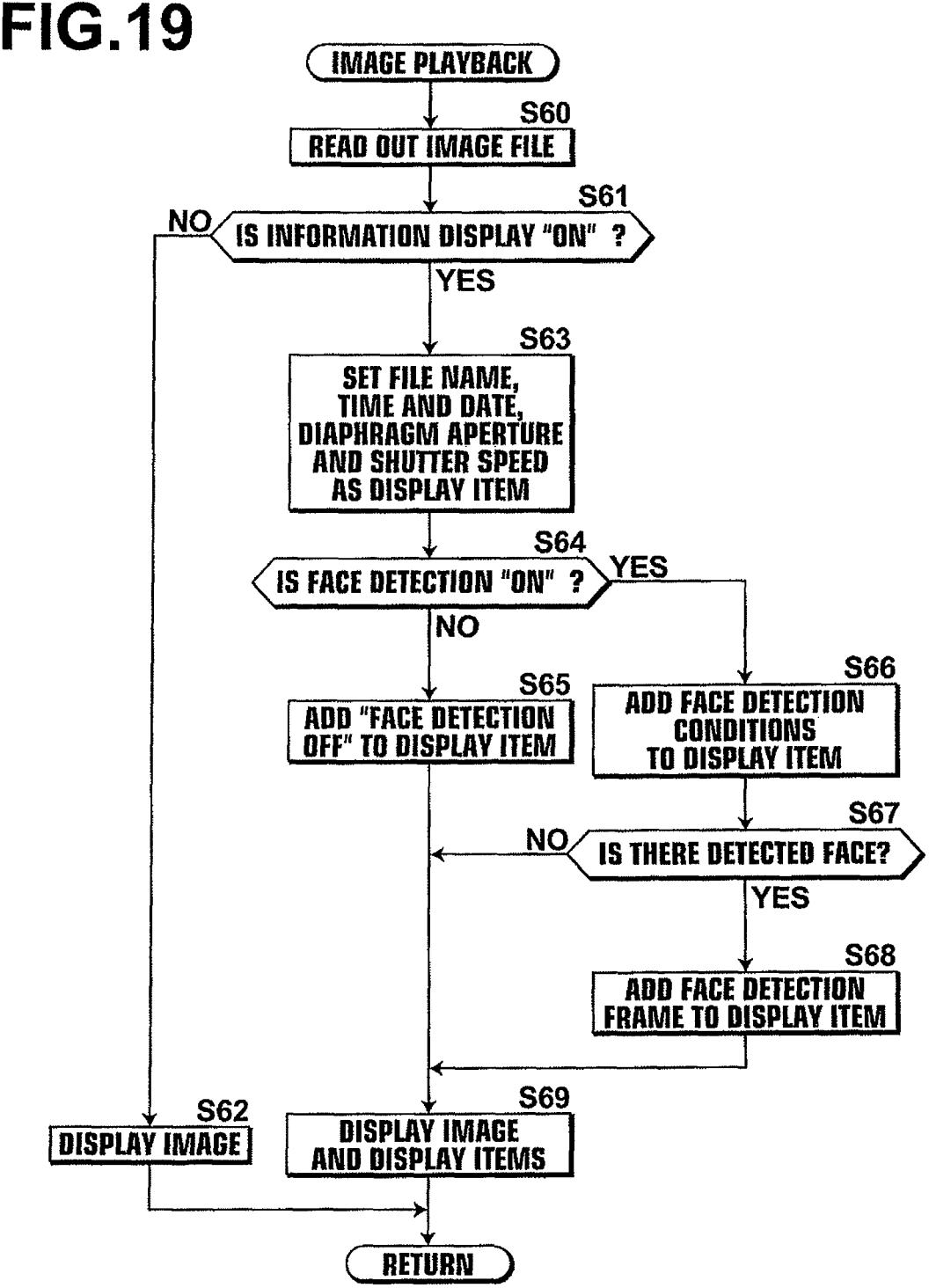
FIG. 19 is a flow chart of an image playback process.

When the image file which has the tag information written by the tag information writing unit 78, as described above, is displayed on the monitor 18, the tag information display controlling unit 79 displays on the monitor 18 the detection conditions written in the tag information. FIG. 19 is a flow chart of an image playback process.

The image playback process is carried out when the operation mode of the digital camera 1-3 is set as the playback mode (see step S33 in FIG. 9). First, as shown in FIG. 19, the media controlling unit 69 read out an image file stored in the external recording medium 70 (step S60), and the CPU 75 determines whether or not "ON" is set for tag information display (step S61). The "ON" or "OFF" of the tag information display may be set by the user through manipulation of a suitable button and/or lever, or may automatically be set as "ON" when the read out image file has the tag information written therein.

If "ON" is set for the tag information display (step S61: YES), the tag information display controlling unit 79 sets information such as the file name, the time and date, the diaphragm aperture and the shutter speed as a display item A1 (step S63).

Then, the CPU 75 determines whether or not "ON" is set for the face detection unit 65 (step S64). If "ON" is not set for the face detection (step S64: NO), the tag information display controlling unit 79 adds information which indicates that the face detection is "OFF" as a display item A2 to the display item (step S65), and displays the image with the display items A1 and A2 according to the tag information on the monitor 18 (step S69).

Figure 18A:
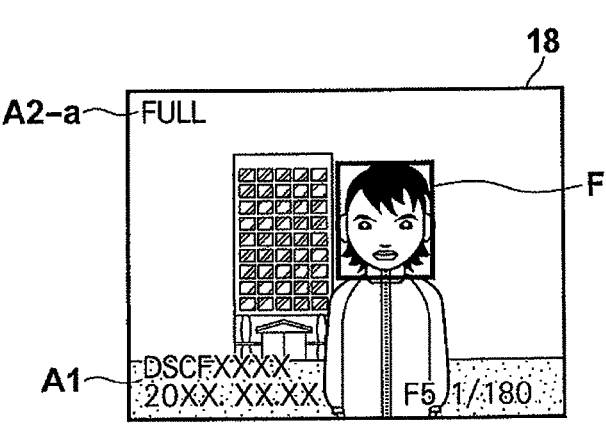
FIGS. 18A-18D illustrate examples of the tag information that is displayed when an image file is played back.
Figure 18B:
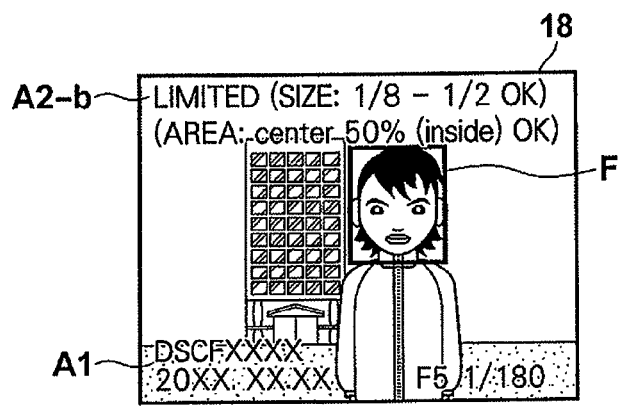
Figure 18C:
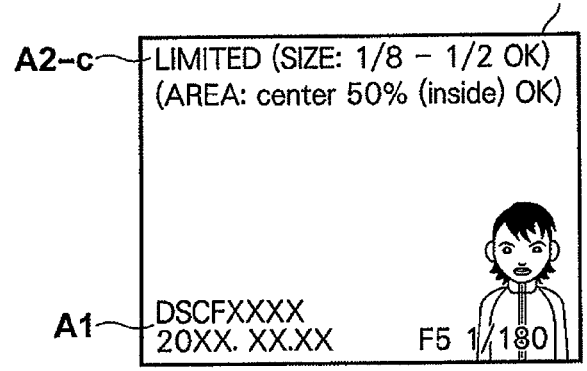
Figure 18D:
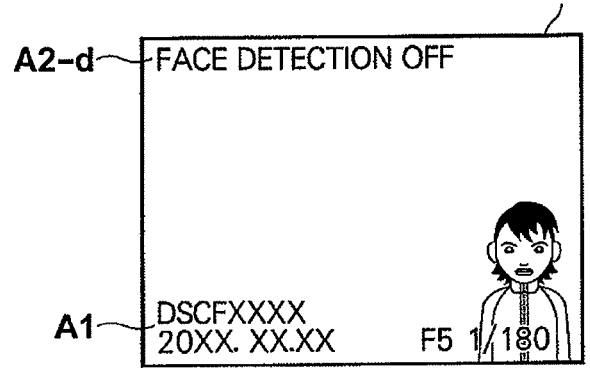

The display on the monitor 18 in this case includes, as shown in FIG. 18D for example, the image data, a text "DSCFXXXX, 20XX.XX.XX, F5, 1/180" representing the content written in the tag information as the display item A1, which is displayed at an area of the screen below the image data, and a text "FACE DETECTION OFF" representing the content written in the tag information, i.e., indicating that the face detection is "OFF", as the display item A2-d, which is displayed at the upper area of the screen.

In contrast, if it is determined in step S64 that "ON" is set for the face detection (step S64: YES), the tag information display controlling unit 79 adds the face detection conditions set by the detection condition setting unit 66 as the display item A2 to the display items (step S66), and the CPU 75 determines whether or not there is a detected face (step S67). If no face is detected (step S67: NO), the image and the display items A1 and A2 according to the tag information are displayed on the monitor 18 (step S69).

The display on the monitor 18 in this case includes, as shown in FIG. 18C for example, the image data, a text "DSCFXXXX, 20XX.XXXX, F5, 1/180" representing the content written in the tag information as the display item A1, which is displayed at an area of the screen below the image data, and a text "LIMITED (SIZE: 1/8-1/2 OK) (AREA:

center 50% (inside) OK)" representing the content written in the tag information, i.e., indicating as the limitations on the detection conditions that the range of the size of the face to be detected is from 1/8 to 1/2 of the length of the short side of the photographed image and that the detection area is inside the center 50% (in length ratio) area of the photographed image as the display item A2-c.

If it is determined in step S67 that there is a detected face (step S67: YES), the tag information display controlling unit 79 adds the face detection frame F to the display items (step S68), and the image, the display items A1 and A2 according to the tag information, and the detection frame F, which is another display item, are displayed on the monitor 18 (step S69).

The display on the monitor 18 in this case includes, as shown in FIG. 18B for example, the image data, a text "DSCFXXXX, 20XXXXXX, F5, 1/180" representing the content written in the tag information as the display item A1, which is displayed at an area of the screen below the image data, a text "LIMITED (SIZE: 1/8-1/2 OK) (AREA: center 50% (inside) OK)" representing the content written in the tag information, i.e., indicating as the limitations on the detection conditions that the range of the size of the face to be detected is from 1/8 to 1/2 of the length of the short side of the photographed image and that the detection area is inside the center 50% (in length ratio) area of the photographed image as the display item A2-b, and the detection frame F surrounding the detected face.

In a case where the detection conditions written in the tag information are to detect all faces, the text "FULL" indicating that all faces are to be detected is displayed as the display item A2-a, as shown in FIG. 18A.

If it is determined in step S61 that "ON" is not set for the tag information display (step S61: NO), the display controlling unit 71 displays only the image on the monitor 18 (step S62). In this manner, the image playback process is carried out.

In a case where the detection conditions are changeable by the detection condition setting unit 66, the user may be confused about what detection conditions were used for photographing the image data recorded in the external recording medium 70 or the internal memory (not shown). However, by writing the detection conditions in the tag information of each image file as described above, the detection conditions written in the tag information can be read out during the image playback operation and the detection conditions, which were set during the photographing operation, can be displayed together with the result of the face detection.

This helps the user to understand why, for example, the face contained in the image was not detected, and to set appropriate detection conditions for photographing a similar scene in the future.

Next, a digital camera 1-4 according to a fourth embodiment of the first aspect of the invention will be described in detail. The functional configuration of the digital camera 1-4 of this embodiment is substantially the same as the functional configuration of the digital camera 1-3 of the above-described embodiment (see FIG. 16), and therefore is not shown in the drawing.

In the digital camera 1-4 of this embodiment, the detection condition setting unit 66 can reset the detection conditions differently from the detection conditions written in the tag information of the image file, and the face detection unit 65 carries out the face detection on the image data of an image file recorded in the external recording medium 70 or the internal memory (not shown) based on the reset detection conditions.

Figure 20A:
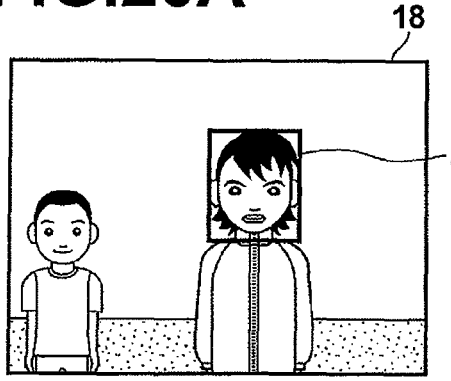
FIG. 20A illustrates a display example of a result of the face detection under detection conditions set during a photographing operation.
Figure 20B:
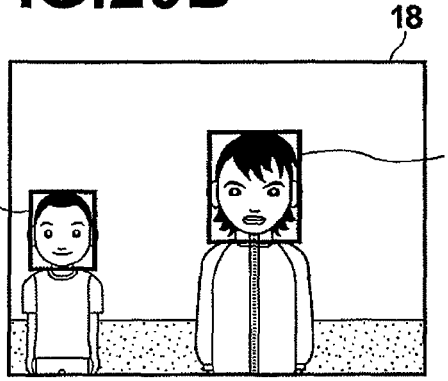
FIG. 20B illustrates a display example of a result of the face detection carried out after image data has been recorded.

FIG. 20A illustrates a display example of a result of the face detection under the detection conditions set during the photographing operation, and FIG. 20B illustrates a display example of a result of the face detection carried out after the image data has been recorded. Usually, there is more time during the image playback operation carried out after the image file has been recorded than during the photographing operation. Therefore, as shown in FIG. 20A, even if only a face F1 was detected from the image containing the face F1 and another face F2 by the face detection based on the detection conditions set during the photographing operation, the detection condition setting unit 66 can reset the detection conditions written during the photographing operation in the tag information of the image file being played back to, for example, detection conditions with wider detection range, so that the face F2 is detected during the playback operation after the image file has been recorded, as shown in FIG. 20B.

Figure 21:
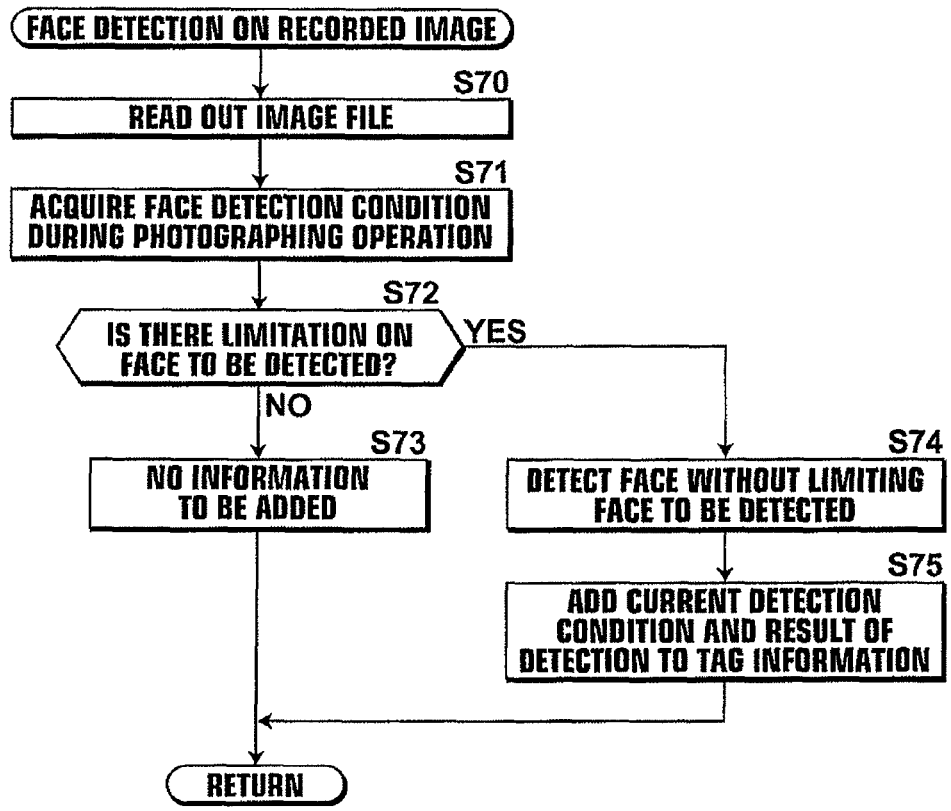
FIG. 21 is a flow chart of a face detection process that is carried out on the recorded image data.

FIG. 21 is a flow chart of a face detection process carried out on a recorded image data. As shown in FIG. 21, in the face detection after recording, the media controlling unit 69 reads out an image file stored in the external recording medium 70 (step S70).

Then, the detection condition setting unit 66 acquires the face detection conditions written in the tag information during the photographing operation (step S71), and determines whether or not there is any limitation on the face to be detected (step S72). If there is no limitation on the face to be detected (step S72: NO), this means that the face detection during the photographing operation was carried out under the detection conditions for detecting all the faces contained in the image, and therefore no information is added to the tag information (step S73).

In contrast, if there is a limitation on the face to be detected (step S72: YES), this means that the face detection during the photographing operation was carried out under the detection conditions limiting the face to be detected. Therefore, the detection condition setting unit 66 resets the detection conditions so as not to limit the face to be detected, i.e., to detect all the faces in the image, and the face detection unit 65 carries out the face detection on the image data being played back based on the reset detection conditions (step S74).

Then, the tag information writing unit 78 adds the reset detection conditions and the current result of the detection to the tag information (step S75).

FIG. 22 illustrates one example of the added tag information. As shown in FIG. 22 for example, the tag information includes, with respect to a "face detection" item 130, items under "setting" 132 for "during photographing" 131 such as "face detection ON/OFF" 133, "orientation" 134, "inclination" 135, "size" 136 and "area" 137. In this example, the "face detection ON/OFF" 133 is "ON", the "orientation" 134 is "front-oriented", the "inclination" 135 is "all directions", the "size" 136 is "1/8-1/2", and the "area" 137 is "center 50% (inside)". The tag information further includes items for "result" 138 of the face detection such as "number of detected faces" 139, "position" 140 and "size" 141. In this example (the example of the result shown in FIG. 20A), the "number of detected faces" 139 is "1", the "position" 140 is "face F1[lower left (XL,YL) upper right (XR,YR)]" (not shown), which may be represented by coordinates with the origin set at the center of the screen, for example, and the "size" 141 is "face F1[1/3]" (not shown).

The added tag information includes, as "setting" 143 for "after recording" 142, "no limitation on face to be detected" 144, and as items for "result" 145 of the face detection, "number of detected faces" 146 being "2", "position" 147 being "face F1[lower left (XL1,YL1) upper right (XR1, YR1)], face F2[lower left (XL2,YL2) upper right (XR2, YR2)]" (not shown) and "size" 148 being "face F1[1/3], face F2[1/4]" (not shown). In this manner, the face detection after recording is carried out.

Although the tag information in this embodiment contains the face detection information obtained after recording added to the setting made and the face detection information (the result of the face detection) obtained during the photographing operation, as shown in FIG. 22, the tag information may be overwritten so that the latest face detection information such as the face detection information obtained after recording is retained.

Figure 23:
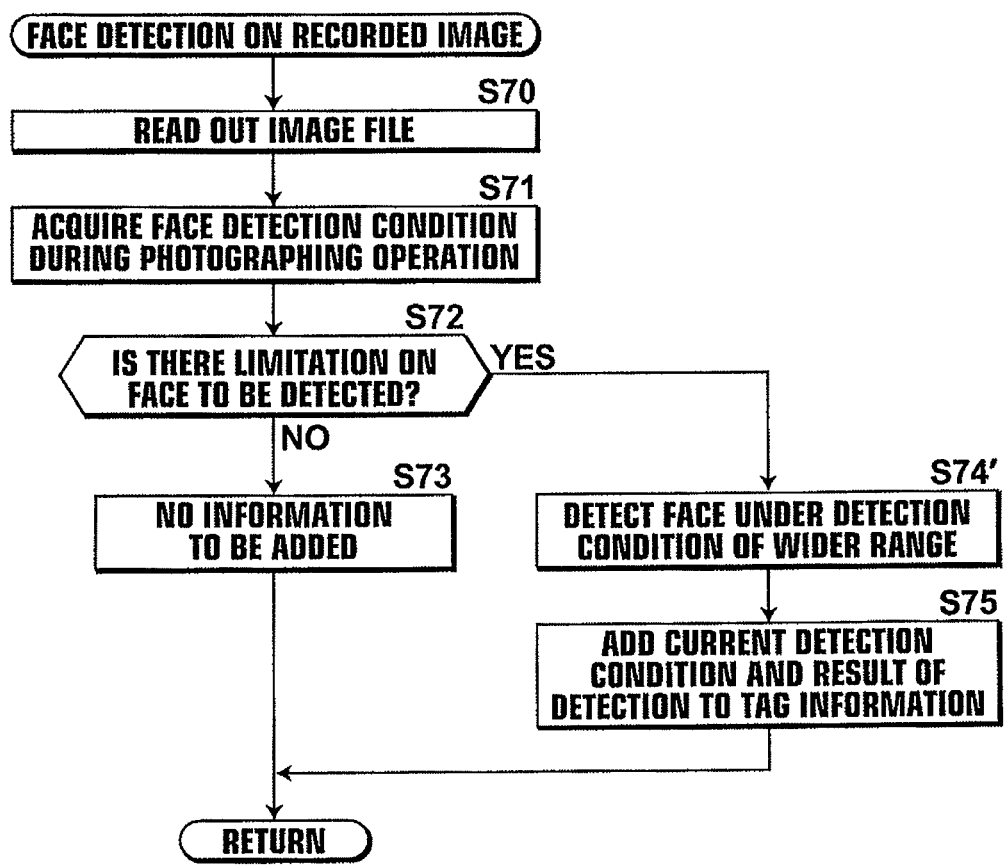
FIG. 23 is a flow chart of another face detection process that is carried out on the recorded image data.

FIG. 23 is a flow chart of another face detection process carried out on recorded image data. It should be noted that operations in the flow chart of FIG. 23 that are the same as those in the flow chart of FIG. 21 are designated by the same step numbers and are not described again here.

As shown in FIG. 23, in the face detection after recording, if it is determined in step S72 that there is a limitation on the face to be detected (step S72: YES), this means that the face detection during the photographing operation was carried out under the detection conditions limiting the face to be detected. Therefore, the detection condition setting unit 66 resets the detection conditions so that a face(s) (if any) which was not detected during the photographing operation is detected, and the face detection unit 65 carries out the face detection on the image data being played back based on the reset detection conditions (step S74').

In this manner, the face F2 (see FIG. 20B), which was not detected during the photographing operation, can be detected in addition to the face F1 which was detected during the photographing operation (see FIG. 20A), and the information of the face F2 can be added to the "result" 145 of the face detection (see FIG. 22) of the tag information.

By carrying out the face detection on the recorded image data with resetting the detection conditions as described above, a face(s) (if any) which was not detected during the photographing operation can be detected from the recorded image data. Thus, the result of the face detection can be used by an application for, for example, lightness correction or color correction to apply more appropriate image processing.

Although the detection condition setting unit 66 in this embodiment resets the detection conditions to widen the detection range from that of the detection conditions written in the tag information of the image file, this is not intended to limit the invention. The detection conditions may be reset to narrow the detection range. In this case, if an erroneous result of detection that was made during the photographing operation is found after the image data has been recorded, the erroneously detected face may possibly be excluded.

Figure 24:
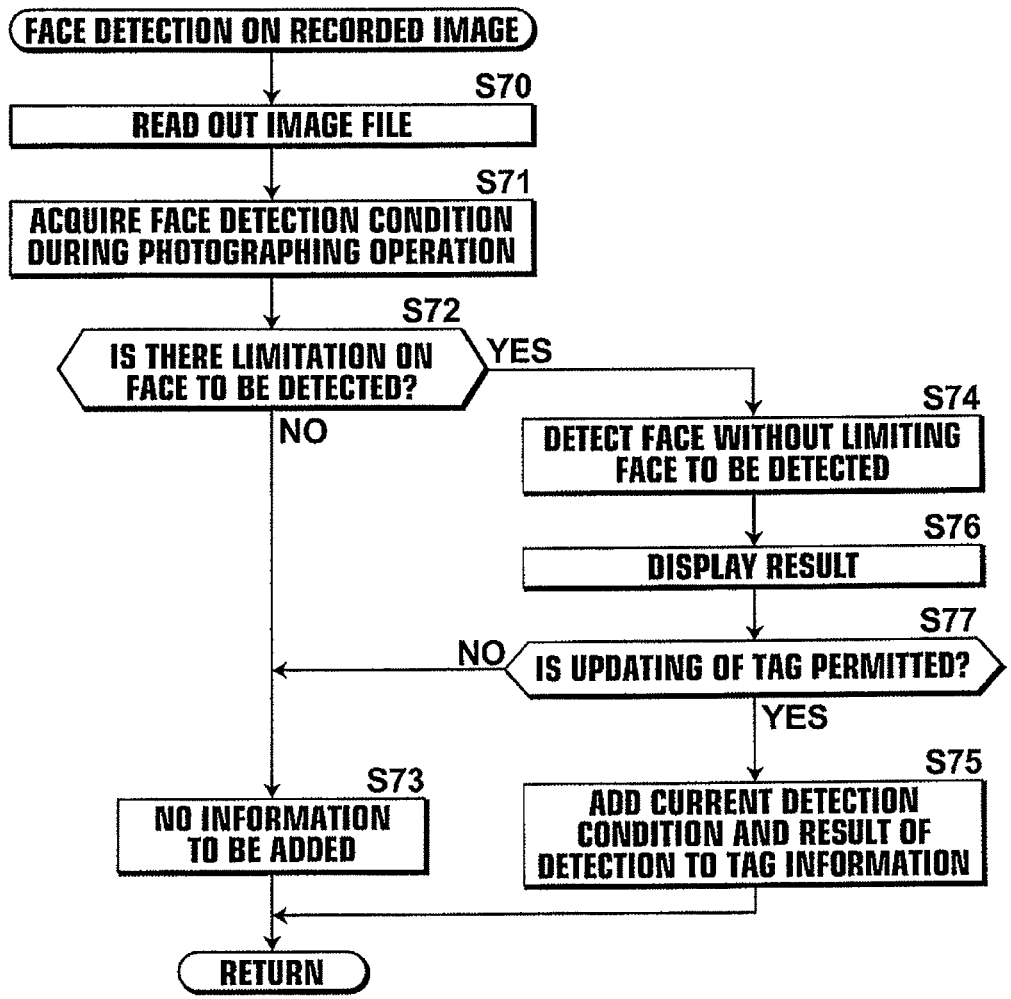
FIG. 24 is a flow chart of yet another face detection process that is carried out on the recorded image data.

FIG. 24 is a flow chart of yet another face detection process carried out on recorded image data. It should be noted that operations in the flow chart of FIG. 24 that are the same as those in the flow chart of FIG. 21 are designated by the same step numbers and are not described again here.

As shown in FIG. 24, in the face detection after recording, if it is determined in step S72 that there is a limitation on the face to be detected (step S72: YES), the detection condition setting unit 66 resets the detection conditions so as not to limit the face to be detected, and the face detection unit 65 carries out the face detection on the image data being played back based on the reset detection conditions (step S74). Thereafter, the CPU 75 displays the result of the face detection on the monitor 18 via the display controlling unit 71 (step S76).

Then, the CPU 75 determines whether or not updating of the tag information is permitted by the user (step S77). The permission by the user may be achieved such that, for example, an item to prompt the user to select whether or not to permit updating of the tag information is displayed on the monitor 18, and the user makes selection through manipulation of a suitable button and/or lever.

If the CPU 75 determines that updating of the tag information is permitted (step S77: YES), the tag information writing unit 78 adds the reset detection conditions and the current result of detection to the tag information (step S75).

In contrast, if it is determined that updating of the tag information is not permitted (step S77: NO), no information is added to the tag information (step S73).

In this case, if the result of the face detection carried out on the recorded image data is different from a result desired by the user, such that an erroneous result of detection, which was not detected in the face detection during the photographing operation, is newly introduced, the user can determine not to add the reset detection conditions and the result to the tag information.

By resetting the detection conditions, after the image file has been recorded, to detection conditions that are different from those used during the photographing operation through which the image file was acquired, and carrying out the face detection on the image data of the played back image file based on the reset detection conditions, as described above, a more appropriate result of the face detection can be obtained from the image data.

Next, a digital camera 1-5 according to a fifth embodiment of the first aspect of the invention will be described in detail. The functional configuration of the digital camera 1-5 of this embodiment is substantially the same as the functional configuration of the digital camera 1-4 of the above-described embodiment, and therefore is not shown in the drawing.

Figure 25:
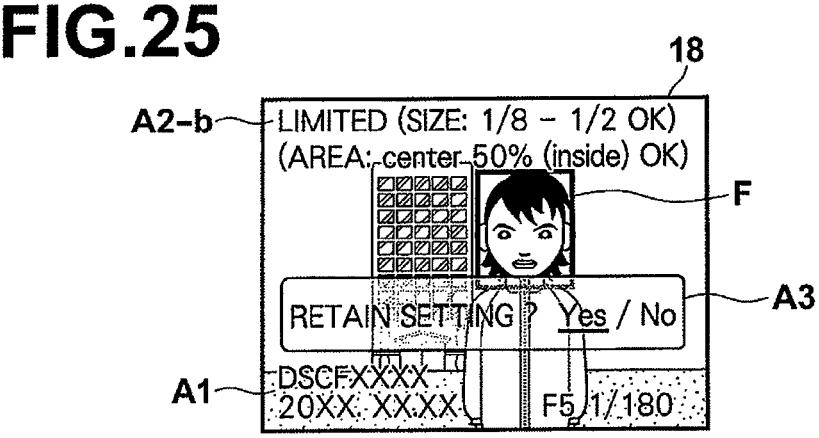
FIG. 25 illustrates a display example of an image file being played back.
Figure 26:
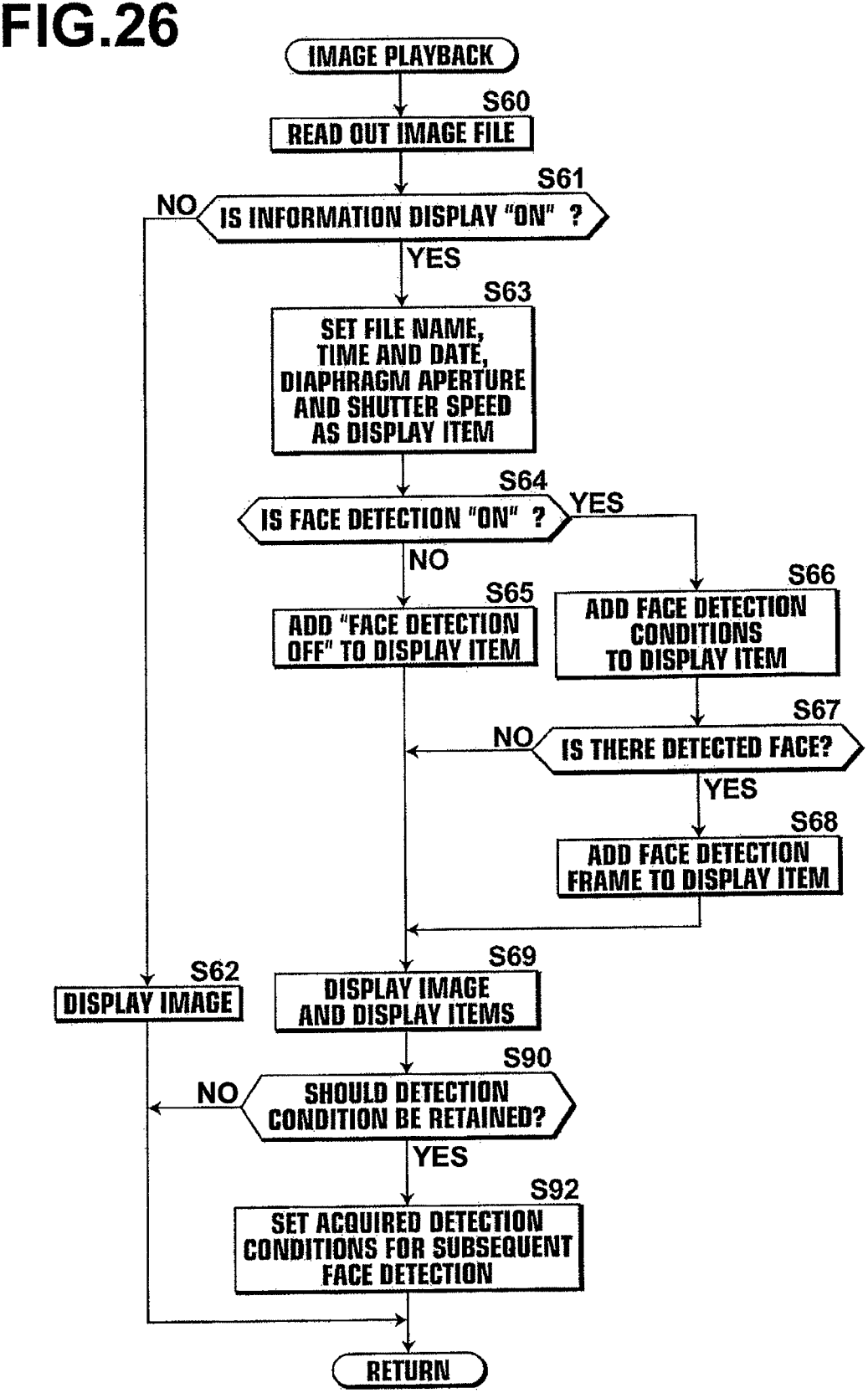
FIG. 26 is a flow chart of another image playback process.

In the digital camera 1-5 of this embodiment, the detection condition setting unit 66 can acquire the detection conditions written in the tag information of the image file and retain the acquired detection conditions, and the face detection unit 65 carries out the face detection based on the retained detection conditions. FIG. 25 illustrates a display example of the image file being played back, and FIG. 26 is a flow chart of an image playback process according to this embodiment. It should be noted that operations in the flow chart of FIG. 26 that are the same as those in the flow chart of FIG. 19 are designated by the same step numbers and are not described again here.

As shown in FIG. 26, in the image playback process carried out in the digital camera 1-5, if it is determined in step S64 that "ON" is set for the face detection (step S64: YES), the tag information display controlling unit 79 displays, on the monitor 18, the image, the display items A1 and A2-*b* including the detection conditions written in the tag information, and, if a face has been detected, the detection frame F, which is another display item, as shown in FIG. 25 (step S69). Further, an item A3 to prompt the user to select whether or not the detection conditions written in the tag information should be retained is displayed on the monitor 18.

Then, the CPU 75 determines whether or not the user has selected to retain the detection conditions (step S90). If the user has selected to retain the detection conditions (step S90: YES), the detection condition setting unit 66 reads out and acquires the detection conditions written in the tag information and retains the acquired detection conditions to set them as the detection conditions to be used for subsequent face detection operations (step S91).

In contrast, if the user has selected not to retain the detection conditions (step S90: NO), detection conditions according to a default setting, for example, are set, and the process ends.

As described above, when an image file is played back, the detection conditions and the detection frame F as the result of the face detection during the photographing operation, through which the image file was acquired, are displayed on the monitor 18, and the user checks whether a desired result of the face detection is obtained under the detection conditions displayed on the monitor 18. If the desired result is obtained, the user can determine to retain the detection conditions so that these detection conditions are applied to the subsequent face detection operations. Thus, the face detection unit 65 can stably carry out the face detection in a manner desired by the user.

The retained detection conditions may be used for the face detection carried out by the face detection unit 65 on image data acquired by the CCD 58, such as the live view, during a next photographing operation, or may be used for the face detection carried out on played back image data after the image data has been recorded in the external recording medium 70 or the internal memory (not shown).

By retaining the detection conditions which are confirmed by the user as providing a desired result in this manner in the case where the user can set the detection conditions individually via the detection condition setting unit 66, the face detection unit 65 can stably carry out the face detection in a manner desired by the user.

Figure 27:
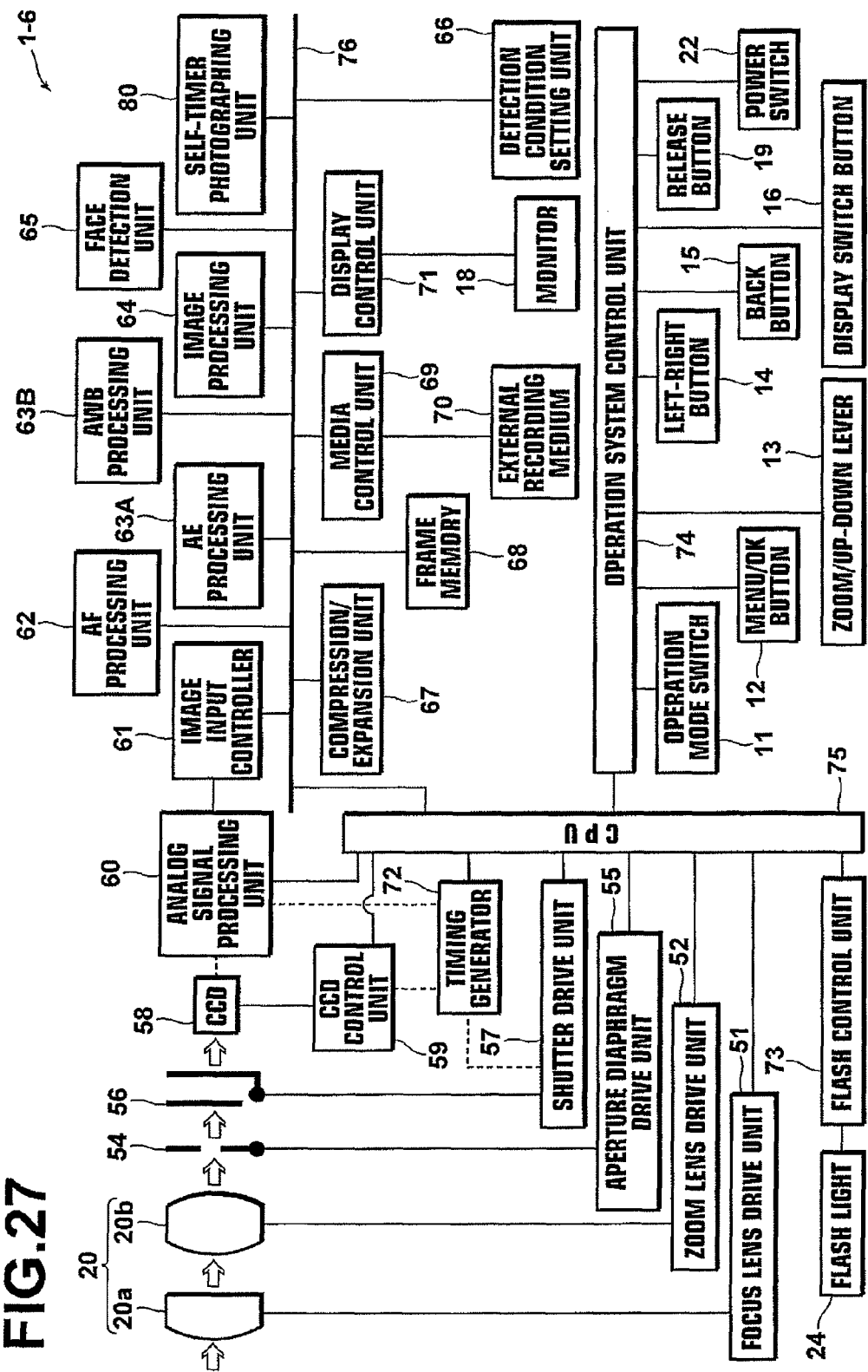
FIG. 27 is a functional block diagram of a digital camera according to a sixth embodiment of the first aspect of the invention.
Figure 28:
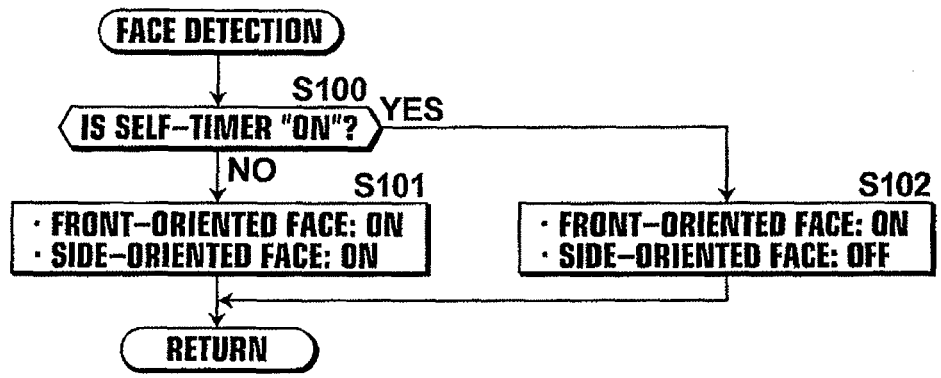
FIG. 28 is a flow chart of a face detection process that is carried out in the digital camera of FIG. 27.
Figure 29A:
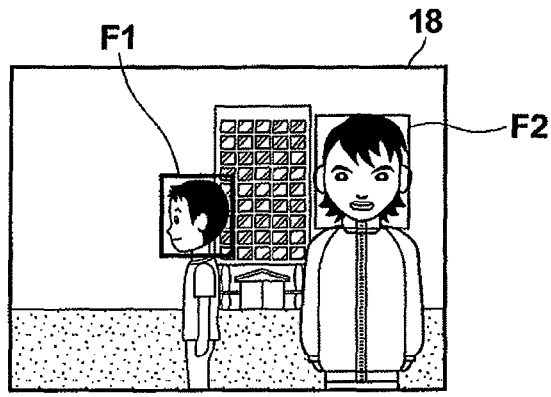
FIGS. 29A and 29B illustrates display examples of results of the face detection according to the process shown in FIG. 28.
Figure 29B:

Next, a digital camera 1-6 according to a sixth embodiment of the first aspect of the invention will be described in detail with reference to the drawings. FIG. 27 is a block diagram illustrating the functional configuration of the digital camera 1-6, FIG. 28 is a flow chart of a face detection process, and FIGS. 29A and 29B illustrates display examples of results of the face detection.

As shown in FIG. 27, the digital camera 1-6 of this embodiment includes a self-timer photographing unit 80 in addition to the configuration of the digital camera 1 of the above-described first embodiment (see FIG. 3). It should be noted that components of the digital camera 1-6 of this embodiment that are the same as the components of the digital camera 1 of the first embodiment are designated by the same symbols and are not described again here.

The self-timer photographing unit 80 includes a timer unit (not shown), which times elapse of a predetermined waiting time between a point of time at which the release button 19 is fully pressed and a point of time at which the actual exposure photographing operation is started (for example, five seconds after the release button 19 is fully pressed). This operation is controlled via the timing generator 72 such that a signal that is generated when the release button 19 is pressed is outputted to the shutter driving unit 57 when the timer unit timing the waiting time has reached 0. During the waiting time, the self-timer lamp 25 is blinked to inform the user the timing at which the actual exposure photographing operation is started.

ON or OFF of the self-timer of the self-timer photographing unit 66 may be set by the user by making a selection on the monitor 18 or by pressing a self-timer button (not shown) which may be disposed on the rear side of the body 10 of the digital camera 1-6.

Now, a face detection process carried out by the face detection unit 65 in the digital camera 1-6 having the above-described configuration is described.

In a case where the digital camera 1-6 is controlled, for example, to set an AF area at a face region which is near the center of the image when more than one faces are detected by the face detection unit 65, and the user photographs himself or herself as the subject with the digital camera 1-6 by using the self-timer, the user usually stands in front of the photographing lens 20 after the user has fully pressed the release button 19. Therefore, the user cannot know the exact position of his or her face in the image to be photographed, i.e., cannot know whether his or her face is near the center of the image, and therefore cannot check whether his or her face is set as the AF area. Therefore, if the user photographs himself or herself using the self-timer in a photographing environment where a face(s) other than the user's face is present, it is necessary to make sure that the photographing conditions such as AF are reliably aimed at the user.

In self-timer photographing operations, in general, the face of the main subject is often front-oriented with respect to the photographing lens 20. However, in a case where the face detection unit 65 is set to detect a side-oriented face and a front-oriented face according to a default setting, for example, if the user tries to photograph the main subject intended by the user (the user himself or herself, for example) in a photographing environment, as shown in FIG. 29A, where a side-oriented face F1, which is not the subject intended by the user, is present near the center of the photographing field of view, the face detection unit 65 detects both the side-oriented face F1 and a front-oriented face F2 which is the main subject. However, since the side-oriented face F1 is nearer to the center than the front-oriented face F2, the AF area is set at the face region of the side-oriented face F1.

Therefore, during a self-timer photographing operation with the digital camera 1-6 of this embodiment, the face detection unit 65 carries out the face detection based on the detection condition set by the detection condition setting unit 66 such that only a front-oriented face is detected.

As shown in FIG. 28, in the face detection process, first, the CPU 75 determines whether or not "ON" is set for the self-timer (step S100). If "ON" is not set for the self-timer (step S60: NO), the face detection unit 65 carries out the face detection based on the default detection conditions to detect both front-oriented and side-oriented faces (step S101).

In contrast, if "ON" is set for the self-timer (step S100: YES), the face detection unit 65 carries out the face detection based on the detection condition set by the user in advance via the detection condition setting unit 66 to detect only a front-oriented face and not to detect a side-oriented face (step S102).

While the self-timer photographing is "ON", the face detection unit 65 can carry out the face detection so as to detect only the front-oriented face based on the detection condition, which limits the orientation of the face to be detected, set by the user in advance via the detection condition setting unit 66. In this manner, even in the photographing environment such as one shown in FIG. 29A, the face detection unit 65 detects only the front-oriented face F2' of the main subject, as shown in FIG. 29B, and the photographing conditions such as AF can reliably be aimed at the front-oriented face of the main subject, such as the user himself or herself.

Although the detection condition is set by the user via the detection condition setting unit 66 so that a side-oriented face is not detected, in this embodiment, this is not intended to limit the invention. For example, the detection condition may be set not to detect an upward-oriented face, a downward-oriented face and/or an inclined face.

Next, embodiments of a second aspect of the photographing apparatus of the invention will be described in detail with reference to the drawings. It should be noted that the following description of the embodiments is given in conjunction with a digital camera, which is an example of the photographing apparatus of the invention. However, the applicable scope of the invention is not limited to digital cameras, and the invention is also applicable to other electronic devices with an electronic photographing function, such as a mobile phone with camera and a PDA with camera.

Figure 30:
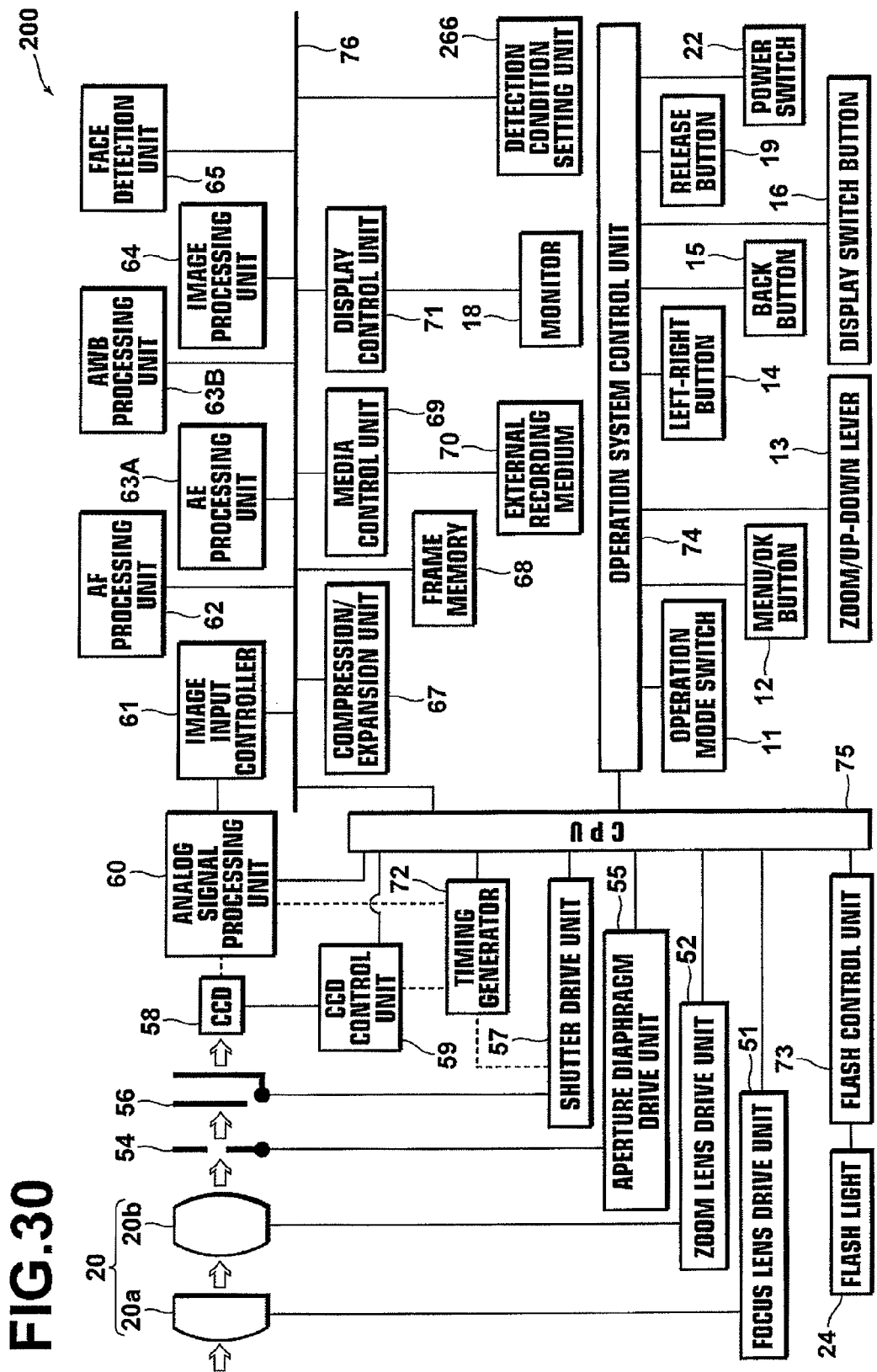
FIG. 30 is a functional block diagram of a digital camera according to a first embodiment of a second aspect of the invention.

The appearance of a digital camera 200 of this embodiment is the same as the appearance of the digital camera of the above-described embodiment shown in FIGS. 1 and 2, and therefore is not described again here. FIG. 30 is a block diagram illustrating the functional configuration of the digital camera 200 of this embodiment. It should be noted that, among the components shown in FIG. 30, the components that are the same as those shown in FIG. 3 are designated by the same symbols and are not described again here, for convenience sake.

A detection condition setting unit 266 of the digital camera 200 of this embodiment allows the user to select and set one of "detection rate-priority" and "detection speed-priority" with respect to the detection conditions for the face detection unit 65.

Figure 31:
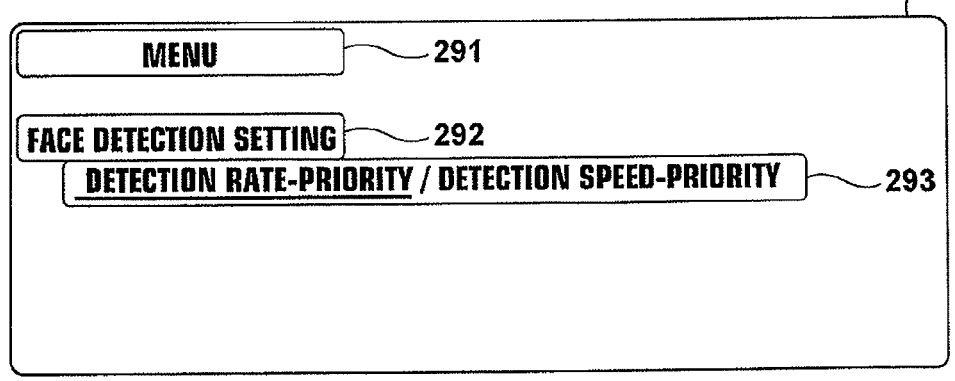
FIG. 31 illustrates an example of a menu screen that is displayed when detection conditions are set.

Now, the detection condition setting unit 266 is described in detail with reference to the drawings. FIG. 31 illustrates an example of a menu screen that is displayed when the detection conditions are set.

102481 The detection condition setting unit 266 allows the user to select one of the "detection rate-priority" and the "detection speed-priority" to set the face detection conditions, such as the orientation, size and inclination of the face to be detected and the detection area. As shown in FIG. 31, when the user has selected a "face detection setting" item 292 on a menu screen 291, the user can select at 293 the "detection rate-priority" item or the "detection speed-priority" item.

Figure 32:
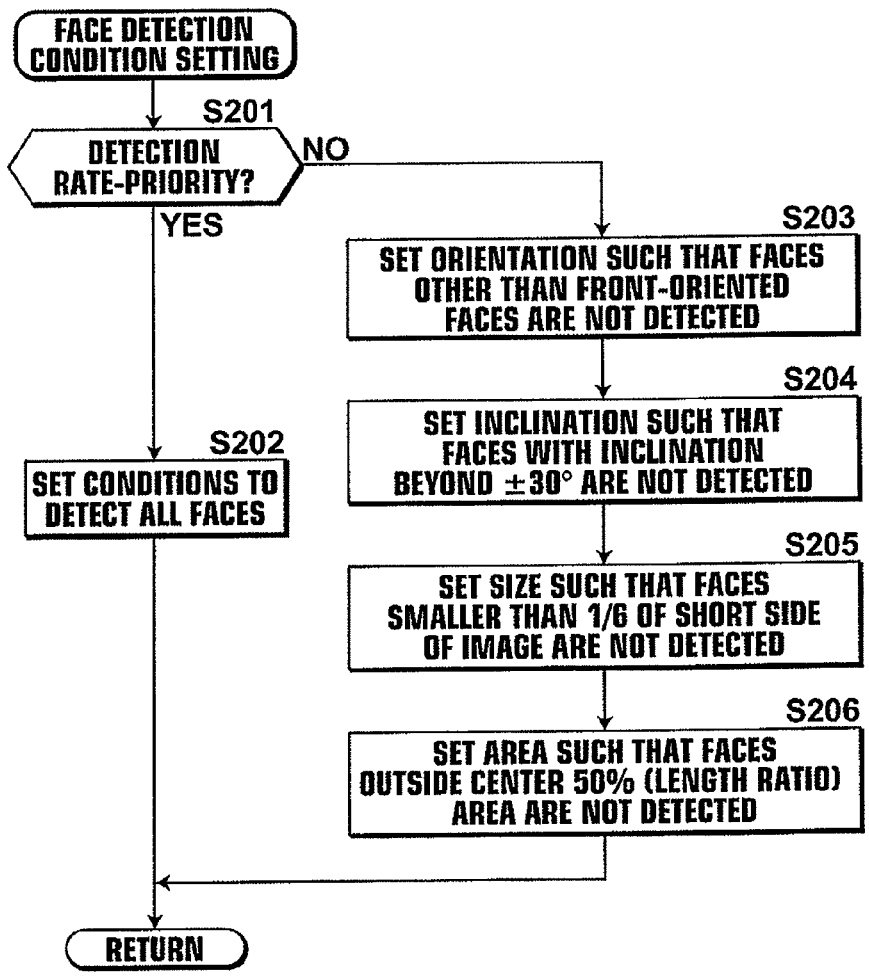
FIG. 32 is a flow chart of a face detection setting process that is carried out when the detection conditions are set.

FIG. 32 is a flow chart of a face detection condition setting process according to the setting made on the screen shown in FIG. 31. As shown in FIG. 32, in the face detection condition setting process, first, the CPU 75 determines whether or not the detection rate-priority is selected (step S201). If the detection rate-priority is selected as shown at 293 (step S201: YES), the detection condition setting unit 266 sets the detection conditions so that all faces are detected (step S202).

In contrast, if it is determined in step S201 that the detection rate-priority is not selected (step S201: NO), this means that the user has selected the detection speed-priority, and the detection condition setting unit 266 sets the detection condition with respect to the orientation of the face to be detected such that faces other than front-oriented faces are not detected (step S203), and sets the detection condition with respect to the inclination of the face to be detected such that faces with an inclination beyond ±30° are not detected (step S204).

The detection condition setting unit 266 further sets the detection condition with respect to the size of the face to be detected such that faces having a size that is smaller than 1/6 of the short side of the image are not detected (step S205), and sets the detection condition with respect to the detection area such that faces outside the center 50% (in length ratio) area are not detected (step S206).

It should be noted that the detection conditions with respect to the orientation, inclination and size of the face to be detected and the detection area that are used when the "detection speed-priority" is selected are set to limit the face to be detected so that the number of detected faces is smaller than those detected when the "detection rate-priority" is selected, in order to shorten the time taken for the face detection to improve followability.

Further, the detection conditions used when the "detection speed-priority" is selected and when the "detection rate-priority" is selected may be determined in advance by the designer of the digital camera 200, or may be individually set by the user.

As described above, the digital camera 200 allows the user to set the detection conditions by manually selecting one of the "detection rate-priority" and the "detection speed-priority", which explicitly tell the effect achieved by the detection conditions being set. Therefore, such a situation that the user is confused about the effect of the setting when the user widens or narrows the range of the face to be detected can be avoided, and the user can easily set the detection conditions depending on the scene to be photographed with a desired balance between the detection rate and the detection speed. Thus, the user can select the "detection speed-priority" to photograph an active scene, such as an athletic meet, to increase the speed of the face detection, or can select the "detection rate-priority" to photograph, for example, a group photo to increase the rate of the face detection.

Figure 33:
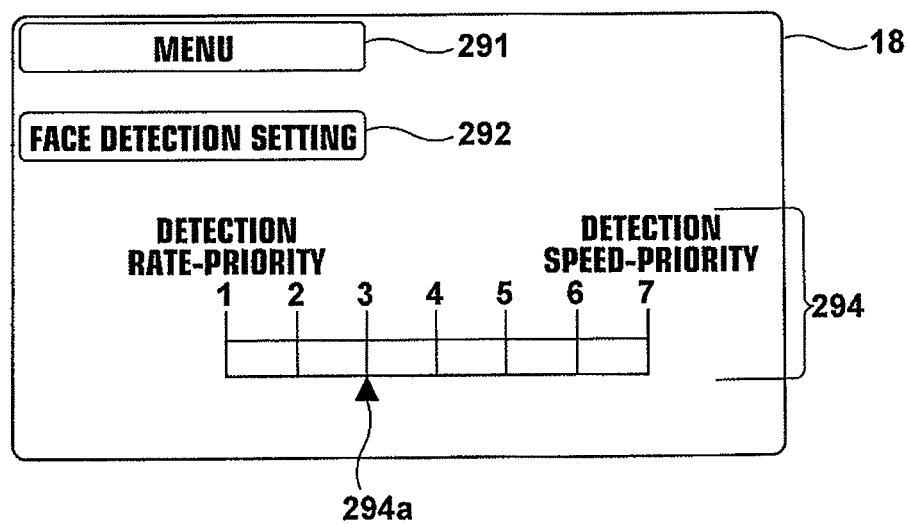
FIG. 33 illustrates another example of the menu screen that is displayed when the detection conditions are set.

The selection between the "detection rate-priority" and the "detection speed-priority" may not be a selection between two choices as described above, and may be carried out in a stepwise fashion. FIG. 33 illustrates another example of the menu screen that is displayed when the detection conditions are set, and FIG. 34 is a flow chart of a face detection condition setting process according to the setting made on the menu screen shown in FIG. 33.

As shown in FIG. 33, the stepwise selection is achieved by setting, for example, seven levels in the range of the condition setting between the detection rate-priority and the detection speed-priority, and assigning numbers 1 to 7 to the respective levels. These numbers are displayed along a scale, as shown at 294, to allow the user to select one of the numbers by moving a cursor 294a by manipulating, for example, the right-left button 14. The seven levels include the maximum levels of the detection rate-priority and the detection speed-priority, and "1" is assigned to the maximum level of the detection rate-priority and "7" is assigned to the maximum level of the detection speed-priority.

Figure 34:
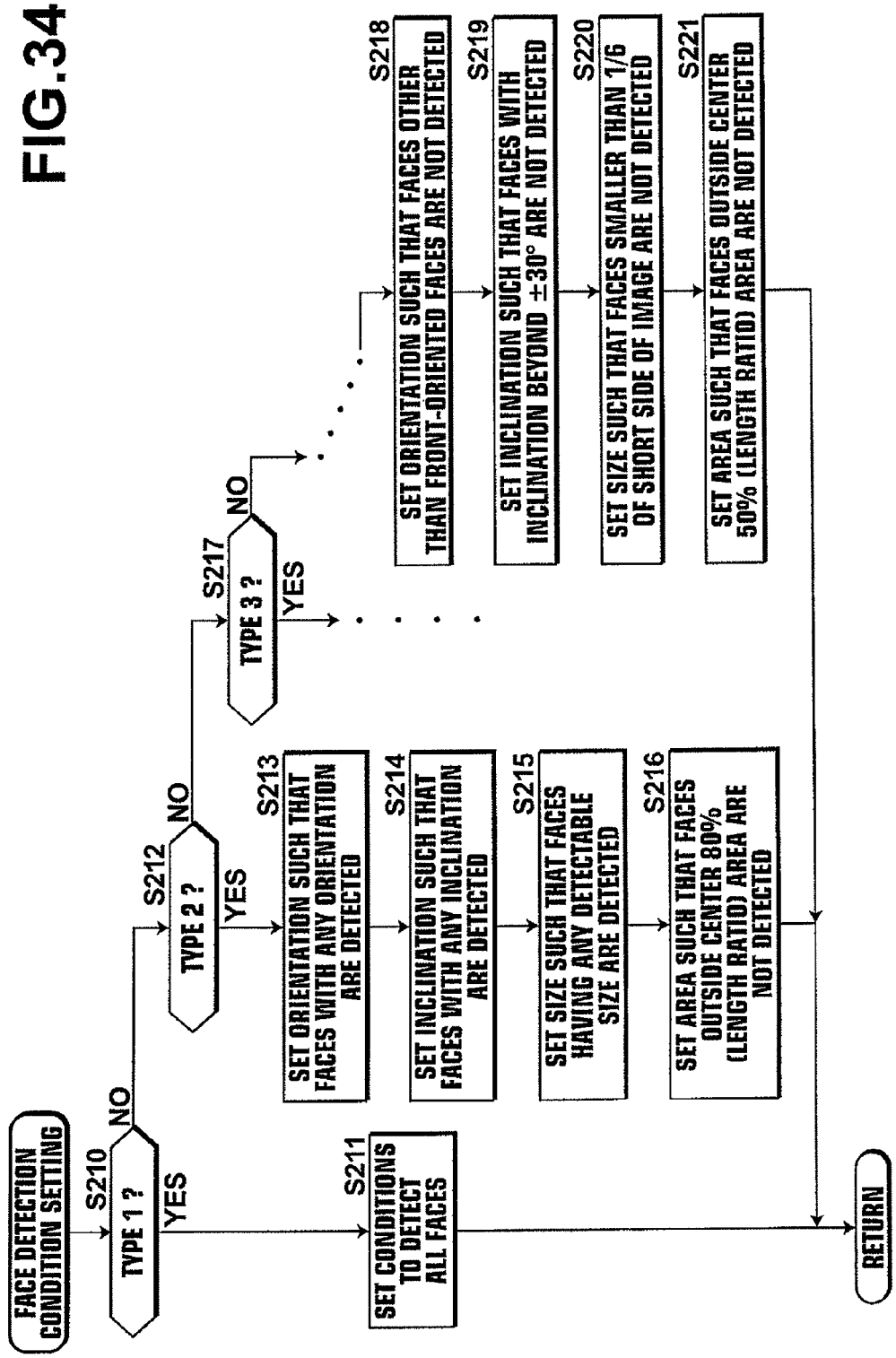
FIG. 34 is a flow chart of another face detection setting process that is carried out when the detection conditions are set.

As shown in FIG. 34, in the face detection setting process, first, the CPU 75 determines whether or not "1" is selected, in order to determine which of the numbers is selected at 294 shown in FIG. 33 (step S210). If "1" is selected (step S210: YES), the detection condition setting unit 266 determines that the user put the highest priority on the detection rate, and sets the detection conditions such that all faces are detected (step S211).

In contrast, if "1" is not selected (step S210: NO), the CPU 75 determines whether or not "2" is selected (step S212). If "2" is selected (step S212: YES), the detection condition setting unit 266 determines that the user put a priority on the detection rate but the priority thereof is lower than that indicated by level "1", and sets the detection condition with respect to the orientation of the face to be detected such that faces with any orientation are detected (step S213), sets the detection condition with respect to the inclination of the face to be detected such that faces with any inclination are detected (step S214), sets the detection condition with respect to the size of the face to be detected such that faces having any size within a detectable range are detected (step S215), and sets the detection condition with respect to the detection area such that faces outside an center 80% (in length ratio) area of the image are not detected (step S216).

If "2" is not selected, the CPU 75 determines whether or not "3" is selected (step S217). If "3" is selected (step S217: YES), this means that the user put a priority on the detection rate but the priority thereof is lower than that indicated by level "2", i.e., a priority on the detection speed is higher than that indicated by level "2", and the detection condition setting unit 266 sets limitations on the detection conditions with respect to the orientation, the inclination and the size of the face to be detected and the detection area such that the number of detected faces is smaller than those detected under the level "2" conditions.

Similarly, if "7" is selected, the detection condition setting unit 266 sets limitations on the detection conditions with respect to the orientation, the inclination and the size of the face to be detected and the detection area such that the detection speed is the highest, i.e., the number of detected faces is the smallest. If one of the numbers "4" to "6" is selected, the detection condition setting unit 266 sets the detection conditions such that the larger the selected number, the smaller the number of detected faces.

In this manner, the stepwise selection between the "detection rate-priority" and the "detection speed-priority" can be achieved. The detection conditions to be set when one of the levels "1" to "7" is selected may be determined in advance by the designer of the digital camera 200, or may be set individually by the user.

As described above, the user can set the detection conditions by manually selecting one of the levels "1" to "7" set in a stepwise fashion between the maximum levels of the "detection rate-priority" and the "detection speed-priority", which explicitly tell the effect achieved by the detection conditions being set. Therefore, such a situation that the user is confused about the effect of the setting when the user widens or narrows the range of the face to be detected can be avoided, and the user can easily set the detailed detection conditions depending on the scene to be photographed with a desired balance between the detection rate and the detection speed. Thus, the user can select one of the levels nearer to the "detection speed-priority" to photograph an active scene, such as an athletic meet, to increase the speed of the face detection, or can select one of the levels nearer to the "detection rate-priority" to photograph, for example, a group photo to increase the rate of the face detection.

Figure 35:
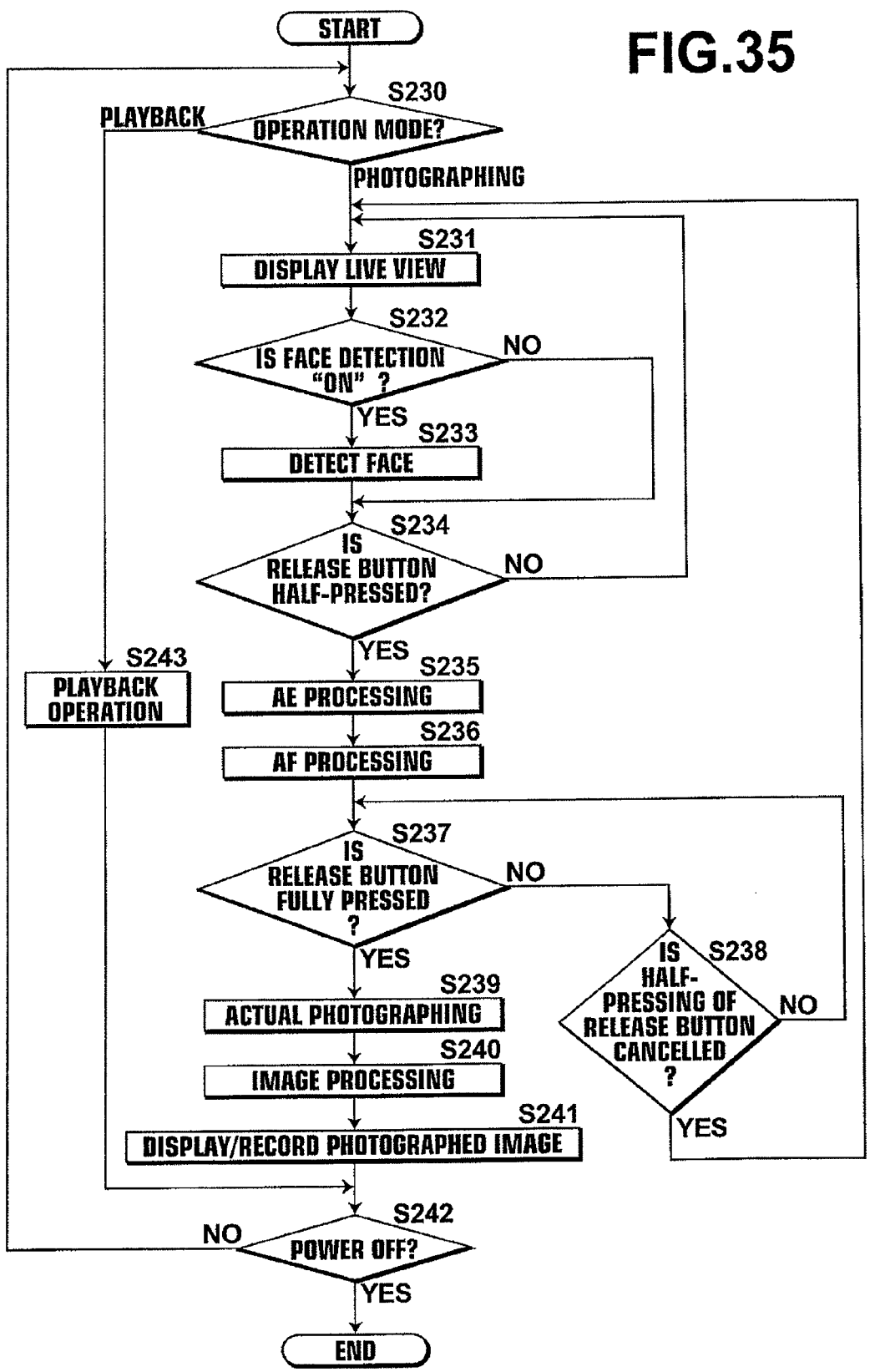
FIG. 35 is a flow chart of a series of operations carried out in the digital camera.

Now, a series of operations carried out in the digital camera 200 with the face detection conditions being set as described above are described. FIG. 35 is a flow chart of the series of operations carried out in the digital camera 200.

First, as shown in FIG. 35, the CPU 75 determines whether the operation mode is the photographing mode or the playback mode according to the setting of the operation mode switch 11 (step S230). If the operation mode is the playback mode (step S230: play back), a playback operation is carried out (step S233). In the playback operation, the media controlling unit 69 reads out an image file stored in the external recording medium 70 and displays on the monitor 18 an image based on image data contained in the image file. When the playback operation has been finished, the CPU 75 determines whether or not the power switch 22 of the digital camera 200 has been turned off (step S232). If the power switch 22 is not turned off (step S232: NO), the CPU 75 moves the process to step S230. If the power switch 22 has been turned off (step S232: YES), the digital camera 200 is powered off, and the process ends.

In contrast, if it is determined in step S230 that the operation mode is the photographing mode (step S230: photographing), the CPU 75 controls the display of the live view (step S231). Then, the CPU 75 determines whether or not the face detection button 27 is set as "ON" (step S232). If the face detection button 27 is set as "ON" (step S232: YES), the face detection unit 65 continuously carries out the face detection operation on the live view based on the detection conditions set as described above by the detection condition setting unit 266 (step S233). If the face detection button 27 is not set as "ON" (step S232: NO), the CPU 75 moves the process to step S234.

Then, the CPU 75 determines whether or not the release button 19 is half-pressed (step S234). If the release button 19 is not half-pressed (step S234: NO), the CPU 75 moves the process to step S231, and repeats the operations in step S231 and the following steps.

If the release button 19 is half-pressed (step S234: YES), the AE processing unit 63A carries out the AE processing (step S235), and the AF processing unit 62 carries out the AF processing (step S236). At this time, the AWB processing unit 63B may carry out the AWB processing.

Then, the CPU 75 determines whether or not the release button 19 is fully pressed (step S237). If the release button 19 is not fully pressed (step S237: NO), then, the CPU 75 determines whether or not the half-pressing of the release button 19 is cancelled (step S238). If the half-pressing is not cancelled (step S238: NO), the CPU 75 moves the process to step S237. If the half-pressing is cancelled (step S238: YES), the CPU 75 moves the process to step S231.

In contrast, if the release button 19 is fully pressed (step S237: YES), an actual photographing operation is carried out (step S239). As the actual photographing operation has been carried out (step S239), the image processing unit 64 applies image processing to an actually photographed image acquired by the actual photographing operation (step S240). At this time, the data of the actually photographed image subjected to the image processing may further be compressed by the compression/decompression processing unit 67 to generate an image file.

Then, the CPU 75 displays the actually photographed image, which has been subjected to the image processing, on the monitor 18 via the display controlling unit 71, and records the data of the actually photographed image on the external recording medium 70 via the media controlling unit 69 (step S241). Subsequently, the CPU 75 determines whether or not the power switch 22 has been turned off (step S242). If the power switch 22 has been turned off (step S242: YES), the digital camera 200 is powered off, and the process ends. If the power switch 22 is not turned off (step S242: NO), the CPU 75 moves the process to step S230, and repeats the operations in step S230 and the following steps. In this manner, photographing with the digital camera 200 is carried out.

Figure 36:
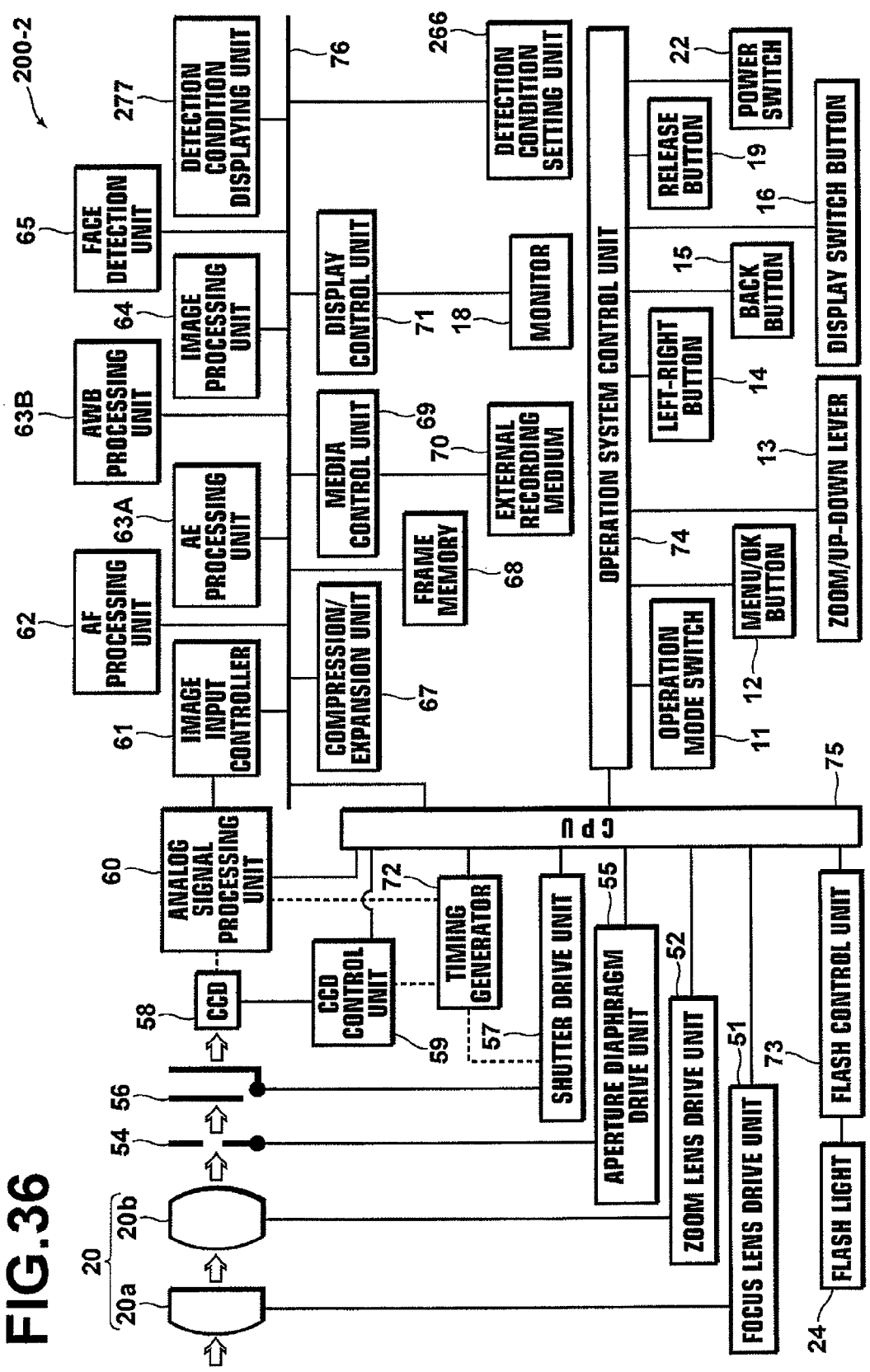
FIG. 36 is a functional block diagram of a digital camera according to a second embodiment of the second aspect of the invention.
Figure 37A:
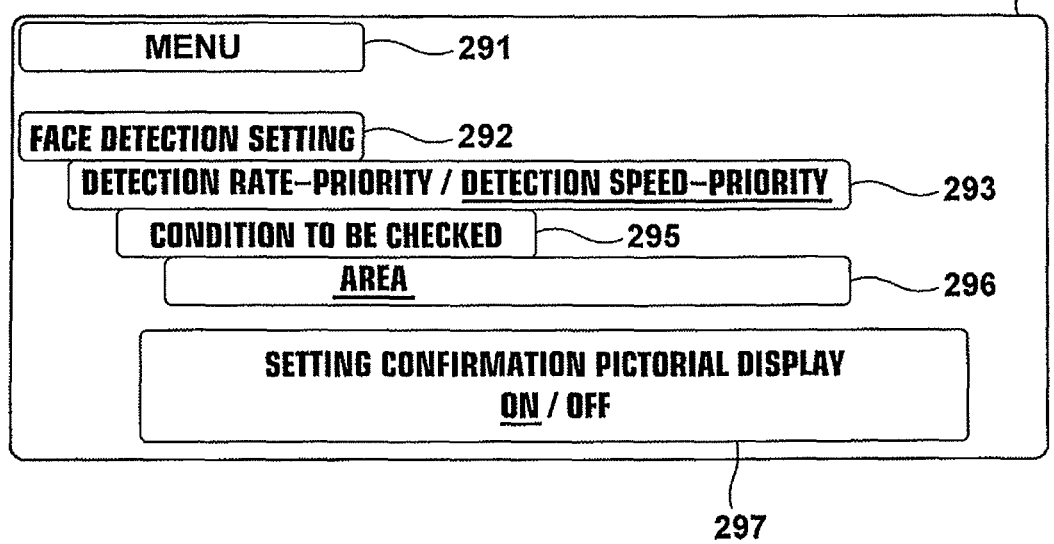
FIG. 37A illustrates an example of a menu screen that is displayed when the detection conditions are set in the digital camera of FIG. 36.
Figure 37B:
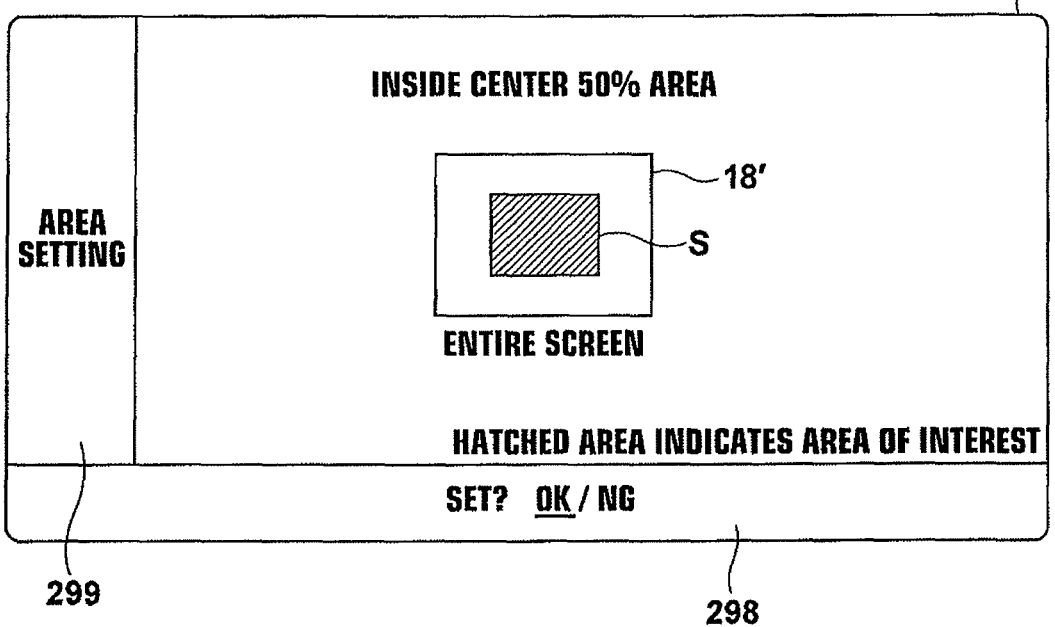
FIG. 37B illustrates an example of the pictorial display in this case.

Next, a digital camera 200-2 according to a second embodiment of the second aspect of the invention will be described in detail with reference to the drawings. FIG. 36 is a block diagram illustrating the functional configuration of the digital camera 200-2, FIG. 37A illustrates an example of a menu screen that is displayed when the detection conditions are set, and FIG. 37B illustrates an example of a pictorial display that is displayed in this case.

As shown in FIG. 36, the digital camera 200-2 of this embodiment includes a detection condition displaying unit 277 in addition to the configuration of the digital camera 200 of the above-described embodiment. It should be noted that components of the digital camera 200-2 of this embodiment that are the same as the components of the digital camera 200 of the above-described embodiment are designated by the same symbols and are not described again here.

The detection condition displaying unit 277 displays the detection conditions set by the detection condition setting unit 266. In a case where the detection condition with respect to the detection area, for example, is displayed for confirmation, a selection item 296 for allowing the user to select the detection condition to be checked is displayed on the monitor 18, as shown in FIG. 37A, so that the user can specify "area" by manipulating, for example, the zoom/up-down lever 13.

Then, a selection item 297 for allowing the user to select "ON" or "OFF" of the setting confirmation pictorial display is displayed on the monitor 18. If the user has selected "ON" by manipulating, for example, the right-left button 14, a text "area setting" 299 is displayed at the left of the screen, and a pictorial display of the result of the setting of the detection area, i.e., the face detection condition, is displayed at the right of the screen, as shown in FIG. 37B.

As shown in FIG. 37B, the pictorial display contains the "entire screen" figure 18' representing the monitor 18 and the "detection area of interest" figure S representing the search area within the "entire screen" figure 18'. Further, when the "detection speed-priority" is selected at the item 293 shown in FIG. 37A, a text "inside center 50% area" based on the length ratio value (50% in this embodiment) set in advance for the detection speed-priority is displayed above the "entire screen" figure 18', for example, and a text "hatched area indicates area of interest" is displayed at the lower right area.

Then, in the same manner as described above, an item 298 for allowing the user to select whether or not the detection condition represented by the pictorial display should be set is displayed at the bottom area of the setting screen, so that the user can select "OK" or "NG" by manipulating, for example, the right-left button 14. This allows the user to visually check whether the range of the detection area based on the detection condition set in advance for the "detection speed-priority", which is selected via the detection condition setting unit 266, is intended by the user, to avoid a detection condition not intended by the user being set.

Figure 38:
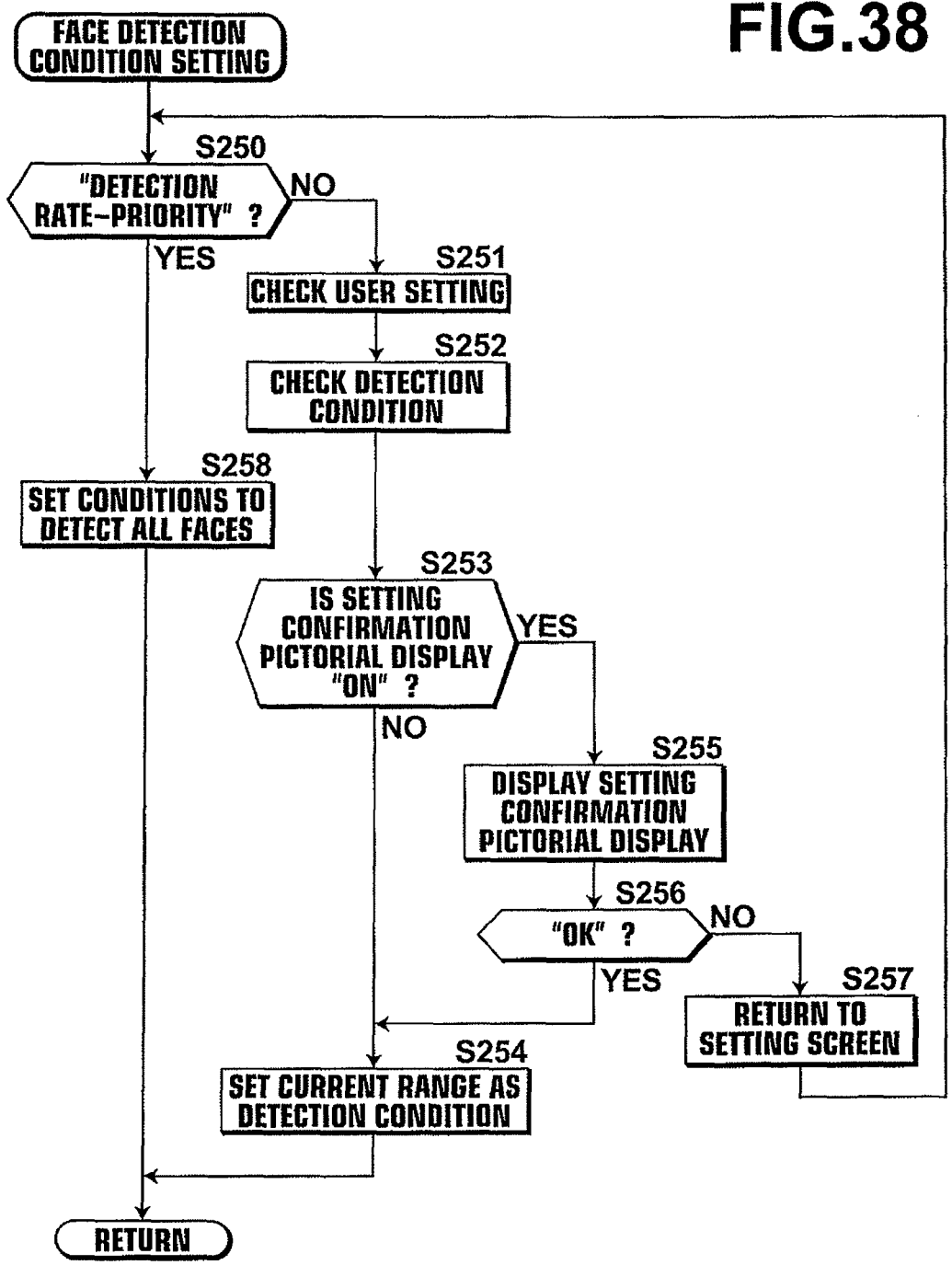
FIG. 38 is a flow chart of a face detection condition setting process according to setting shown in FIGS. 37A and 37B, FIGS. 39A and 39B illustrate examples of the setting confirmation display that is displayed when the detection conditions are set.

FIG. 38 is a flow chart of a face detection condition setting process according to the setting made on the screens shown in FIGS. 37A and 37B. First, the CPU 75 determines whether or not the "detection rate-priority" is selected at 293 shown in FIG. 37A (step S250). If the "detection rate-priority" is not selected at 293 (step S250: NO), the CPU 75 checks the setting made by the user (step S251), and checks the detection condition specified by the user (the detection area in this embodiment) (step S252).

Then, the CPU 75 determines whether or not "ON" is selected at 297 shown in FIG. 37A for the setting confirmation pictorial display (step S253). If "ON" is not selected (step S253: NO), the detection condition with respect to the detection area that is set in advance for the detection speed-priority is set without displaying the setting confirmation pictorial display (step S254).

In contrast, if "ON" is selected (step S253: YES), the detection condition displaying unit 277 displays the pictorial display representing the detection area, as shown in FIG. 37B, based on the detection condition with respect to the detection area set in advance for the detection speed-priority, which has been selected via the detection condition setting unit 266 (step S255). Then, the CPU 75 determines whether or not "OK" is selected by the user for the current setting (step S256).

If "OK" is selected for the current setting (step S256: YES), the CPU 75 moves the process to step S254, and sets the current range of the detection condition for the face detection (step S254). At this time, if the user wishes to check another detection condition, such as the "inclination", using the pictorial display, the user select "NG" for the setting, and then selects an "inclination" item (not shown) at 296 under a "condition to be checked" item 295 on the setting screen shown in FIG. 37A, so that the pictorial display of the detection condition with respect to the inclination is displayed.

In contrast, if "OK" is not selected for the current setting (step S256: NO), the CPU 75 determines that the current detection range set as the detection area is not desired by the user, and returns the display on the monitor 18 to the setting screen shown in FIG. 37A so that the user can set the "detection rate-priority" or the "detection speed-priority" again (step S257). Then, the CPU 75 moves the process to step S250.

If it is determined in step S250 that the "detection rate-priority" is selected (step S250: YES), the face detection conditions are set such that all faces are detected (step S258). In this manner, the face detection condition setting process is carried out.

By displaying the pictorial display representing the detection condition set in advance by the detection condition setting unit 266 based on the "detection rate-priority" or the "detection speed-priority" selected by the user, as described above, the user can visually check whether the currently set detection range is intended by the user, and erroneous setting of the detection condition can be avoided to avoid a situation that faces with orientations, sizes, or other conditions which are not intended by the user are detected.

Figure 39A:
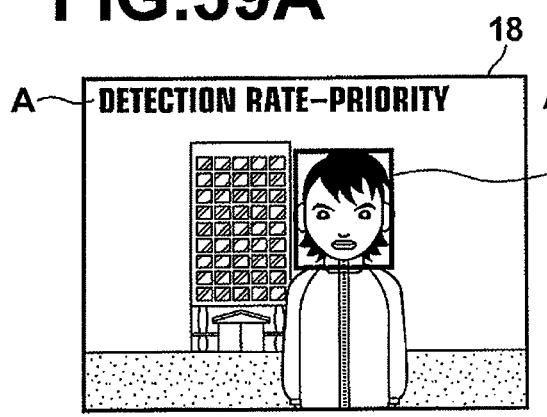
Figure 39B:
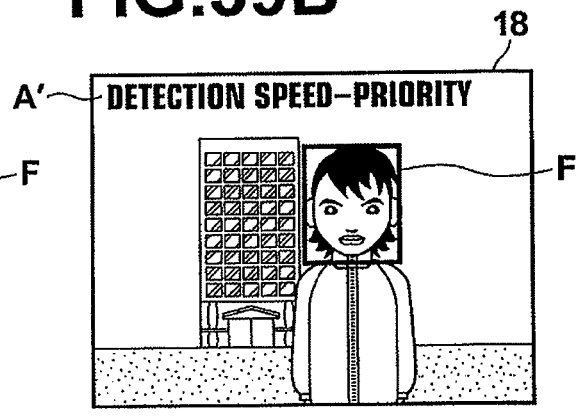
Figure 40A:
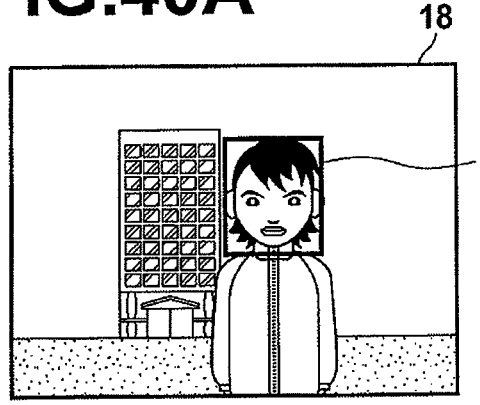
FIGS. 40A and 40B illustrate other examples of the setting confirmation display that is displayed when the detection conditions are set.
Figure 40B:
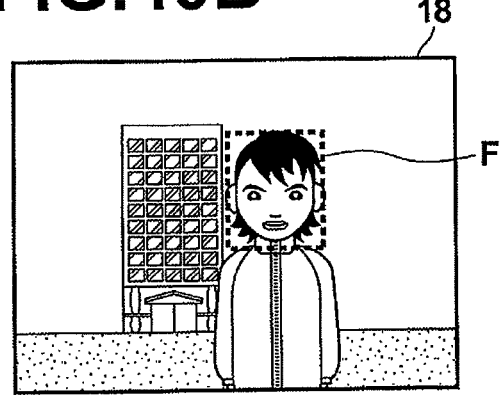

Although the pictorial display is displayed for confirming the face detection condition in the digital camera 200-2 of this embodiment, this is not intended to limit the invention. The display for confirming the face detection condition may be made in other forms, such as a textual display. FIG. 39A illustrates an example of the textual display that is displayed when the detection rate-priority is selected, FIG. 39B illustrates an example of the textual display that is displayed when the detection speed-priority is selected, FIG. 40A illustrates another example of the setting confirmation display that is displayed when the detection rate-priority is selected, and FIG. 40B illustrates another example of the setting confirmation display that is displayed when the detection speed-priority is selected.

As shown in FIG. 39A, for example, if the "detection rate-priority" is selected by the user, a text "detection rate-priority" designated by A, which indicates that the user puts a priority on the detection rate, is displayed at the upper left area of the screen. Further, as shown in FIG. 39B for example, if the "detection speed-priority" is selected by the user, a text "detection speed-priority" designated by A', which indicates that the user puts a priority on the detection speed, is displayed at the upper left area of the screen.

Figure 41:
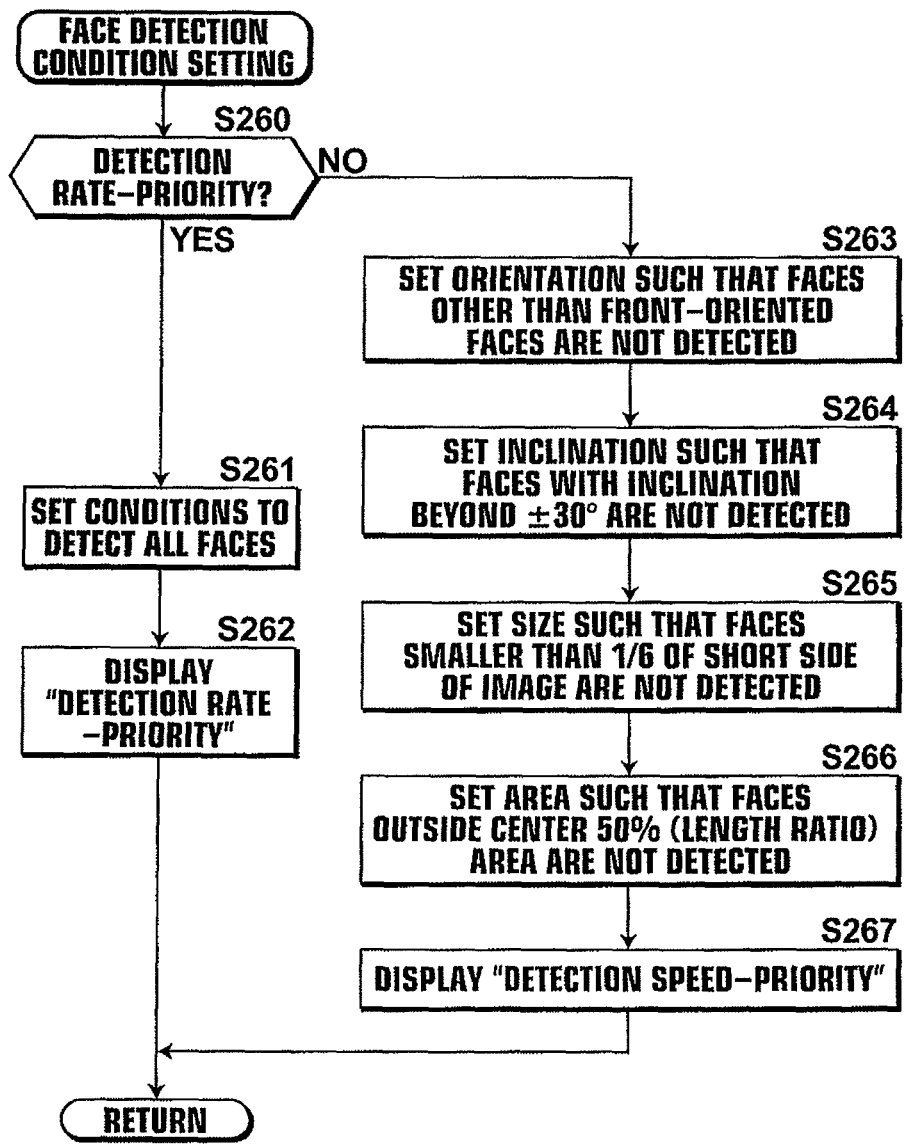
FIG. 41 is a flow chart of a face detection condition setting process according to setting shown in FIGS. 39A and 39B.

FIG. 41 is a flow chart of a face detection condition setting process according to this embodiment. As shown in FIG. 41, first, the CPU 75 determines whether or not the detection rate-priority is selected (step S260). If the detection rate-priority is selected (step S260: YES), the detection condition setting unit 266 sets the detection conditions such that all faces are detected (step S261), and the detection condition displaying unit 277 displays the text "detection rate-priority", as designated by A in FIG. 39A (step S262).

In contrast, if it is determined in step S260 that the detection rate-priority is not selected (step S260: NO), this means that the detection speed-priority is selected by the user, and the detection condition setting unit 266 sets the detection condition with respect to the orientation of the face to be detected such that faces other than front-oriented faces are not detected (step S263), and sets the detection condition with respect to the inclination of the face to be detected such that faces with an inclination beyond ±30° are not detected (step S264).

The detection condition setting unit 266 further sets the detection condition with respect to the size of the face to be detected such that faces having a size that is smaller than ⅙ of the short side of the image are not detected (step S265), and sets the detection condition with respect to the detection area such that faces outside the center 50% (in length ratio) area are not detected (step S266). Then, the detection condition displaying unit 277 displays the text "detection speed-priority", as designated by A' in FIG. 39B (step S267). In this manner, the setting process is carried out.

It should be noted that the setting confirmation display may be carried out before the face detection by the face detection unit 65 is started, to prompt the user to select whether or not the currently displayed "detection rate-priority" or "detection speed-priority" i.e., the detection conditions corresponding to the "detection rate-priority" or the "detection speed-priority" should be set. This allows the user to visually check whether the detection conditions set by the detection condition setting unit 266 is the detection conditions for the detection rate-priority or the detection speed-priority intended by the user, thereby avoiding a detection condition not intended by the user being set.

As shown in FIGS. 39A and 39B, the setting confirmation display may be displayed on the live view together with the face detection frame F, which indicates the result of the face detection by the face detection unit 65. In this case, if the "detection rate-priority" is selected by the user, the frame F surrounding the detected face may be displayed in solid lines, as shown in FIG. 40A, and if the "detection speed-priority" is selected by the user, the frame F surrounding the detected face may be displayed in dotted lines, as shown in FIG. 40B, to discriminate between the detection rate-priority and the detection speed-priority. The discrimination between the detection rate-priority and the detection speed-priority can be achieved by changing the color, shape, line type, or the like, of the frame F.

By displaying on the imaging screen the indication of the detection rate-priority or the detection speed-priority currently set by the user in this manner, a situation such that a face detection result obtained under detection conditions which are not intended by the user is used, for example, for AF processing can be avoided.

Figure 42:
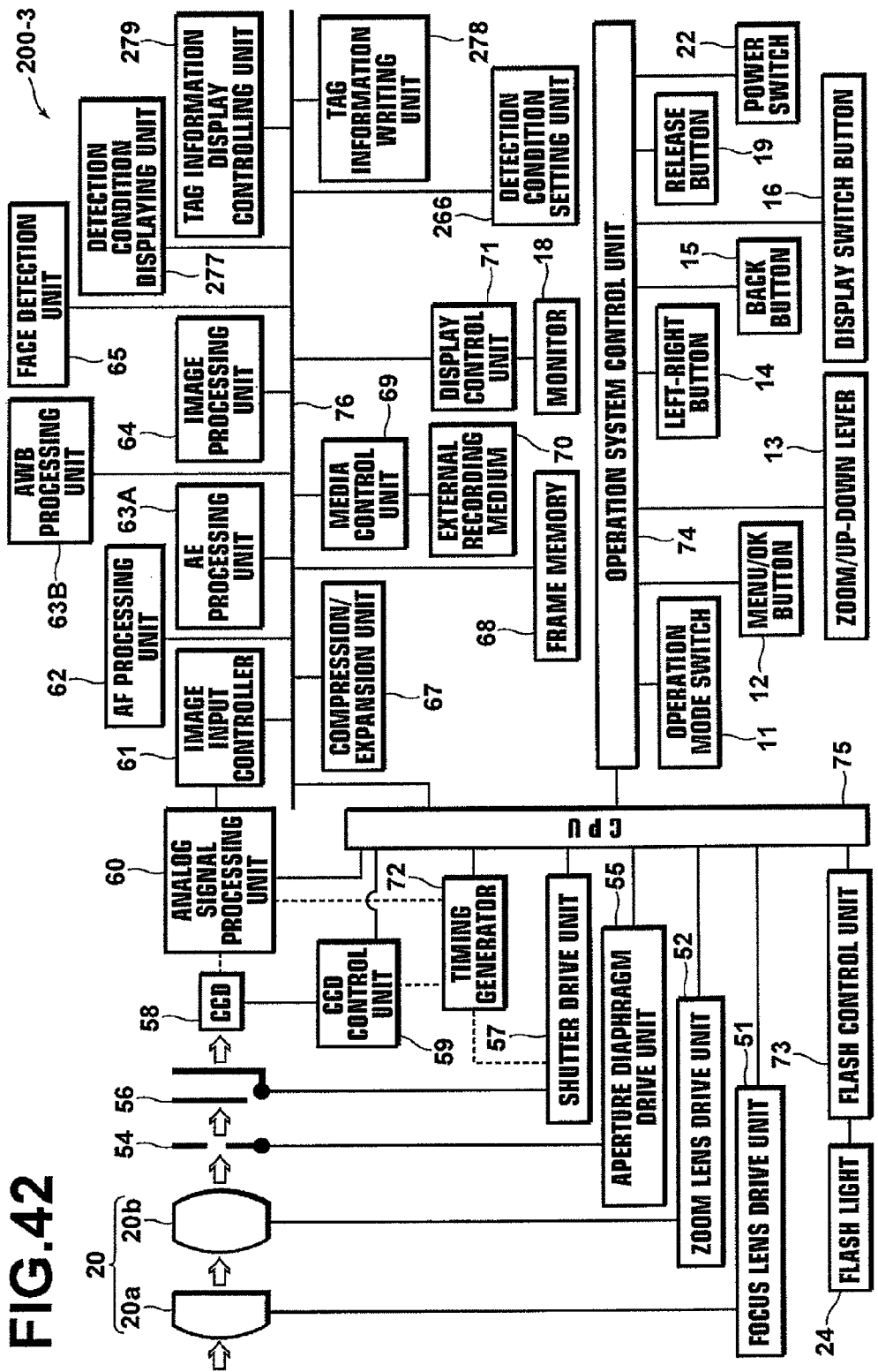
FIG. 42 is a functional block diagram of a digital camera according to a third embodiment of the second aspect of the invention.

Next, a digital camera 200-3 according to a third embodiment of the second aspect of the invention will be described in detail with reference to the drawings. FIG. 42 is a block diagram illustrating the functional configuration of the digital camera 200-3, FIG. 43 illustrates one example of tag information written in an image file, and FIGS. 44A-44D illustrate examples of the tag information displayed when image files are played back.

As shown in FIG. 42, the digital camera 200-3 of this embodiment includes a tag information writing unit 278 and a tag information display controlling unit 279 in addition to the configuration of the digital camera 200-2 of the above-described embodiment. It should be noted that components of the digital camera 200-3 of this embodiment that are the same as the components of the digital camera 200-2 of the above-described embodiment are designated by the same symbols and are not described again here.

When an image file, which has been generated by the compression/decompression processing unit 67, and the like, is recorded in the external recording medium 70 or the internal memory (not shown), the tag information writing unit 278 writes the detection conditions in the tag information of the image file. As shown in FIG. 43 for example, the tag information to be written may include setting items under a "face detection setting" item 220, such as a "face detection ON/OFF" item 221, an "orientation" item 222, an "inclination" item 223, a "size" item 224 and an "area" item 225. In this example, the "face detection ON/OFF" 221 is "ON", the "orientation" 222 is "front-oriented", the "inclination" 223 is "all directions", the "size" 224 is "1/8-1/2", and the "area" 225 is "center 50% (inside)". At this time, information of the "detection rate-priority" or the "detection speed-priority" selected by the user may also be written in the tag information.

With the detection conditions written in the tag information in this manner, compatibility with an application for, for example, lightness correction or color correction, which uses the result of the face detection, can be enhanced.

Figure 45:
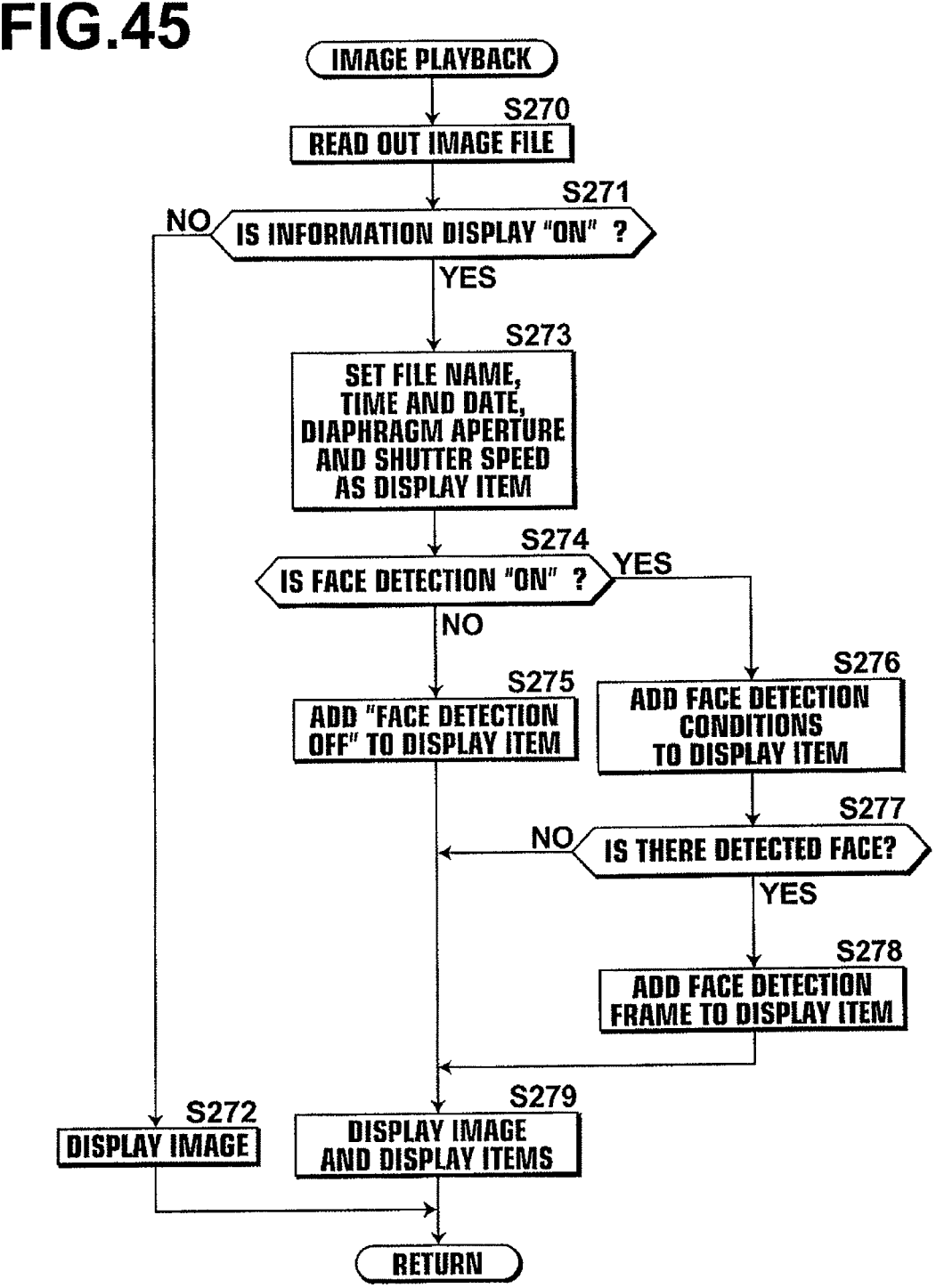
FIG. 45 is a flow chart of an image playback process.

When the image file which has the tag information written by the tag information writing unit 278, as described above, is displayed on the monitor 18, the tag information display controlling unit 279 displays on the monitor 18 the detection conditions written in the tag information. FIG. 45 is a flow chart of an image playback process according to this embodiment.

The image playback process is carried out when the operation mode of the digital camera 200-3 is set as the playback mode (see step S243 in FIG. 35). First, as shown in FIG. 45, the media controlling unit 69 reads out an image file stored in the external recording medium 70 (step S270), and the CPU 75 determines whether or not "ON" is set for tag information display (step S271). The "ON" or "OFF" of the tag information display may be set by the user through manipulation of a suitable button and/or lever, or may automatically be set as "ON" when the read out image file has the tag information written therein.

If "ON" is set for the tag information display (step S271: YES), the tag information display controlling unit 279 sets information such as the file name, the time and date, the diaphragm aperture and the shutter speed as a display item A1 (step S273).

Then, the CPU 75 determines whether or not "ON" is set for the face detection unit 65 (step S274). If "ON" is not set for the face detection (step S274: NO), the tag information display controlling unit 279 adds information which indicates that the face detection is "OFF" as a display item A2 to the display item (step S275), and displays the image with the display items A1 and A2 according to the tag information on the monitor 18 (step S279).

Figure 44A:
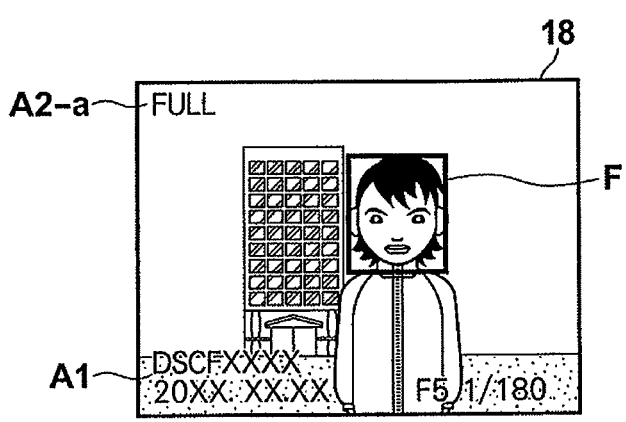
FIGS. 44A-44D illustrate examples of the tag information that is displayed when an image file is played back.
Figure 44B:
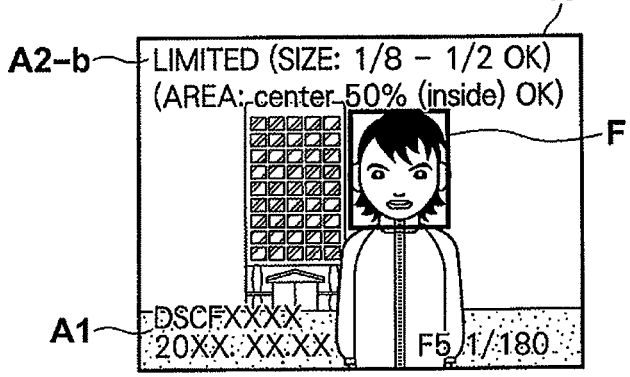
Figure 44C:
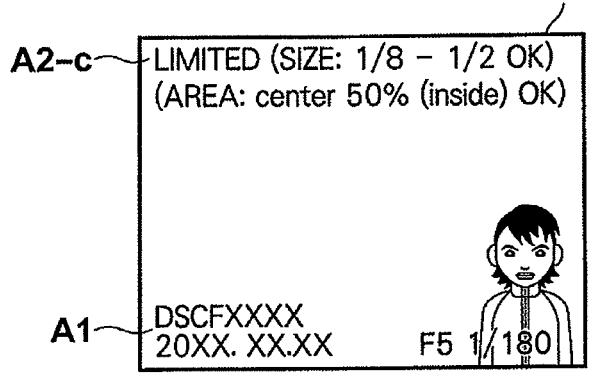
Figure 44D:
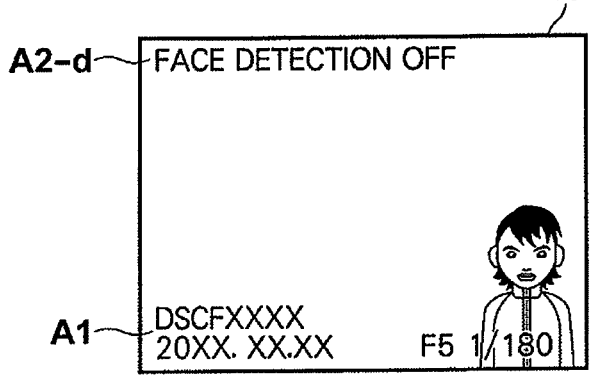

The display on the monitor 18 in this case includes, as shown in FIG. 44D for example, the image data, a text "DSCFXXXX, 20XXXXXX, F5 1/180" representing the content written in the tag information as the display item A1, which is displayed at an area of the screen below the image data, and a text "FACE DETECTION OFF" representing the content written in the tag information, i.e., indicating that the face detection is "OFF", as the display item A2-d, which is displayed at the upper area of the screen.

In contrast, if it is determined in step S274 that "ON" is set for the face detection (step S274: YES), the tag information display controlling unit 279 adds the face detection conditions set by the detection condition setting unit 266 as the display item A2 to the display items (step S276), and the CPU 75 determines whether or not there is a detected face (step S277). If no face is detected (step S277: NO), the image and the display items A1 and A2 according to the tag information are displayed on the monitor 18 (step S279).

The display on the monitor 18 in this case includes, as shown in FIG. 44C for example, the image data, a text "DSCFXXXX, 20XX.XXXX, F5, 1/180" representing the content written in the tag information as the display item A1, which is displayed at an area of the screen below the image data, and a text "LIMITED (SIZE: 1/8-1/2 OK) (AREA: center 50% (inside) OK)" representing the content written in the tag information, i.e., indicating as the limitations on the detection conditions that the range of the size of the face to be detected is from 1/8 to 1/2 of the length of the short side of the photographed image and that the detection area is inside the center 50% (in length ratio) area of the photographed image as the display item A2-c. At this time, if the tag information contains the information of the "detection rate-priority" or the "detection speed-priority" selected by the user, a text "detection rate-priority" or "detection speed-priority" may be displayed on the monitor 18.

If it is determined in step S277 that there is a detected face (step S277: YES), the tag information display controlling unit 279 adds the face detection frame F to the display items (step S278), and the image, the display items A1 and A2 according to the tag information, and the detection frame F, which is another display item, are displayed on the monitor 18 (step S279).

The display on the monitor 18 in this case includes, as shown in FIG. 44B for example, the image data, a text "DSCFXXXX, 20XX.XX.XX, F5, 1/180" representing the content written in the tag information as the display item A1, which is displayed at an area of the screen below the image data, a text "LIMITED (SIZE: 1/8-1/2 OK) (AREA: center 50% (inside) OK)" representing the content written in the tag information, i.e., indicating as the limitations on the detection conditions that the range of the size of the face to be detected is from 1/8 to 1/2 of the length of the short side of the photographed image and that the detection area is inside the center 50% (in length ratio) area of the photographed image as the display item A2-b, and the detection frame F surrounding the detected face.

At this time, if the tag information contains the information of the "detection rate-priority" or the "detection speed-priority" selected by the user, the text "detection rate-priority" or "detection speed-priority" may be displayed on the monitor 18.

In a case where the detection conditions written in the tag information are to detect all faces, the text "FULL" indicating that all faces are to be detected is displayed as the display item A2-a, as shown in FIG. 44A. At this time, if the tag information contains the information of the "detection rate-priority" or the "detection speed-priority" selected by the user, the text "detection rate-priority" or "detection speed-priority" may be displayed on the monitor 18.

If it is determined in step S271 that "ON" is not set for the tag information display (step S271: NO), the display controlling unit 71 displays only the image on the monitor 18 (step S272). In this manner, the image playback process is carried out.

In a case where the detection conditions are changeable by the detection condition setting unit 266, the user may be confused about what detection conditions were used for photographing the image data recorded in the external recording medium 70 or the internal memory (not shown). However, by writing the detection conditions in the tag information of each image file as described above, the detection conditions written in the tag information can be read out during the image playback operation and the detection conditions, which were set during the photographing operation, can be displayed together with the result of the face detection.

This helps the user to understand why, for example, the face contained in the image was not detected, and to set appropriate detection conditions for photographing a similar scene in the future.

Next, a digital camera 200-4 according to a fourth embodiment of the second aspect of the invention will be described in detail. The functional configuration of the digital camera 200-4 of this embodiment is substantially the same as the functional configuration of the digital camera 200-3 of the above-described embodiment (see FIG. 42), and therefore is not shown in the drawing.

In the digital camera 200-4 of this embodiment, the detection condition setting unit 266 can reset the detection conditions differently from the detection conditions written in the tag information of the image file, and the face detection unit 65 carries out the face detection on the image data of an image file recorded in the external recording medium 70 or the internal memory (not shown) based on the reset detection conditions.

Figure 46A:
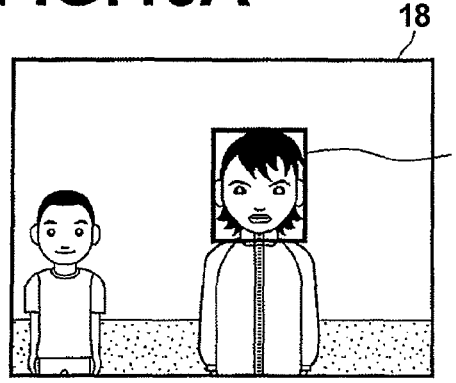
FIG. 46A illustrates a display example of a result of the face detection under detection conditions set during a photographing operation.
Figure 46B:
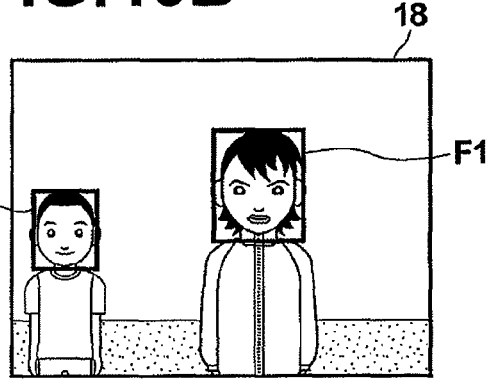
FIG. 46B illustrates a display example of a result of the face detection carried out after image data has been recorded.

FIG. 46A illustrates a display example of a result of the face detection under the detection conditions set during the photographing operation, and FIG. 46B illustrates a display example of a result of the face detection carried out after the image data has been recorded. Usually, there is more time during the image playback operation carried out after the image file has been recorded than during the photographing operation. Therefore, as shown in FIG. 46A, even if only a face F1 was detected from the image containing the face F1 and another face F2 by the face detection based on the detection conditions set during the photographing operation, the detection condition setting unit 266 can reset the detection conditions written during the photographing operation in the tag information of the image file being played back to, for example, detection conditions with wider detection range, so that the face F2 is detected during the playback operation after the image file has been recorded, as shown in FIG. 46B.

Figure 47:
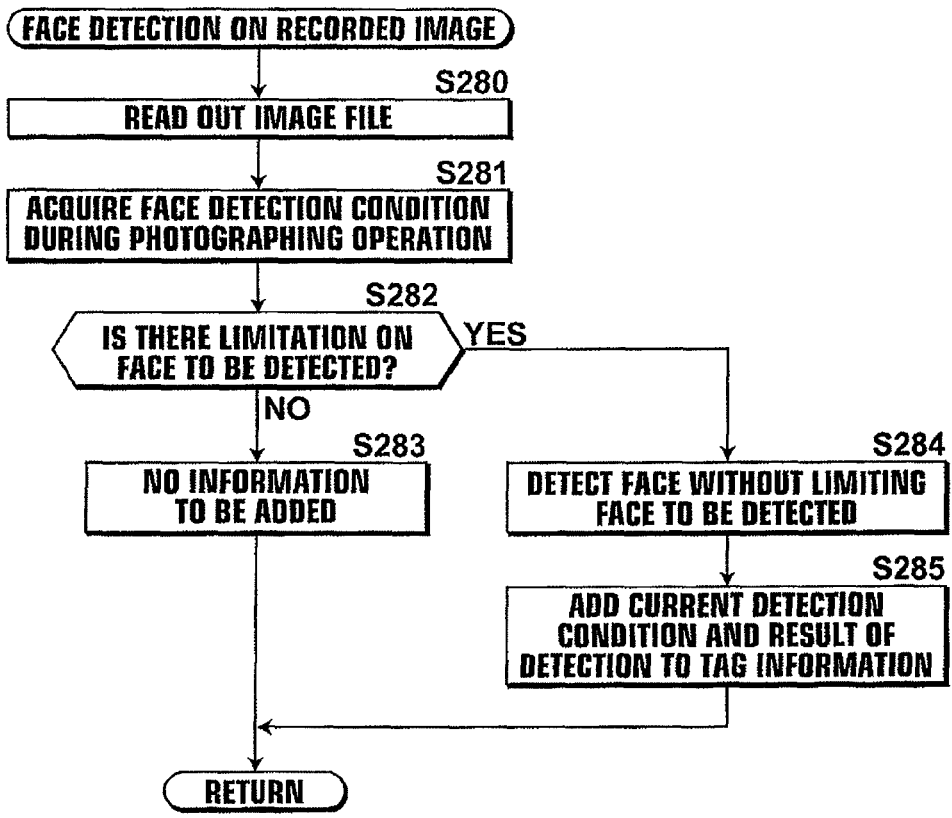
FIG. 47 is a flow chart of a face detection process that is carried out on the recorded image data.

FIG. 47 is a flow chart of a face detection process carried out on a recorded image data according to this embodiment. As shown in FIG. 47, in the face detection after recording, the media controlling unit 69 reads out an image file stored in the external recording medium 70 (step S280).

Then, the detection condition setting unit 266 acquires the face detection conditions written in the tag information during the photographing operation (step S281), and determines whether or not there is any limitation on the face to be detected (step S282). If there is no limitation on the face to be detected (step S282: NO), this means that the face detection during the photographing operation was carried out under the detection conditions for detecting all the faces contained in the image, and therefore no information is added to the tag information (step S283).

In contrast, if there is a limitation on the face to be detected (step S282: YES), this means that the face detection during the photographing operation was carried out under the detection conditions limiting the face to be detected. Therefore, the detection condition setting unit 266 resets the detection conditions so as not to limit the face to be detected, i.e., to detect all the faces in the image, and the face detection unit 65 carries out the face detection on the image data being played back based on the reset detection conditions (step S284).

Then, the tag information writing unit 278 adds the reset detection conditions and the current result of the detection to the tag information (step S285).

FIG. 48 illustrates one example of the added tag information. As shown in FIG. 48 for example, the tag information includes, with respect to a "face detection" item 230, items under "setting" 232 for "during photographing" 231 such as "face detection ON/OFF" 233, "orientation" 234, "inclination" 235, "size" 236 and "area" 237. In this example, the "face detection ON/OFF" 233 is "ON", the "orientation" 234 is "front-oriented", the "inclination" 235 is "all directions", the "size" 236 is "1/8-1/2", and the "area" 237 is "center 50% (inside)". The tag information further includes items for "result" 238 of the face detection such as "number of detected faces" 239, "position" 240 and "size" 241. In this example (the example of the result shown in FIG. 47A), the "number of detected faces" 239 is "1", the "position" 240 is "face F1[lower left (XL,YL) upper right (XR,YR)]" (not shown), which may be represented by coordinates with the origin set at the center of the screen, for example, and the "size" 241 is "face F1[1/3]" (not shown).

The added tag information includes, as "setting" 243 for "after recording" 242, "no limitation on face to be detected" 244, and as items for "result" 245 of the face detection, "number of detected faces" 246 being "2", "position" 247 being "face F1[lower left (XL1,YL1) upper right (XR1, YR1)], face F2[lower left (XL2,YL2) upper right (XR2, YR2)]" (not shown) and "size" 248 being "face F1[1/3], face F2[1/4]" (not shown). In this manner, the face detection after recording is carried out.

Although the tag information in this embodiment contains the face detection information obtained after recording added to the setting made and the face detection information (the result of the face detection) obtained during the photographing operation, as shown in FIG. 48, the tag information may be overwritten so that the latest face detection information such as the face detection information obtained after recording is retained.

Figure 49:
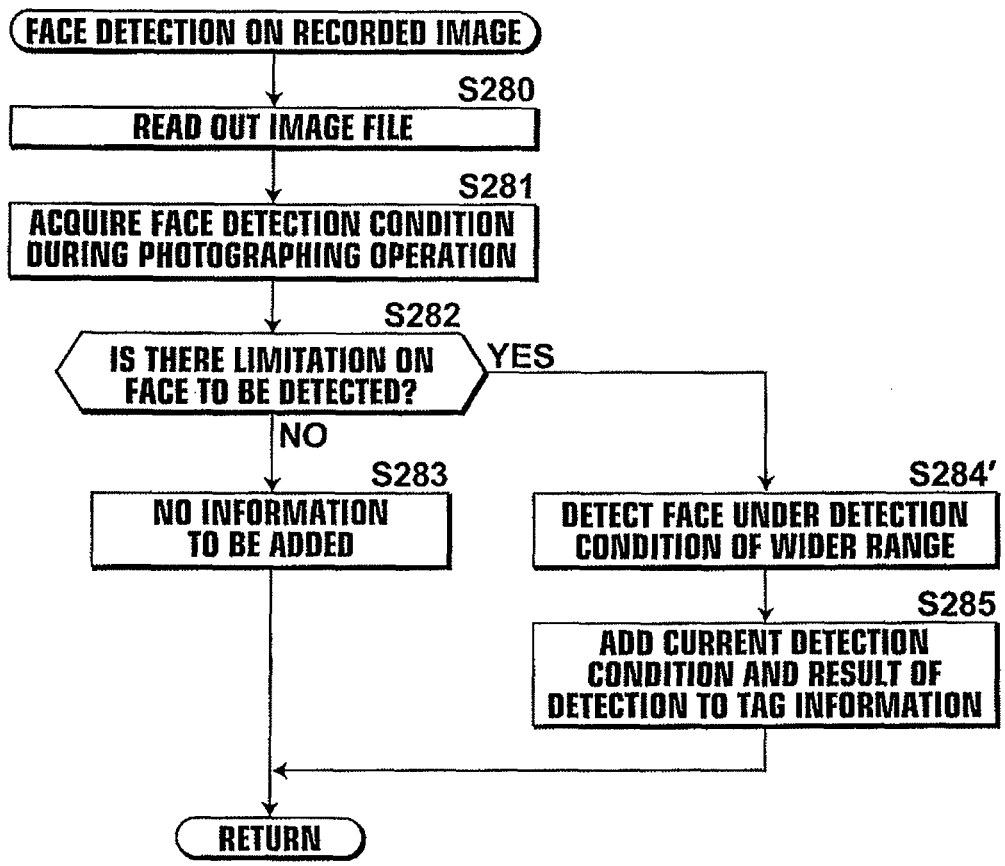
FIG. 49 is a flow chart of another face detection process that is carried out on the recorded image data.

FIG. 49 is a flow chart of another face detection process carried out on recorded image data. It should be noted that operations in the flow chart of FIG. 49 that are the same as those in the flow chart of FIG. 47 are designated by the same step numbers and are not described again here.

As shown in FIG. 49, in the face detection after recording, if it is determined in step S282 that there is a limitation on the face to be detected (step S282: YES), this means that the face detection during the photographing operation was carried out under the detection conditions limiting the face to be detected. Therefore, the detection condition setting unit 266 resets the detection conditions so that a face(s) (if any) which was not detected during the photographing operation is detected, and the face detection unit 65 carries out the face detection on the image data being played back based on the reset detection conditions (step S284').

In this manner, the face F2 (see FIG. 46B), which was not detected during the photographing operation, can be detected in addition to the face F1 which was detected during the photographing operation (see FIG. 46A), and the information of the face F2 can be added to the "result" 245 of the face detection (see FIG. 48) of the tag information.

By carrying out the face detection on the recorded image data with resetting the detection conditions as described above, a face(s) (if any) which was not detected during the photographing operation can be detected from the recorded image data. Thus, the result of the face detection can be used by an application for, for example, lightness correction or color correction to apply more appropriate image processing.

Although the detection condition setting unit 266 in this embodiment resets the detection conditions to widen the detection range from that of the detection conditions written in the tag information of the image file, this is not intended to limit the invention. The detection conditions may be reset to narrow the detection range. In this case, if an erroneous result of detection that was made during the photographing operation is found after the image data has been recorded, the erroneously detected face may possibly be excluded.

Figure 50:
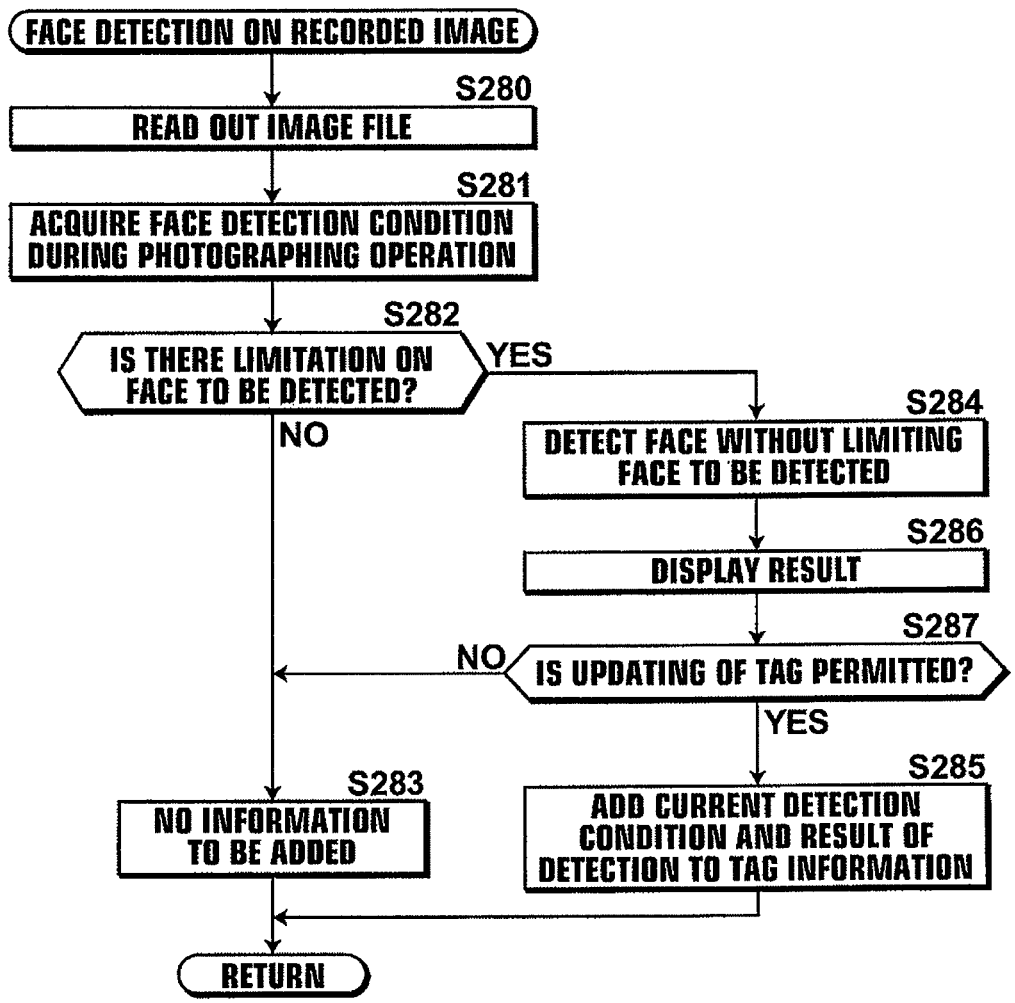
FIG. 50 is a flow chart of yet another face detection process that is carried out on the recorded image data.

FIG. 50 is a flow chart of yet another face detection process carried out on recorded image data. It should be noted that operations in the flow chart of FIG. 50 that are the same as those in the flow chart of FIG. 47 are designated by the same step numbers and are not described again here.

As shown in FIG. 50, in the face detection after recording, if it is determined in step S282 that there is a limitation on the face to be detected (step S282: YES), the detection condition setting unit 266 resets the detection conditions so as not to limit the face to be detected, and the face detection unit 65 carries out the face detection on the image data being played back based on the reset detection conditions (step S284). Thereafter, the CPU 75 displays the result of the face detection on the monitor 18 via the display controlling unit 71 (step S286).

Then, the CPU 75 determines whether or not updating of the tag information is permitted by the user (step S287). The permission by the user may be achieved such that, for example, an item to prompt the user to select whether or not to permit updating of the tag information is displayed on the monitor 18, and the user makes selection through manipulation of a suitable button and/or lever.

If the CPU 75 determines that updating of the tag information is permitted (step S287: YES), the tag information writing unit 278 adds the reset detection conditions and the current result of detection to the tag information (step S285).

In contrast, if it is determined that updating of the tag information is not permitted (step S287: NO), no information is added to the tag information (step S283).

In this case, if the result of the face detection carried out on the recorded image data is different from a result desired by the user, such that an erroneous result of detection, which was not detected in the face detection during the photographing operation, is newly introduced, the user can determine not to add the reset detection conditions and the result to the tag information.

By resetting the detection conditions, after the image file has been recorded, to detection conditions that are different from those used during the photographing operation through which the image file was acquired, and carrying out the face detection on the image data of the played back image file based on the reset detection conditions, as described above, a more appropriate result of the face detection can be obtained from the image data.

Next, a digital camera 200-5 according to a fifth embodiment of the second aspect of the invention will be described in detail. The functional configuration of the digital camera 200-5 of this embodiment is substantially the same as the functional configuration of the digital camera 200-4 of the above-described embodiment, and therefore is not shown in the drawing.

Figure 51:
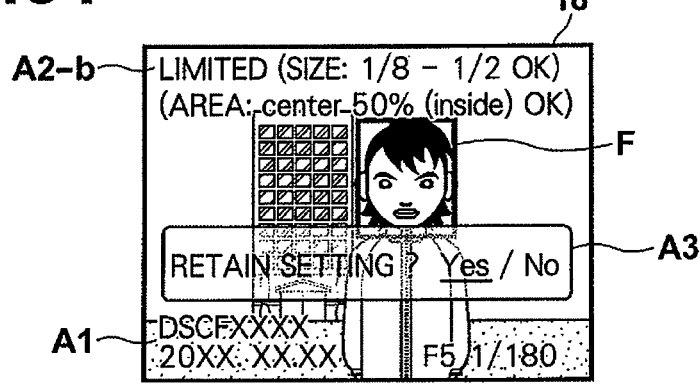
FIG. 51 illustrates a display example of an image file being played back.
Figure 52:
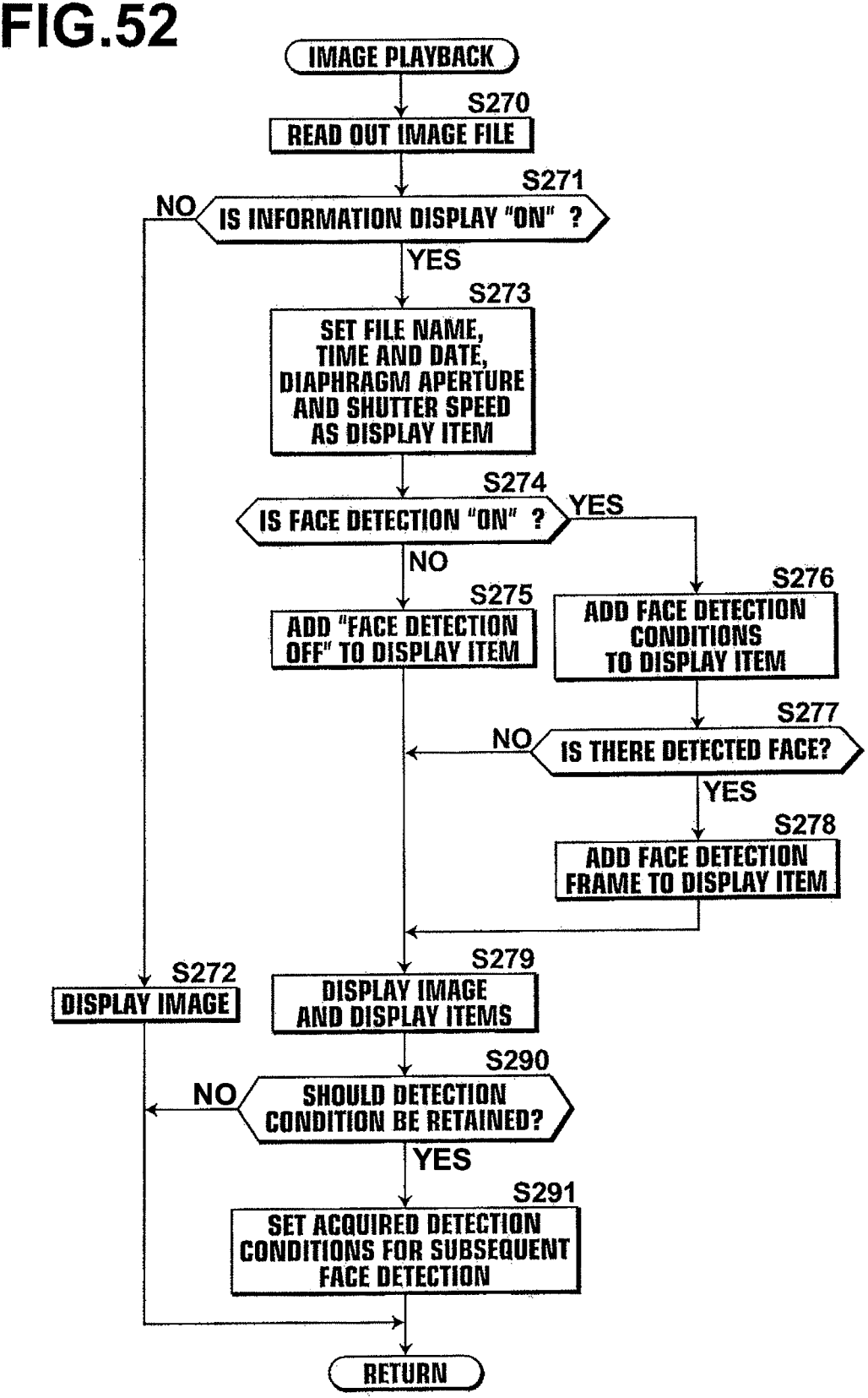
FIG. 52 is a flow chart of another image playback process.

In the digital camera 200-5 of this embodiment, the detection condition setting unit 266 can acquire the detection conditions written in the tag information of the image file and retain the acquired detection conditions, and the face detection unit 65 carries out the face detection based on the retained detection conditions. FIG. 51 illustrates a display example of the image file being played back, and FIG. 52 is a flow chart of an image playback process according to this embodiment. It should be noted that operations in the flow chart of FIG. 52 that are the same as those in the flow chart of FIG. 45 are designated by the same step numbers and are not described again here.

As shown in FIG. 52, in the image playback process carried out in the digital camera 200-5, if it is determined in step S274 that "ON" is set for the face detection (step S274: YES), the tag information display controlling unit 279 displays, on the monitor 18, the image, the display items A1 and A2-b including the detection conditions written in the tag information, and, if a face has been detected, the detection frame F, which is another display item, as shown in FIG. 51 (step S279). Further, an item A3 to prompt the user to select whether or not the detection conditions written in the tag information should be retained is displayed on the monitor 18.

Then, the CPU 75 determines whether or not the user has selected to retain the detection conditions (step S290). If the user has selected to retain the detection conditions (step S290: YES), the detection condition setting unit 266 reads out and acquires the detection conditions written in the tag information and retains the acquired detection conditions to set them as the detection conditions to be used for subsequent face detection operations (step S291).

In contrast, if the user has selected not to retain the detection conditions (step S290: NO), detection conditions according to a default setting, for example, are set, and the process ends.

As described above, when an image file is played back, the detection conditions and the detection frame F as the result of the face detection during the photographing operation, through which the image file was acquired, are displayed on the monitor 18, and the user checks whether a desired result of the face detection is obtained under the detection conditions displayed on the monitor 18. If the desired result is obtained, the user can determine to retain the detection conditions so that these detection conditions are applied to the subsequent face detection operations. Thus, the face detection unit 65 can stably carry out the face detection in a manner desired by the user.

The retained detection conditions may be used for the face detection carried out by the face detection unit 65 on image data acquired by the CCD 58, such as the live view, during a next photographing operation, or may be used for the face detection carried out on played back image data after the image data has been recorded in the external recording medium 70 or the internal memory (not shown).

By retaining the detection conditions which are confirmed by the user as providing a desired result in this manner in the case where the user can set the detection conditions individually via the detection condition setting unit 266, the face detection unit 65 can stably carry out the face detection in a manner desired by the user.

Next, embodiments of a third aspect of the photographing apparatus of the invention will be described in detail with reference to the drawings. It should be noted that the following description of the embodiments is given in conjunction with a digital camera, which is an example of the photographing apparatus of the invention. However, the applicable scope of the invention is not limited to digital cameras, and the invention is also applicable to other electronic devices with an electronic photographing function, such as a mobile phone with camera and a PDA with camera.

Figure 53:
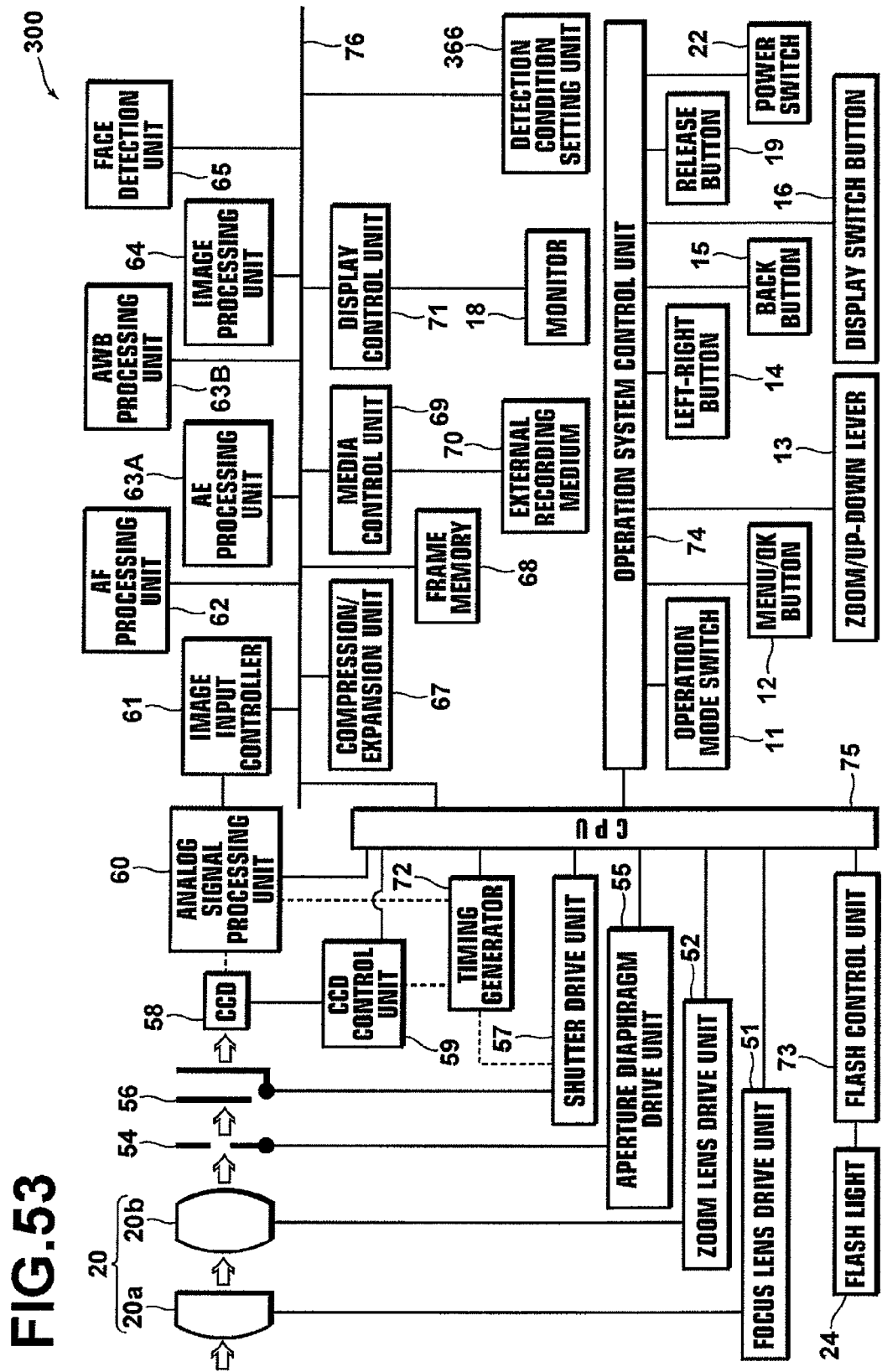
FIG. 53 is a functional block diagram of a digital camera according to a first embodiment of a third aspect of the invention.

The appearance of a digital camera 300 of this embodiment is the same as the appearance of the digital camera of the above-described embodiments shown in FIGS. 1 and 2, and therefore is not described again here. FIG. 53 is a block diagram illustrating the functional configuration of the digital camera 300 of this embodiment. It should be noted that, among the components shown in FIG. 53, the components that are the same as those shown in FIG. 3 are designated by the same symbols and are not described again here, for convenience sake.

A detection condition setting unit 366 of the digital camera 300 of this embodiment allows the user to set the detection conditions for the face detection unit 65 depending on the photographing mode.

Figure 54:
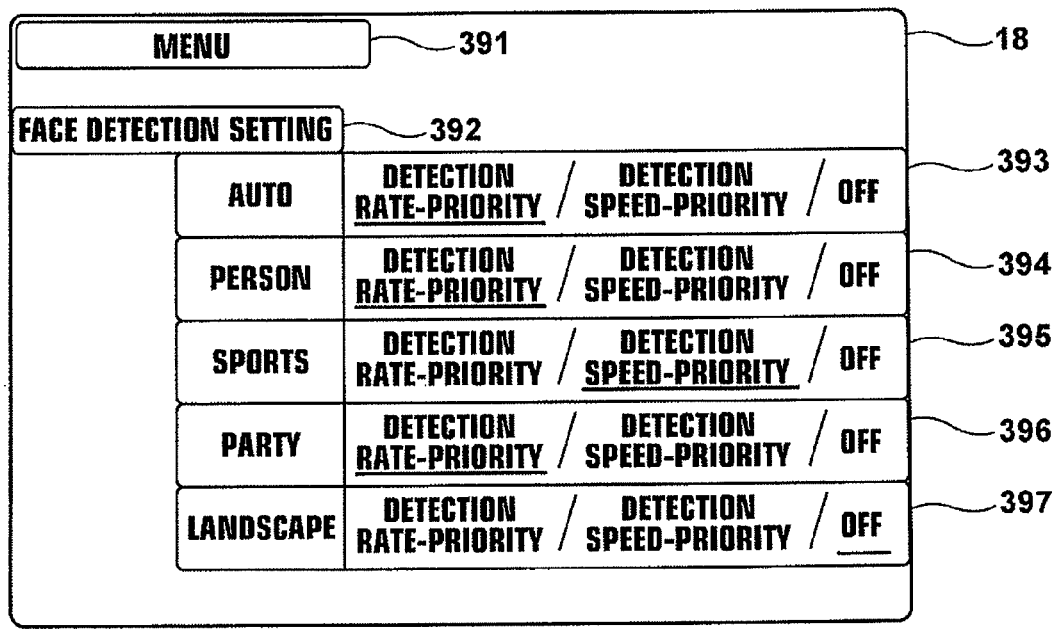
FIG. 54 is a an example of a menu screen that is displayed when detection conditions are set.

Now, the detection condition setting unit 366 is described in detail with reference to the drawings. FIG. 54 illustrates an example of a menu screen that is displayed when the detection conditions are set.

The detection condition setting unit 366 allows the user to set the detection conditions, such as the orientation, size and inclination of the face to be detected and the detection area, depending on the photographing mode. Specifically, as shown in FIG. 54 for example, when a "face detection setting" item 392 is selected on a menu screen 391, the user can select one of "detection rate-priority", "detection speed-priority" and "OFF" for each photographing mode, to set priorities for the face detection by the face detection unit 65. For example, the user can set "detection rate-priority" at 393 for an automatic mode, "detection rate-priority" at 394 for a person mode, "detection speed-priority" at 395 for a sports mode, "detection rate-priority" at 396 for a party mode, and "OFF" at 397 for a landscape mode.

It should be noted that the detection conditions with respect to the orientation, inclination and size of the face to be detected and the detection area that are used when the "detection speed-priority" is selected are set to limit the face to be detected so that the number of detected faces is smaller than those detected when the "detection rate-priority" is selected, in order to shorten the time taken for the face detection to improve followability. Further, the detection conditions used when the "detection speed-priority" is selected and when the "detection rate-priority" is selected may be determined in advance by the designer of the digital camera, or may be individually set by the user.

Figure 55:
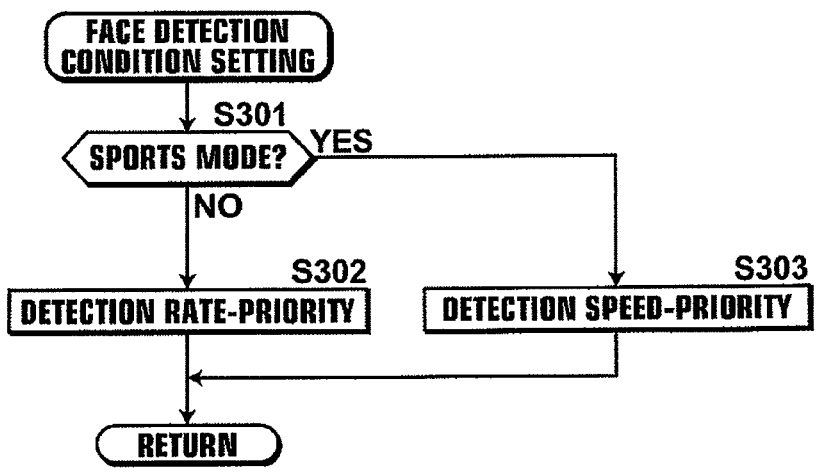
FIG. 55 is a flow chart of a face detection setting process that is carried out when the detection conditions are set.

FIG. 55 is a flow chart of a face detection condition setting process according to the setting made on the menu screen shown in FIG. 54. As shown in FIG. 55, in the face detection condition setting process, first, the CPU 75 determines whether or not the photographing mode is set, for example, as the sports mode (step S301). If the photographing mode is set as the sports mode (step S301: YES), the detection condition setting unit 366 sets the detection conditions corresponding to the "detection speed-priority" 395 selected by the user on the menu screen shown in FIG. 54 (step S303).

In contrast, if the photographing mode is not set as the sports mode (step S301: NO), the detection condition setting unit 366 set the detection conditions corresponding to the "detection rate-priority" (step S302). In this manner, the face detection conditions are set.

As described above, since the user can set the detection conditions for the face detection unit 65 for each photographing mode, the detection conditions can be set with an appropriate balance between the detection rate and the detection speed for each photographing mode. For example, by setting the detection conditions to put a priority on the detection speed to increase the detection speed, i.e., the "detection speed-priority", for the sports mode that may be selected to photograph an active scene such as an athletic meet, the time taken for the face detection can be shortened to improve followability. Further, by setting the detection conditions to put a priority on the detection rate to increase the detection rate, i.e., the "detection rate-priority", for the person mode that may be selected to take a group photo, for example, all the detectable faces in the image can be detected, thereby improving accuracy of the detection. In a case where the user takes a landscape photo, the face detection is not necessary, and therefore, the user can set "OFF" for the face detection to eliminate influence of erroneous face detection.

It should be noted that, although the user sets the detection conditions for each photographing mode by selecting one of the "detection rate-priority", "detection speed-priority" and "OFF", as shown in FIG. 54 in the digital camera 300 of this embodiment, this is not intended to limit the invention. For example, the "detection rate-priority", "detection speed-priority" or "OFF" for the face detection conditions may be set in advance for each photographing mode by the designer of the camera, and when the user sets one of the photographing modes, the detection conditions determined in advance by the designer of the camera for the photographing mode, as described above, may automatically be set.

Further, in stead of setting the "detection rate-priority", "detection speed-priority" or "OFF" for the detection conditions for each photographing mode as described above, the detection conditions, such as the orientation, inclination and size of the face to be detected and the detection area, may individually be set.

Figure 56:
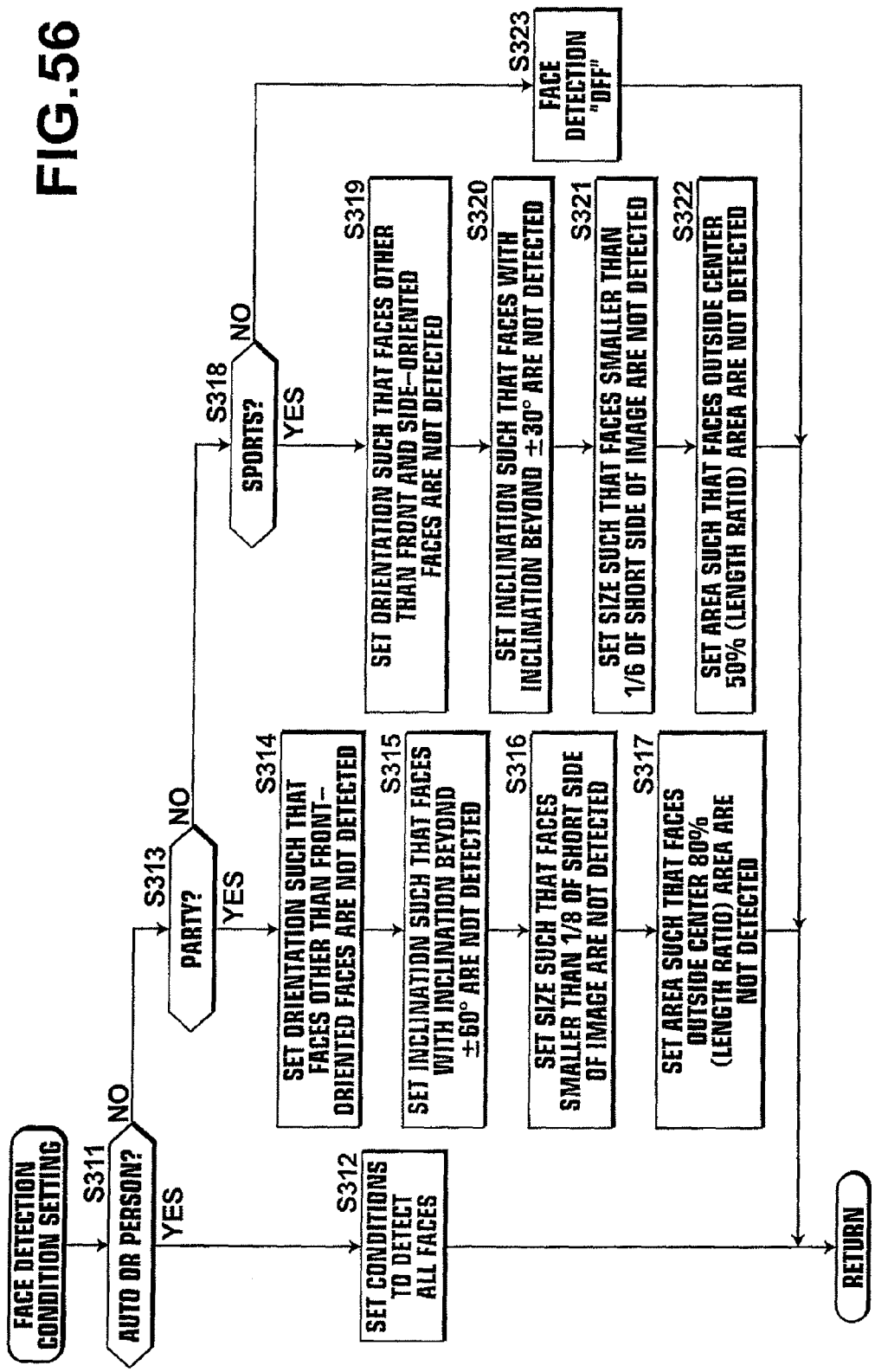
FIG. 56 is a flow chart of another face detection setting process that is carried out when the detection conditions are set.

FIG. 56 is a flow chart of a face detection condition setting process in this case. As shown in FIG. 56, first, the CPU 75 determines whether or not the photographing mode is one of the automatic mode and the person mode (step S311). If the photographing mode is one of the automatic mode and the person mode (step S311: YES), the detection condition setting unit 366 sets the detection conditions such that all faces are detected (step S312).

In contrast, if the photographing mode is none of the automatic mode and the person mode (step S311: NO), the CPU 75 determines whether or not the photographing mode is the party mode (step S313). If the photographing mode is the party mode (step S313: YES), the detection condition setting unit 366 sets the detection condition with respect to the orientation of the face to be detected such that faces other than front-oriented faces are not detected (step S314), sets the detection condition with respect to the inclination of the face to be detected such that faces with an inclination beyond ±60° are not detected (step S315), sets the detection condition with respect to the size of the face to be detected such that faces with a size smaller than 1/8 of the length of the short side of the image are not detected (step S316), and sets the detection condition with respect to the detection area such that faces outside the center 80% (in length ratio) area of the image are not detected (step S317).

If it is determined in step S313 that the photographing mode is not the party mode (step S313: NO), the CPU 75 determines whether or not the photographing mode is the sports mode (step S318). If the photographing mode is the sports mode (step S318: YES), the detection condition setting unit 366 sets the detection condition with respect to the orientation of the face to be detected such that faces other than front-oriented faces and side-oriented faces are not detected (step S319), sets the detection condition with respect to the inclination of the face to be detected such that faces with an inclination beyond ±30° are not detected (step S320), sets the detection condition with respect to the size of the face to be detected such that faces with a size smaller than 1/6 of the length of the short side of the image are not detected (step S321), and sets the detection condition with respect to the detection area such that faces outside the center 50% area of the image are not detected (step S322).

If it is determined in step S318 that the photographing mode is not the sports mode (step S318: NO), the CPU 75 sets "OFF" for the face detection by the face detection unit 65 (step S323). In this manner, the face the detection conditions are set.

The detection conditions used for each selected photographing mode may be determined in advance by the designer of the digital camera 300, or may be individually set by the user in a manner that is substantially the same as the manner shown and described with respect to FIG. 54.

As described above, since the user can set the detection conditions for the face detection unit 65 depending on the photographing mode, an appropriate balance between the detection rate and the detection speed can be set for each photographing mode.

Figure 57:
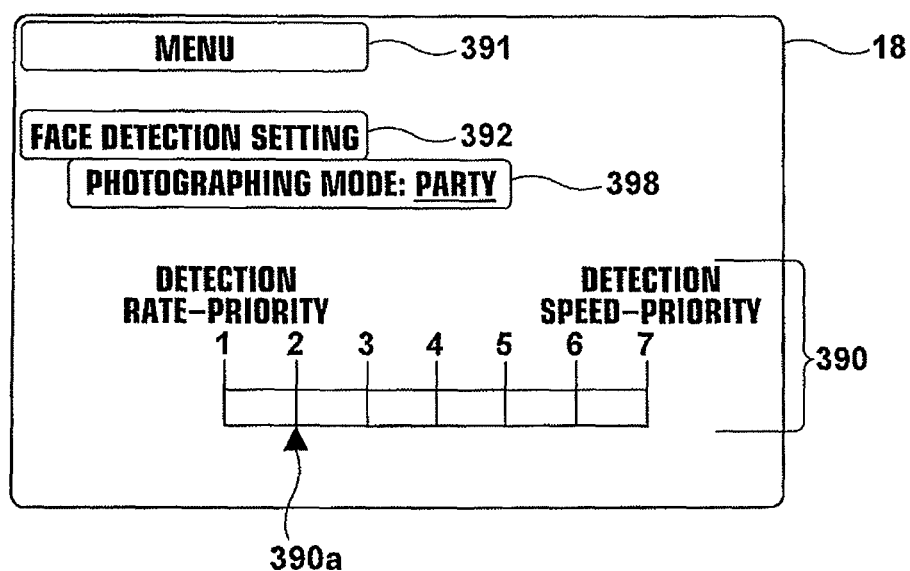
FIG. 57 illustrates another example of the menu screen that is displayed when the detection conditions are set.
Figure 58:
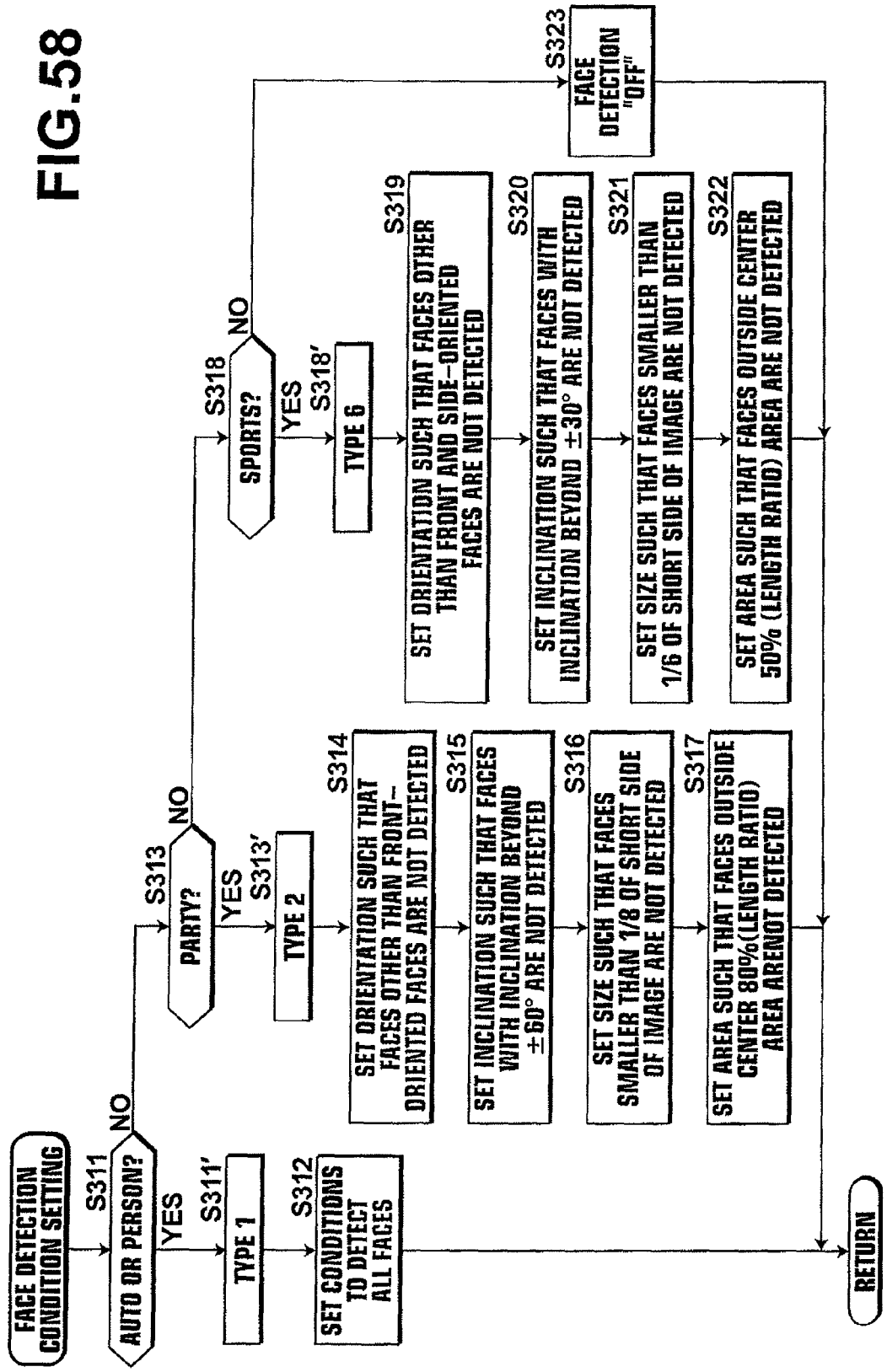
FIG. 58 is a flow chart of yet another face detection setting process that is carried out when the detection conditions are set.

In the invention, the detection conditions for each photographing mode may be set by selecting one of plurality of levels set in a stepwise fashion between the maximum levels of the "detection rate-priority" and the "detection speed-priority". FIG. 57 illustrates another example of the menu screen that is displayed when the detection conditions are set, and FIG. 58 is a flow chart of a face detection condition setting process according to setting made on the menu screen shown in FIG. 57. It should be noted that operations in FIG. 58 that are the same as the operations in FIG. 56 are designated by the same step numbers and are not described again here.

As shown in FIG. 57, the user is allowed to select the party mode as the photographing mode at 398 by manipulating, for example, the zoom/up-down lever 13. Numbers of 1 to 7, for example, which represents seven levels of the detection condition setting including the maximum levels of the detection rate-priority and the detection speed-priority, are displayed along a scale as shown at 390 to allow the user to select one of the numbers for the photographing mode selected at 398 by moving a cursor 390a by manipulating, for example, the right-left button 14. Among the numbers representing the seven levels, "1" is assigned to the maximum level of the detection rate-priority and "7" is assigned to the maximum level of the detection speed-priority.

The detection conditions to be set when one of the numbers "1" to "7" is selected may be determined in advance by the designer of the digital camera 300, or may be individually set by the user. The detection conditions are determined such that the larger the selected number, the smaller the number of detected faces. Specifically, the highest detection speed is achieved when "7" is selected, i.e., the detection conditions with respect to the orientation, inclination and size of the face to be detected and the detection area have limited ranges so that the number of the detected faces is the smallest, and the highest detection rate is achieved when "1" is selected, i.e., the detection conditions with respect to the orientation, inclination and size of the face to be detected and the detection area have unlimited ranges so that the number of the detected faces is the largest.

As shown in FIG. 58, in the face detection setting process, if it is determined in step S311 that the photographing mode is one of the automatic mode and the person mode (step S311: YES), and if the user has set, for example, level "1" (type 1) for these photographing modes on the menu screen shown in FIG. 57 (step S311'), the detection conditions determined in advance for level "1" are set (as shown in step S312 of FIG. 58, for example). If it is determined in step S313 that the photographing mode is the party mode (step S313: YES), and if the user has set, for example, level "2" for the party mode on the menu screen shown in FIG. 57 (step S313'), the detection conditions determined in advance for level "2" are set (as shown in steps S314-S317 of FIG. 58, for example).

If it is determined in step S318 that the photographing mode is the sports mode (step S318: YES), and if the user has set, for example, level "6" for the sports mode on the menu screen shown in FIG. 57 (step S318'), the detection conditions determined in advance for level "6" are set (as shown in steps S319-S322 of FIG. 58, for example). In this manner, the face detection conditions are set.

As described above, since the detection conditions for the face detection unit 65 can be set in a stepwise fashion depending on the photographing mode, an appropriate balance between the detection rate and the detection speed can be set for each photographing mode.

It should be noted that, although the detection conditions for each photographing mode is set by the user by selecting one of the levels "1" to "7" in the above description, this is not intended to limit the invention. For example, one of the levels "1" to "7" may be set in advance for each photographing mode by the designer of the camera, and when the user sets one of the photographing modes, the detection conditions corresponding to the photographing mode set by the user may be automatically set.

Figure 59:
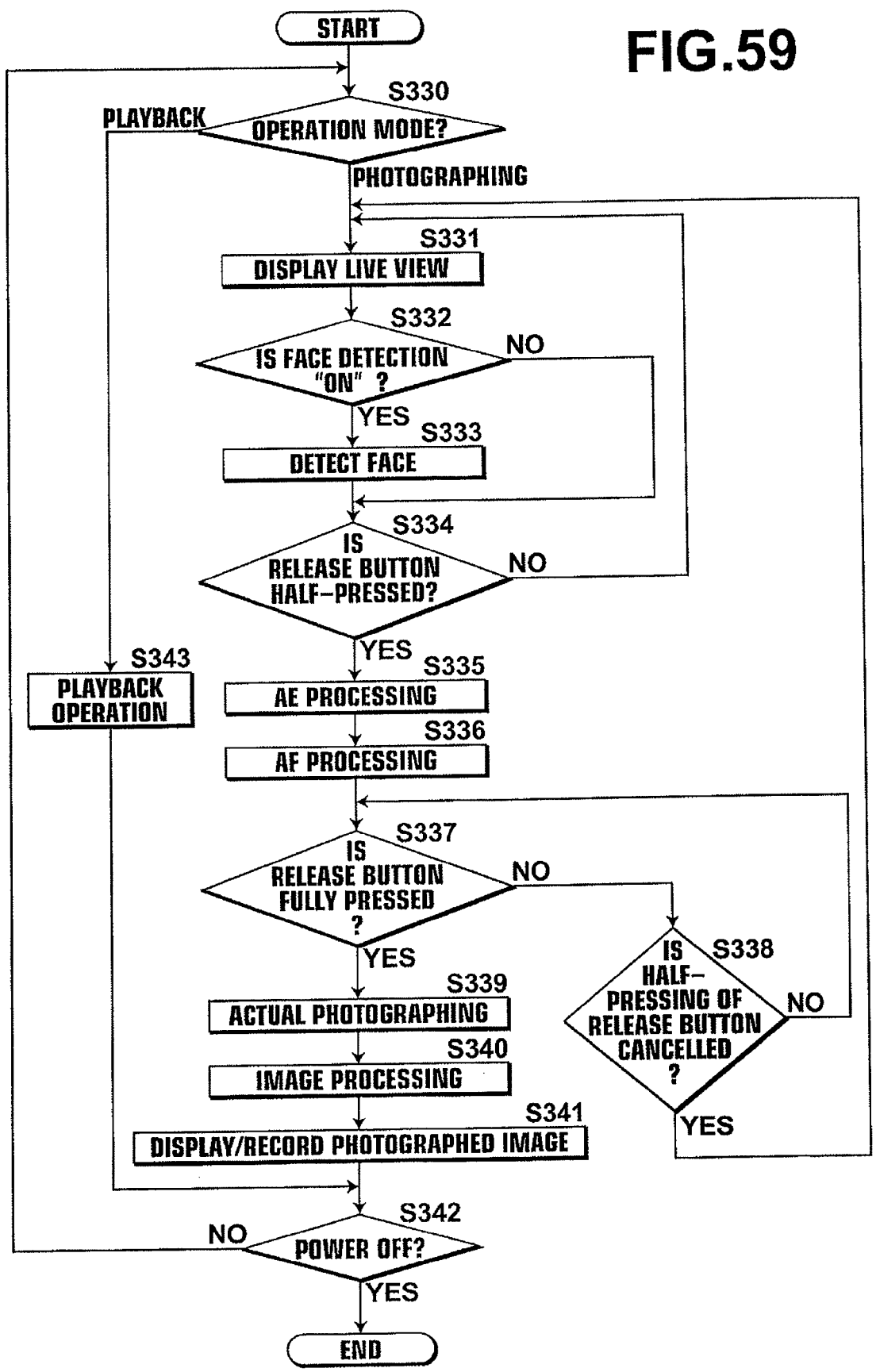
FIG. 59 is a flow chart of a series of operations carried out in the digital camera.

Now, a series of operations carried out in the digital camera 300 with the face detection conditions being set as described above are described. FIG. 59 is flow chart of the series of operations carried out in the digital camera 300.

First, as shown in FIG. 59, the CPU 75 determines whether the operation mode is the photographing mode or the playback mode according to the setting of the operation mode switch 11 (step S330). If the operation mode is the playback mode (step S330: play back), the playback operation is carried out (step S333). In the playback operation, the media controlling unit 69 reads out an image file stored in the external recording medium 70 and displays on the monitor 18 an image based on image data contained in the image file. When the playback operation has been finished, the CPU 75 determines whether or not the power switch 22 of the digital camera 300 has been turned off (step S342). If the power switch 22 is not turned off (step S342: NO), the CPU 75 moves the process to step S330. If the power switch 22 has been turned off (step S342: YES), the digital camera 300 is powered off and the process ends.

In contrast, if it is determined in step S330 that the operation mode is the photographing mode (step S330: photographing), the CPU 75 controls the display of the live view (step S331). Then, the CPU 75 determines whether or not the face detection button 27 is set as "ON" (step S332). If the face detection button 27 is set as "ON" (step S332: YES), the face detection unit 65 continuously carries out the face detection operation on the live view based on the detection conditions set as described above by the detection condition setting unit 366 (step S333). If the face detection button 27 is not set as "ON" (step S332: NO), the CPU 75 moves the process to step S334.

Then, the CPU 75 determines whether or not the release button 19 is half-pressed (step S334). If the release button 19 is not half-pressed (step S334: NO), the CPU 75 moves the process to step S331, and repeats the operations in step S331 and the following steps.

If the release button 19 is half-pressed (step S334: YES), the AE processing unit 63A carries out the AE processing (step S335), and the AF processing unit 62 carries out the AF processing (step S336). At this time, the AWB processing unit 63B may carry out the AWB processing.

Then, the CPU 75 determines whether or not the release button 19 is fully pressed (step S337). If the release button 19 is not fully pressed (step S337: NO), then, the CPU 75 determines whether or not the half-pressing of the release button 19 is cancelled (step S338). If the half-pressing is not cancelled (step S338: NO), the CPU 75 moves the process to step S337. If the half-pressing is cancelled (step S338: YES), the CPU 75 moves the process to step S331.

In contrast, if the release button 19 is fully pressed (step S337: YES), an actual photographing operation is carried out (step S339). As the actual photographing operation has been carried out (step S339), the image processing unit 64 applies image processing to an actually photographed image acquired by the actual photographing operation (step S340). At this time, the data of the actually photographed image subjected to the image processing may further be compressed by the compression/decompression processing unit 67 to generate an image file.

Then, the CPU 75 displays the actually photographed image, which has been subjected to the image processing, on the monitor 18 via the display controlling unit 71, and records the data of the actually photographed image on the external recording medium 70 via the media controlling unit 69 (step S341). Subsequently, the CPU 75 determines whether or not the power switch 22 has been turned off (step S342). If the power switch 22 has been turned off (step S342: YES), the digital camera 300 is powered off and the process ends. If the power switch 22 is not turned off (step S342: NO), the CPU 75 moves the process to step S330, and repeats the operations in step S330 and the following steps. In this manner, photographing with the digital camera 300 is carried out.

As described above, since the detection conditions for the face detection unit 65 in the digital camera 300 of this embodiment can be set depending on the photographing mode, an appropriate balance between the detection rate and the detection speed can be set for each photographing mode. For example, by setting the detection conditions to put a priority on the detection speed to increase the detection speed for the sports mode, which may be selected to photograph an active scene such as an athletic meet, the time taken for the face detection can be shortened to improve followability. Further, by setting the detection conditions to put a priority on the detection rate to increase the detection rate for the person mode, which may be selected to take a group photo, for example, all the faces in the image can be detected, thereby improving accuracy of the detection.

Figure 60:
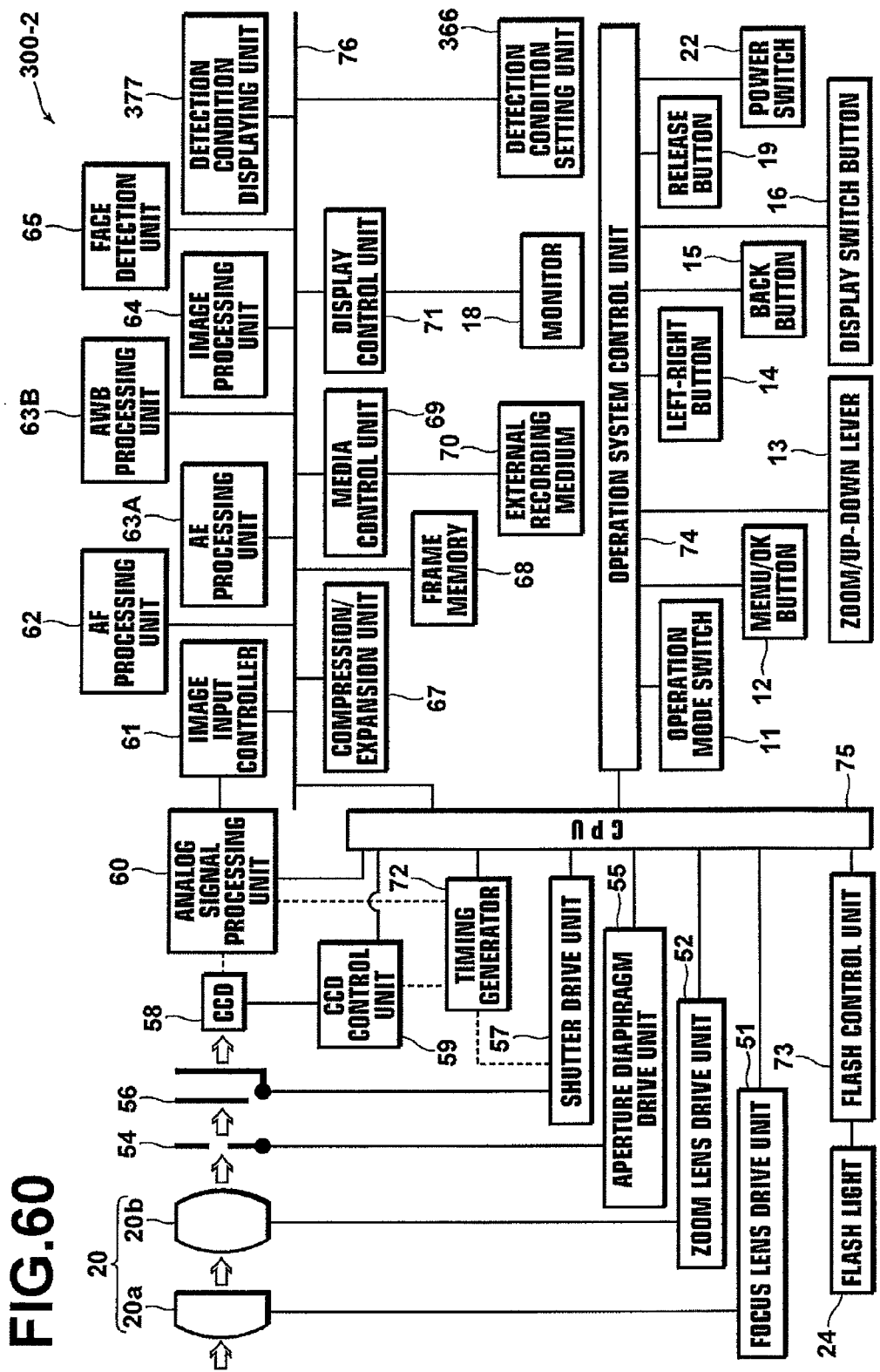
FIG. 60 is a functional block diagram of a digital camera according to a second embodiment of the third aspect of the invention.
Figure 61A:
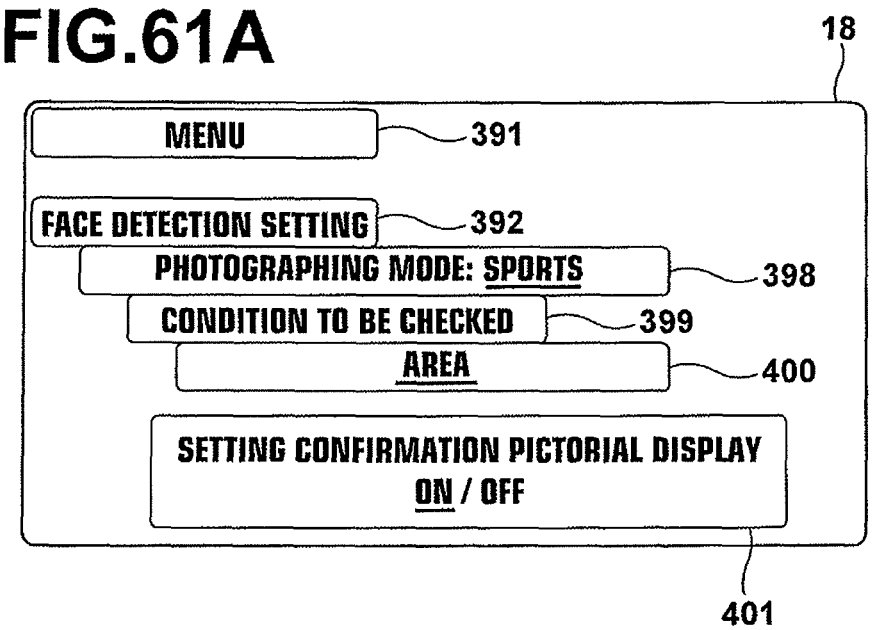
FIG. 61A illustrates an example of a menu screen that is displayed when the detection conditions are set in the digital camera of FIG. 60.
Figure 61B:
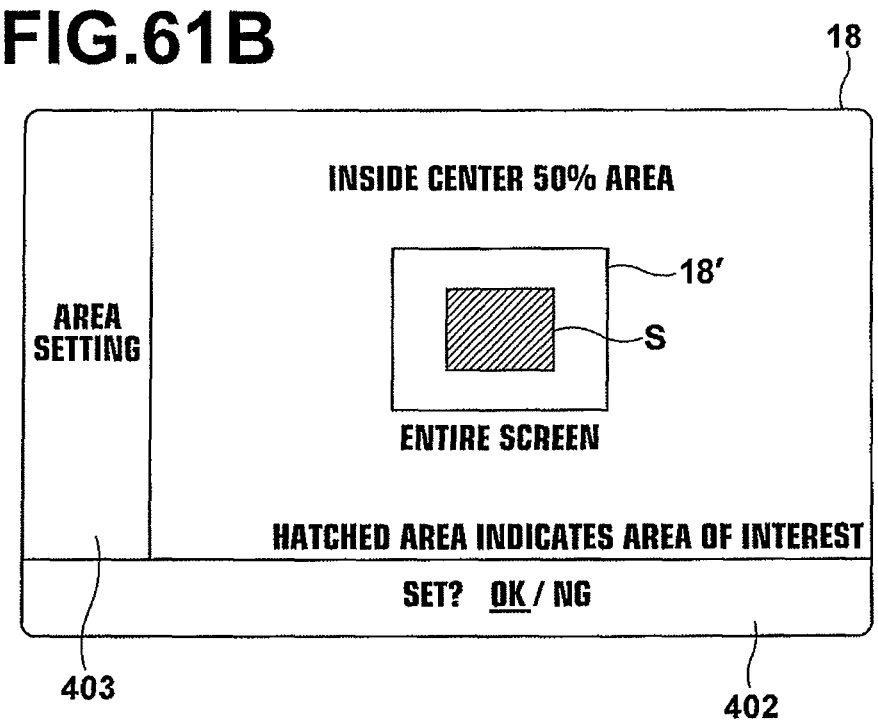
FIG. 61B illustrates an example of the pictorial display in this case.

Next, a digital camera 300-2 according to a second embodiment of the third aspect of the invention will be described in detail with reference to the drawings. FIG. 60 is a block diagram illustrating the functional configuration of the digital camera 300-2, FIG. 61A illustrates an example of a menu screen that is displayed when the detection conditions are set, and FIG. 61B illustrates an example of a pictorial display that is displayed in this case.

As shown in FIG. 60, the digital camera 300-2 of this embodiment includes a detection condition displaying unit 377 in addition to the configuration of the digital camera 300 of the above-described embodiment. It should be noted that components of the digital camera 300-2 of this embodiment that are the same as the components of the digital camera 300 of the above-described embodiment are designated by the same symbols and are not described again here.

The detection condition displaying unit 377 displays the detection conditions set by the detection condition setting unit 366. In a case where the detection condition with respect to the detection area, for example, is displayed for confirmation, as shown in FIG. 61A, the user is allowed to select the sports mode as the photographing mode at 398 by manipulating, for example, the zoom/up-down lever 13, and specify "area" at 400 under a "condition to be checked" item 399 as a detection condition to be checked, by manipulating, for example, the zoom/up-down lever 13.

Then, a selection item 401 for allowing the user to select "ON" or "OFF" of the setting confirmation pictorial display is displayed on the monitor 18. If the user has selected "ON" by manipulating, for example, the right-left button 14, a text "area setting" 403 is displayed at the left of the screen, and a pictorial display of the result of the setting of the detection area, i.e., the face detection condition, is displayed at the right of the screen, as shown in FIG. 61B.

As shown in FIG. 61B, the pictorial display contains an "entire screen" figure 18' representing the monitor 18 and a "detection area of interest" figure S representing a search area within the "entire screen" figure 18'. Further, when the "sports mode" is selected at the item 398 shown in FIG. 61A, a text "inside center 50% area" based on the length ratio value (50% in this embodiment) set in advance for the sports mode is displayed above the "entire screen" figure 18', for example, and a text "hatched area indicates area of interest" is displayed at the lower right area.

Then, in the same manner as described above, an item 402 for allowing the user to select whether or not the detection condition represented by the pictorial display should be set is displayed at the bottom area of the setting screen, so that the user can select "OK" or "NG" by manipulating, for example, the right-left button 14. This allows the user to visually check whether the range of the detection area based on the detection condition set in advance by the detection condition setting unit 366 for photographing mode selected by the user, i.e., the "sports mode", is intended by the user, to avoid a detection condition not intended by the user being set.

Figure 62:
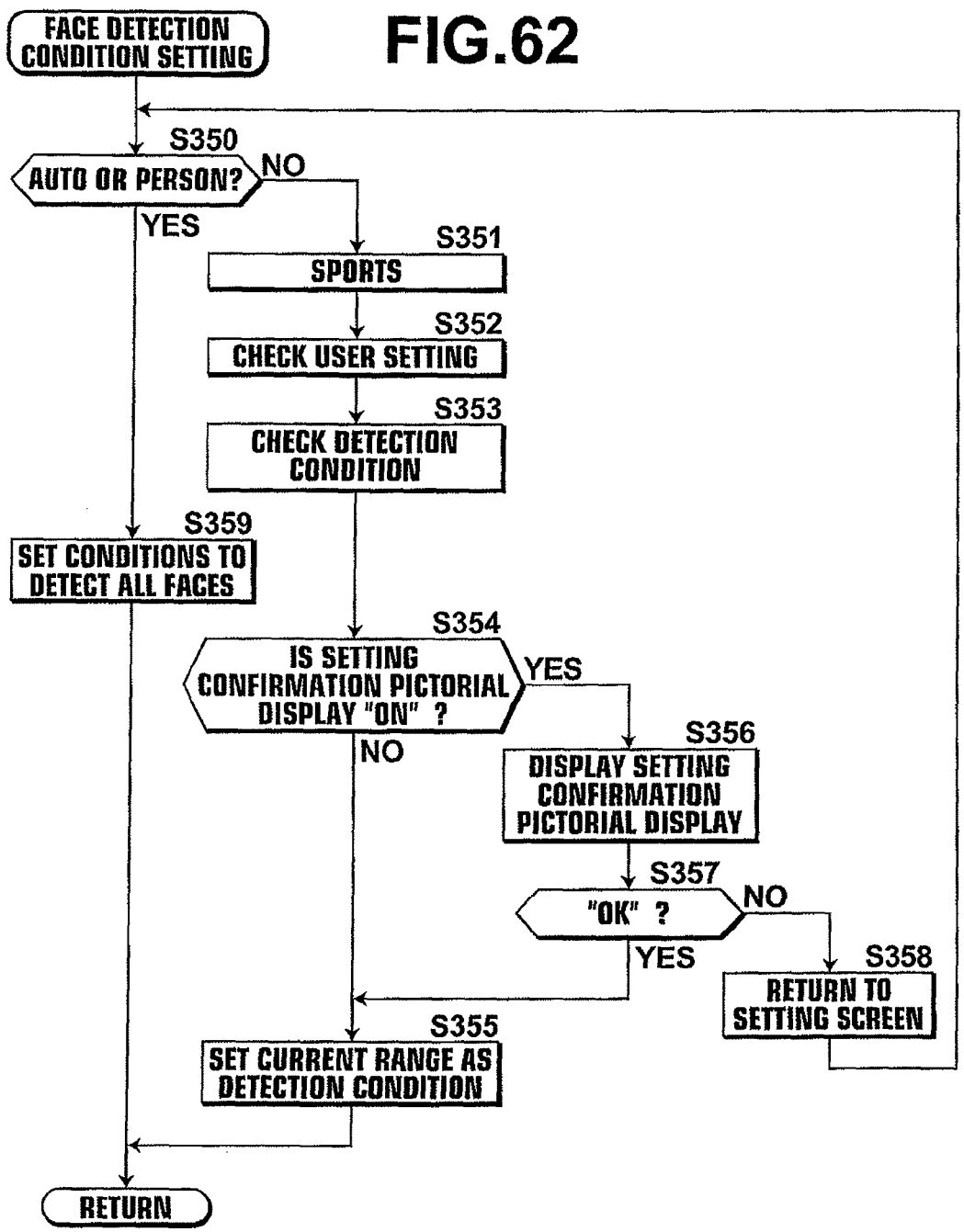
FIG. 62 is a flow chart of a face detection condition setting process according to setting shown in FIGS. 61A and 61B, FIGS. 63A-63C illustrate examples of the setting confirmation display that is displayed when the detection conditions are set.

FIG. 62 is a flow chart of a face detection condition setting process according to the setting made on the screens shown in FIGS. 61A and 61B. First, the CPU 75 determines whether or not one of the automatic mode and the person mode is selected as the photographing mode at 398 shown in FIG. 61A (step S350). If none of the automatic mode and the person mode is selected (step S350: NO), the CPU 75 determines that the sports mode, for example, is selected as the photographing mode at 398 (step S351).

Then, the CPU 75 checks the setting made by the user (step S352) to check the detection condition (the detection area in this embodiment) specified by the user (step S353).

Then, the CPU 75 determines whether or not "ON" is selected for the setting confirmation pictorial display at 401 shown in FIG. 61A (step S354). If "ON" is not selected (step S354: NO), the detection condition with respect to the detection area that is set in advance for the sports mode is set without displaying the setting confirmation pictorial display (step S355).

In contrast, if "ON" is selected (step S354: YES), the detection condition displaying unit 377 displays the pictorial display representing the detection area based on the detection condition with respect to the detection area set in advance by the detection condition setting unit 366 for the sports mode, as shown in FIG. 61B (step S356). Then, the CPU 75 determines whether or not "OK" is selected by the user for the current setting (step S357).

If "OK" is selected for the current setting (step S357: YES), the CPU 75 moves the process to step S355, and sets the current range of the detection condition for the face detection (step S355). At this time, if the user wishes to check another detection condition, such as the "inclination", using the pictorial display, the user select "NG" for the setting, and then selects an "inclination" item (not shown) at 400 under a "condition to be checked" item 399 on the setting screen shown in FIG. 61A, so that the pictorial display of the detection condition with respect to the inclination is displayed.

In contrast, if "OK" is not selected for the current setting (step S357: NO), the CPU 75 determines that the current detection range set as the detection area is not desired by the user, and returns the display on the monitor 18 to the setting screen shown, for example, in FIG. 54 or 61 so that the user can set the detection condition again (step S358). Then, the CPU 75 moves the process to step S350.

If it is determined in step S350 that the automatic mode or the person mode is selected (step S350: YES), the face detection conditions are set such that all faces are detected (step S359). In this manner, the face detection condition setting process is carried out.

By displaying the pictorial display representing the detection condition set in advance by the detection condition setting unit 377 for the photographing mode selected by the user, the user can visually check whether the currently set detection range is intended by the user, and erroneous setting of the detection condition can be avoided to avoid a situation that faces with orientations, sizes, or other conditions, which are not intended by the user are detected.

Figure 63A:
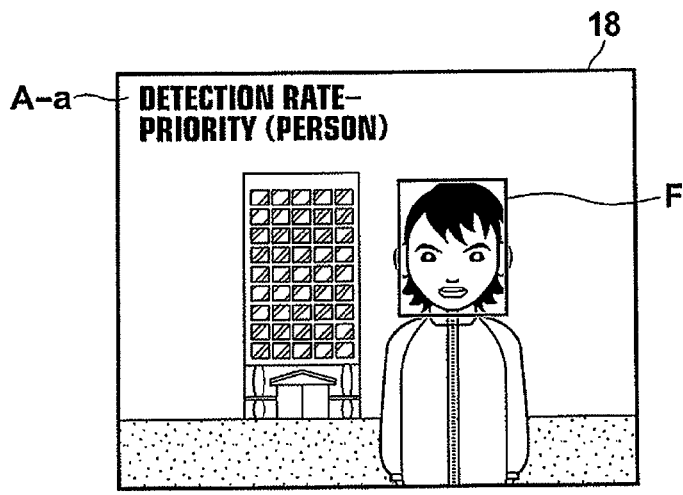
Figure 63B:
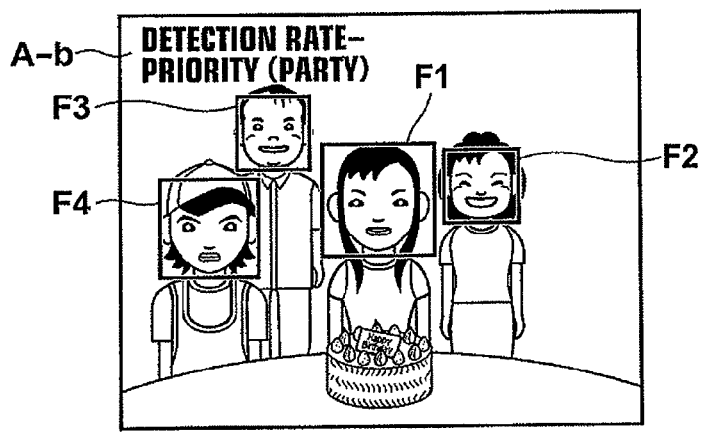
Figure 63C:
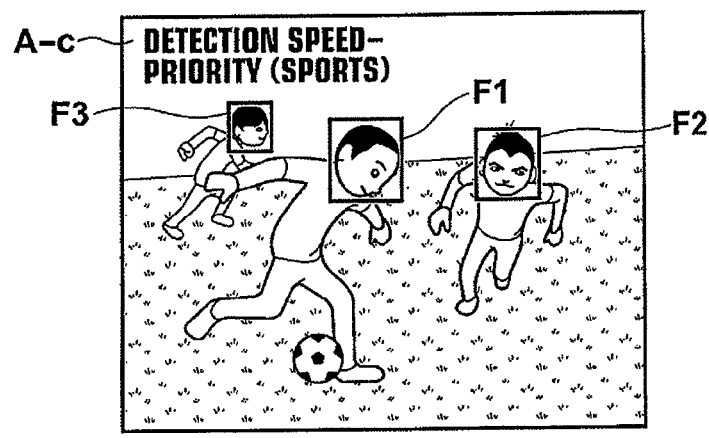

Although the pictorial display is displayed for confirming the face detection condition in the digital camera 300-2 of this embodiment, this is not intended to limit the invention. The display for confirming the face detection condition may made in other forms, such as a textual display. FIG. 63A illustrates an example of the textual display that is displayed when the person mode is selected, FIG. 63B illustrates an example of the textual display that is displayed when the party mode is selected, and FIG. 63C illustrates an example of the textual display that is displayed when the sports mode is selected.

As shown in FIG. 63A for example, if the photographing mode is set as the "person mode" by the user, a text "detection rate-priority (person)" designated by A-a, which indicates that the user puts a priority on the detection rate for the detection conditions set for the person mode as described above, is displayed at the upper left area of the screen. As shown in FIG. 63B for example, if the photographing mode is set as the "party mode" by the user, a text "detection rate-priority (party)" designated by A-b, which indicates that the user puts a priority on the detection rate for the detection conditions set for the party mode, is displayed at the upper left area of the screen. Further, as shown in FIG. 63C for example, if the photographing mode is set as the "sports mode" by the user, a text "detection speed-priority (sports)" A-c designated by A-b, which indicates that the user puts a priority on the detection speed for the detection conditions set for the sports mode, is displayed at the upper left area of the screen.

FIG. 64 is a flow chart of a face detection condition setting process in this case. It should be noted that operations in FIG. 64 that are the same as the operations in FIG. 56 are designated by the same step numbers and are not described again here. As shown in FIG. 64, if the photographing mode is the person mode (step S311: YES), the detection condition setting unit 366 sets the detection conditions such that all faces are detected (step S312), and the detection condition displaying unit 377 displays the text "detection rate-priority (person)", as designated by A-a in FIG. 63A (step S324).

If the photographing mode is the party mode (step S313: YES), the detection condition setting unit 366 sets the detection conditions corresponding to the detection rate-priority through the operations in steps S314-S317, and the detection condition displaying unit 377 displays the text "detection rate-priority (party)", as designated by A-b in FIG. 63B (step S325).

If the photographing mode is the sports mode (step S318: YES), the detection condition setting unit 366 sets the detection conditions corresponding to the detection speed-priority through the operations in steps S319-S322, and the detection condition displaying unit 377 displays the text "detection speed-priority (sports)", as designated by A-c in FIG. 63C (step S326). In this manner, the setting process is carried out.

It should be noted that the setting confirmation display may be carried out before the face detection by the face detection unit 65 is started, to prompt the user to select whether or not the currently displayed "detection rate-priority" or "detection speed-priority", i.e., the detection conditions corresponding to the "detection rate-priority" or the "detection speed-priority" should be set. This allows the user to visually check whether the detection conditions set by the detection condition setting unit 366 for each photographing mode is the detection conditions corresponding to the detection rate-priority or the detection speed-priority intended by the user, thereby avoiding a detection condition not intended by the user being set.

As shown in FIGS. 63A-63C, the setting confirmation display may be displayed on the live view together with the face detection frame F, which indicates the result of the face detection by the face detection unit 65.

By displaying on the imaging screen the indication of the detection rate-priority or the detection speed-priority corresponding to the photographing mode currently set by the user in this manner, a situation such that a face detection result obtained under detection conditions which are not intended by the user is used, for example, for AF processing can be avoided.

Figure 65:
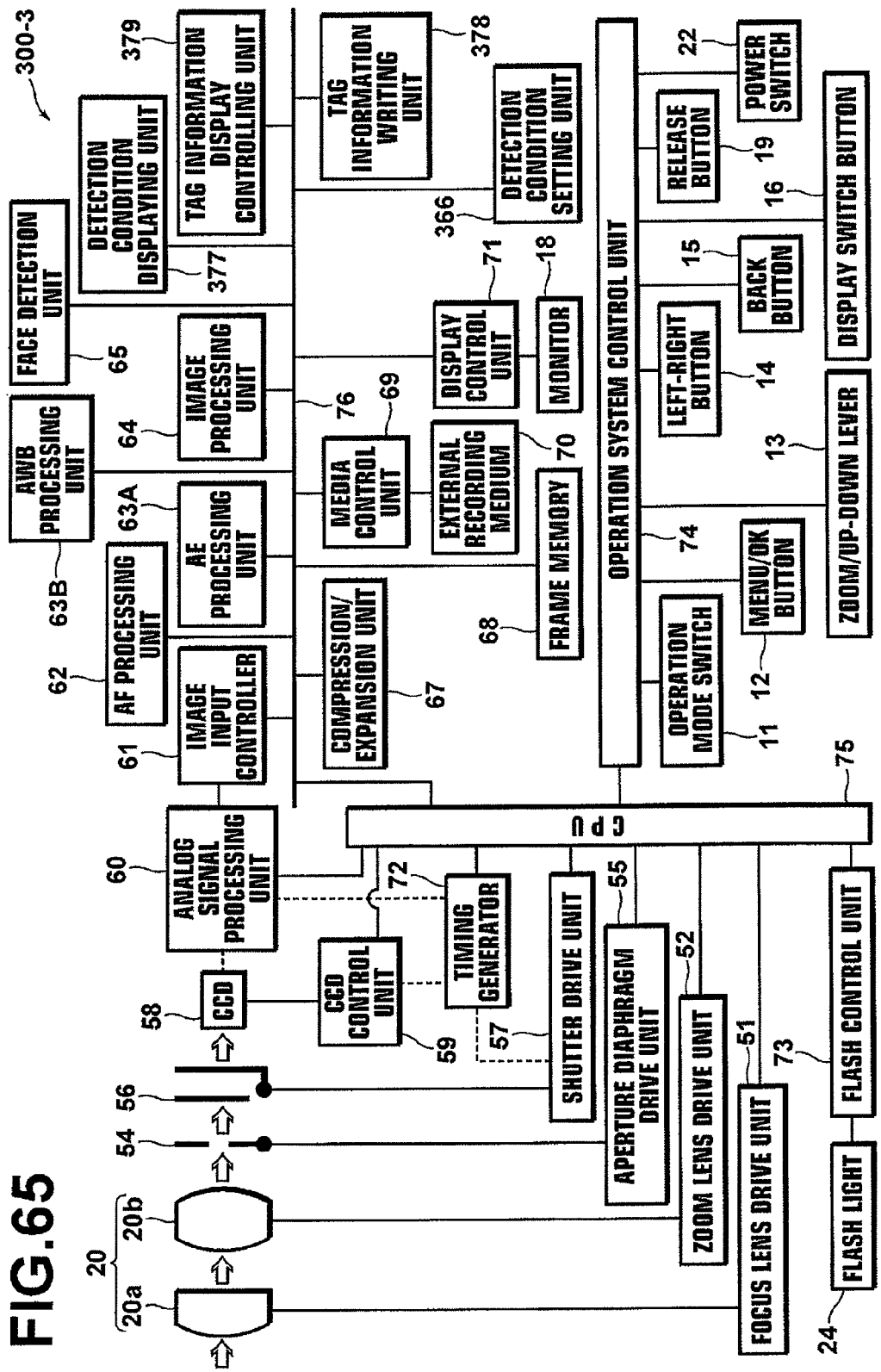
FIG. 65 is a functional block diagram of a digital camera according to a third embodiment of the third aspect of the invention.

Next, a digital camera 300-3 according to a third embodiment of the third aspect of the invention will be described in detail with reference to the drawings. FIG. 65 is a block diagram illustrating the functional configuration of the digital camera 300-3, FIG. 66 illustrates one example of tag information written in an image file, and FIGS. 67A-67D illustrate examples of the tag information displayed when image files are played back.

As shown in FIG. 65, the digital camera 300-3 of this embodiment includes a tag information writing unit 378 and a tag information display controlling unit 379 in addition to the configuration of the digital camera 300-2 of the above-described embodiment. It should be noted that components of the digital camera 300-3 of this embodiment that are the same as the components of the digital camera 300-2 of the above-described embodiment are designated by the same symbols and are not described again here.

When an image file, which has been generated by the compression/decompression processing unit 67, and the like, is recorded in the external recording medium 70 or the internal memory (not shown), the tag information writing unit 378 writes the detection conditions in the tag information of the image file. As shown in FIG. 66, the tag information to be written may include setting items under a "face detection setting" item 320, such as a "face detection ON/OFF" item 321, an "orientation" item 322, an "inclination" item 323, a "size" item 324 and an "area" item 325. In this example, the "face detection ON/OFF" 321 is "ON", the "orientation" 322 is "front-oriented", the "inclination" 323 is "all directions", the "size" 324 is "1/8-1/2", and the "area" 325 is "center 50% (inside)". At this time, information of the photographing mode selected by the user and information of the "detection rate-priority" or the "detection speed-priority" set for the selected photographing mode may also be written in the tag information.

With the detection conditions written in the tag information in this manner, compatibility with an application for, for example, lightness correction or color correction, which uses the result of the face detection, can be enhanced.

When the image file which has the tag information written by the tag information writing unit 378, as described above, is displayed on the monitor 18, the tag information display controlling unit 379 displays on the monitor 18 the detection conditions written in the tag information. FIG. 68 is a flow chart of an image playback process according to this embodiment.

The image playback process is carried out when the operation mode of the digital camera 300-3 is set as the playback mode (see step S343 in FIG. 59). First, as shown in FIG. 68, the media controlling unit 69 reads out an image file stored in the external recording medium 70 (step S360), and the CPU 75 determines whether or not "ON" is set for tag information display (step S361). The "ON" or "OFF" of the tag information display may be set by the user through manipulation of a suitable button and/or lever, or may automatically be set as "ON" when the read out image file has the tag information written therein.

If "ON" is set for the tag information display (step S361: YES), the tag information display controlling unit 379 sets information such as the file name, the time and date, the diaphragm aperture and the shutter speed as a display item A1 (step S363).

Then, the CPU 75 determines whether or not "ON" is set for the face detection unit 65 (step S364). If "ON" is not set for the face detection (step S364: NO), the tag information display controlling unit 379 adds information which indicates that the face detection is "OFF" as a display item A2 to the display item (step S365), and displays the image with the display items A1 and A2 according to the tag information on the monitor 18 (step S369).

Figure 67A:
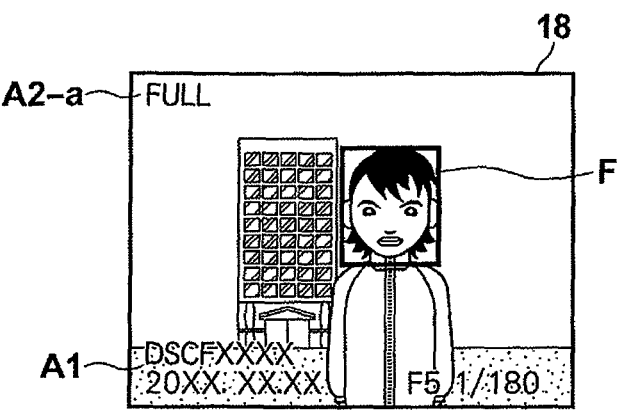
FIGS. 67A-67D illustrate examples of the tag information that is displayed when an image file is played back.
Figure 67B:
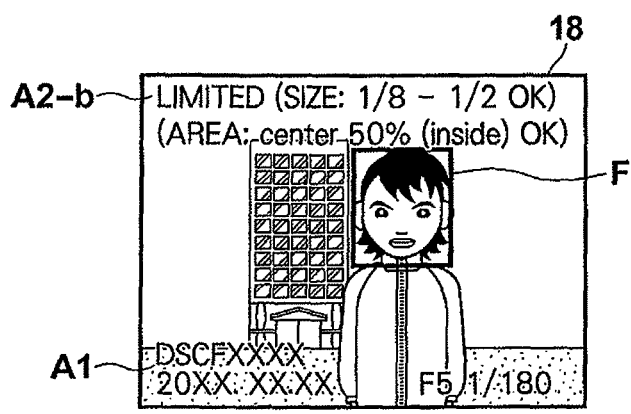
Figure 67C:
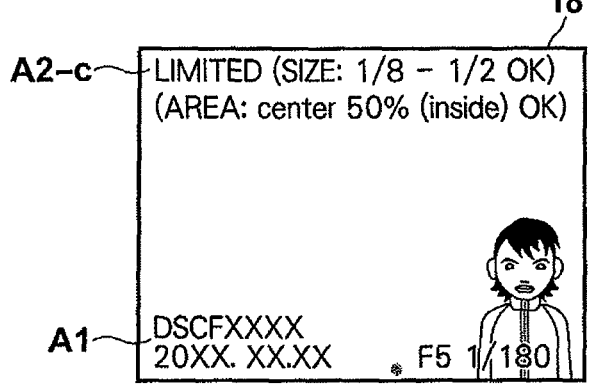
Figure 67D:
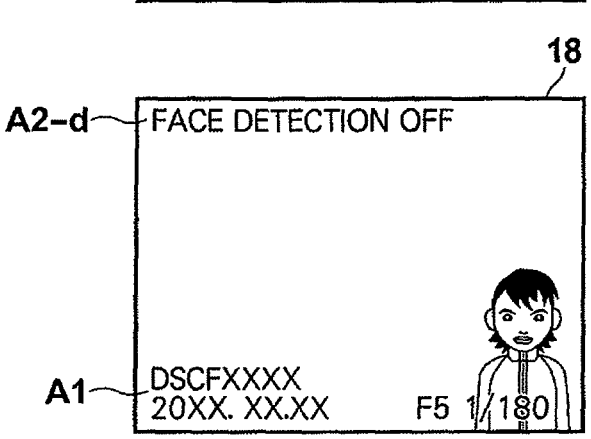

The display on the monitor 18 in this case includes, as shown in FIG. 67D for example, the image data, a text "DSCFXXXX, 20XX.XX.XX, F5, 1/180" representing the content written in the tag information as the display item A1, which is displayed at an area of the screen below the image data, and a text "FACE DETECTION OFF" representing the content written in the tag information, i.e., indicating that the face detection is "OFF", as the display item A2-*d,* which is displayed at the upper area of the screen.

In contrast, if it is determined in step S364 that "ON" is set for the face detection (step S364: YES), the tag information display controlling unit 379 adds the face detection conditions set by the detection condition setting unit 366 as the display item A2 to the display items (step S366), and the CPU 75 determines whether or not there is a detected face (step S367). If no face is detected (step S367: NO), the image and the display items A1 and A2 according to the tag information are displayed on the monitor 18 (step S369).

The display on the monitor 18 in this case includes, as shown in FIG. 67C for example, the image data, a text "DSCFXXXX, 20XX.XX.XX, F5, 1/180" representing the content written in the tag information as the display item A1, which is displayed at an area of the screen below the image data, and a text "LIMITED (SIZE: 1/8-1/2 OK) (AREA: center 50% (inside) OK)" representing the content written in the tag information, i.e., indicating as the limitations on the detection conditions that the range of the size of the face to be detected is from 1/8 to 1/2 of the length of the short side of the photographed image and that the detection area is inside the center 50% (in length ratio) area of the photographed image as the display item A2-*c*. At this time, if the tag information contains the information of the photographing mode selected by the user and the "detection rate-priority" or the "detection speed-priority" set for the selected photographing mode, a text representing the photographing mode and a text "detection rate-priority" or "detection speed-priority" may be displayed on the monitor 18.

If it is determined in step S367 that there is a detected face (step S367: YES), the tag information display controlling unit 379 adds the face detection frame F to the display items (step S368), and the image, the display items A1 and A2 according to the tag information, and the detection frame F, which is another display item, are displayed on the monitor 18 (step S369).

The display on the monitor 18 in this case includes, as shown in FIG. 67B for example, the image data, a text "DSCFXXXX, 20XX.XX.XX, F5, 1/180" representing the content written in the tag information as the display item A1, which is displayed at an area of the screen below the image data, a text "LIMITED (SIZE: 1/8-1/2 OK) (AREA: center 50% (inside) OK)" representing the content written in the tag information, i.e., indicating as the limitations on the detection conditions that the range of the size of the face to be detected is from 1/8 to 1/2 of the length of the short side of the photographed image and that the detection area is inside the center 50% (in length ratio) area of the photographed image as the display item A2-*b*, and the detection frame F surrounding the detected face.

At this time, if the tag information contains the information of the photographing mode selected by the user and the "detection rate-priority" or the "detection speed-priority" set for the selected photographing mode, a text representing the photographing mode and a text "detection rate-priority" or "detection speed-priority" may be displayed on the monitor 18.

In a case where the detection conditions written in the tag information are to detect all faces, the text "FULL" indicating that all faces are to be detected is displayed as the display item A2-*a*, as shown in FIG. 67A. At this time, if the tag information contains the information of the photographing mode selected by the user and the "detection rate-priority" or the "detection speed-priority" set for the selected photographing mode, a text representing the photographing mode and a text "detection rate-priority" or "detection speed-priority" may be displayed on the monitor 18.

If it is determined in step S361 that "ON" is not set for the tag information display (step S361: NO), the display controlling unit 71 displays only the image on the monitor 18 (step S362). In this manner, the image playback process is carried out.

In a case where the detection conditions are changeable by the detection condition setting unit 366, the user may be confused about what detection conditions were used for photographing the image data recorded in the external recording medium 70 or the internal memory (not shown). However, by writing the detection conditions in the tag information of each image file as described above, the detection conditions written in the tag information can be read out during the image playback operation and the detection conditions, which were set during the photographing operation, can be displayed together with the result of the face detection.

This helps the user to understand why, for example, the face contained in the image was not detected, and to set appropriate detection conditions for photographing a similar scene in the future.

Next, a digital camera 300-4 according to a fourth embodiment of the third aspect of the invention will be described in detail. The functional configuration of the digital camera 300-4 of this embodiment is substantially the same as the functional configuration of the digital camera 300-3 of the above-described embodiment (see FIG. 65), and therefore is not shown in the drawing.

In the digital camera 300-4 of this embodiment, the detection condition setting unit 366 can reset the detection conditions differently from the detection conditions written in the tag information of the image file, and the face detection unit 65 carries out the face detection on the image data of an image file recorded in the external recording medium 70 or the internal memory (not shown) based on the reset detection conditions.

Figure 69A:
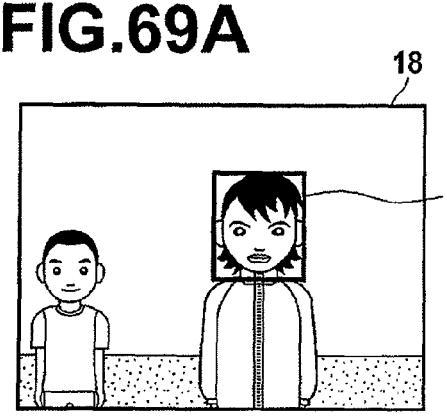
FIG. 69A illustrates a display example of a result of the face detection under detection conditions set during a photographing operation.
Figure 69B:
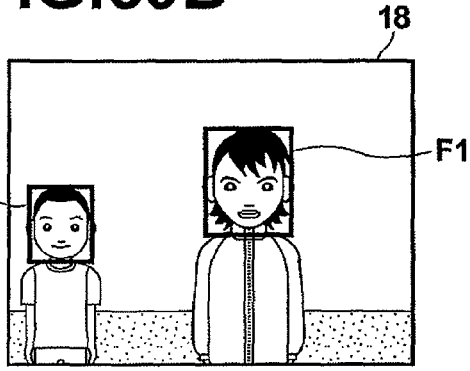
FIG. 69B illustrates a display example of a result of the face detection carried out after image data has been recorded.

FIG. 69A illustrates a display example of a result of the face detection under the detection conditions set during the photographing operation, and FIG. 69B illustrates a display example of a result of the face detection carried out after the image data has been recorded. Usually, there is more time during the image playback operation carried out after the image file has been recorded than during the photographing operation. Therefore, as shown in FIG. 69A, even if only a face F1 was detected from the image containing the face F1 and another face F2 by the face detection based on the detection conditions set during the photographing operation, the detection condition setting unit 366 can reset the detection conditions written during the photographing operation in the tag information of the image file being played back to, for example, detection conditions with wider detection range, so that the face F2 is detected during the playback operation after the image file has been recorded, as shown in FIG. 69B.

Figure 70:
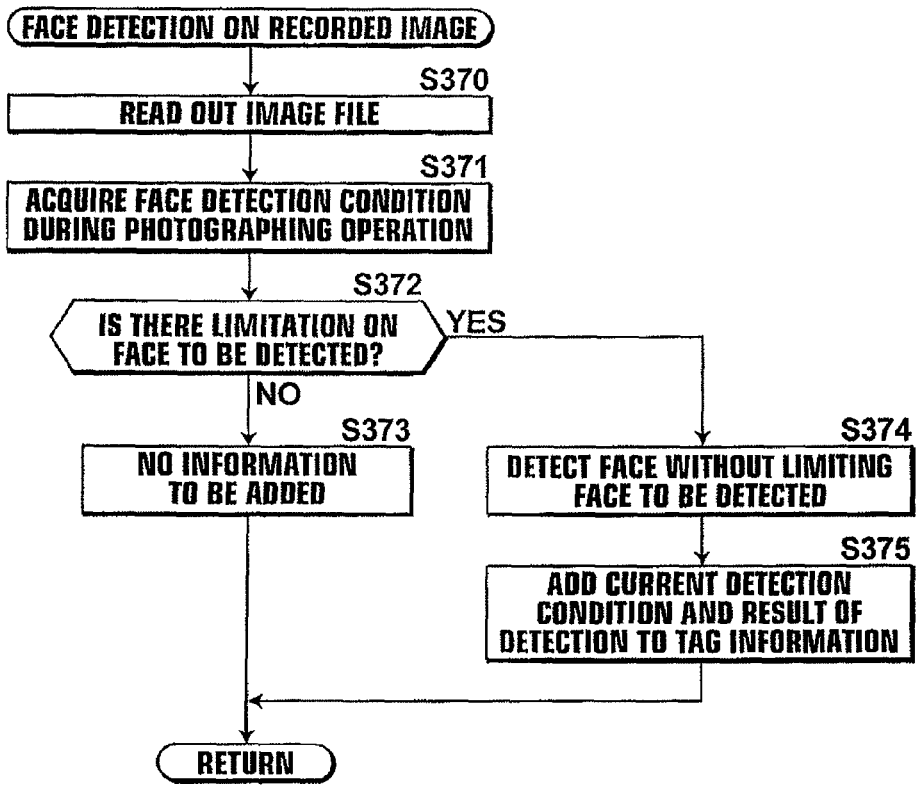
FIG. 70 is a flow chart of a face detection process that is carried out on the recorded image data.

FIG. 70 is a flow chart of a face detection process carried out on a recorded image data. As shown in FIG. 70, in the face detection after recording, the media controlling unit 69 reads out an image file stored in the external recording medium 70 (step S370).

Then, the detection condition setting unit 366 acquires the face detection conditions written in the tag information during the photographing operation (step S371), and determines whether or not there is any limitation on the face to be detected (step S372). If there is no limitation on the face to be detected (step S372: NO), this means that the face detection during the photographing operation was carried out under the detection conditions for detecting all the faces contained in the image, and therefore no information is added to the tag information (step S373).

In contrast, if there is a limitation on the face to be detected (step S372: YES), this means that the face detection during the photographing operation was carried out under the detection conditions limiting the face to be detected. Therefore, the detection condition setting unit 366 resets the detection conditions so as not to limit the face to be detected, i.e., to detect all the faces in the image, and the face detection unit 65 carries out the face detection on the image data being played back based on the reset detection conditions (step S374).

Then, the tag information writing unit 378 adds the reset detection conditions and the current result of the detection to the tag information (step S375).

Figure 71:
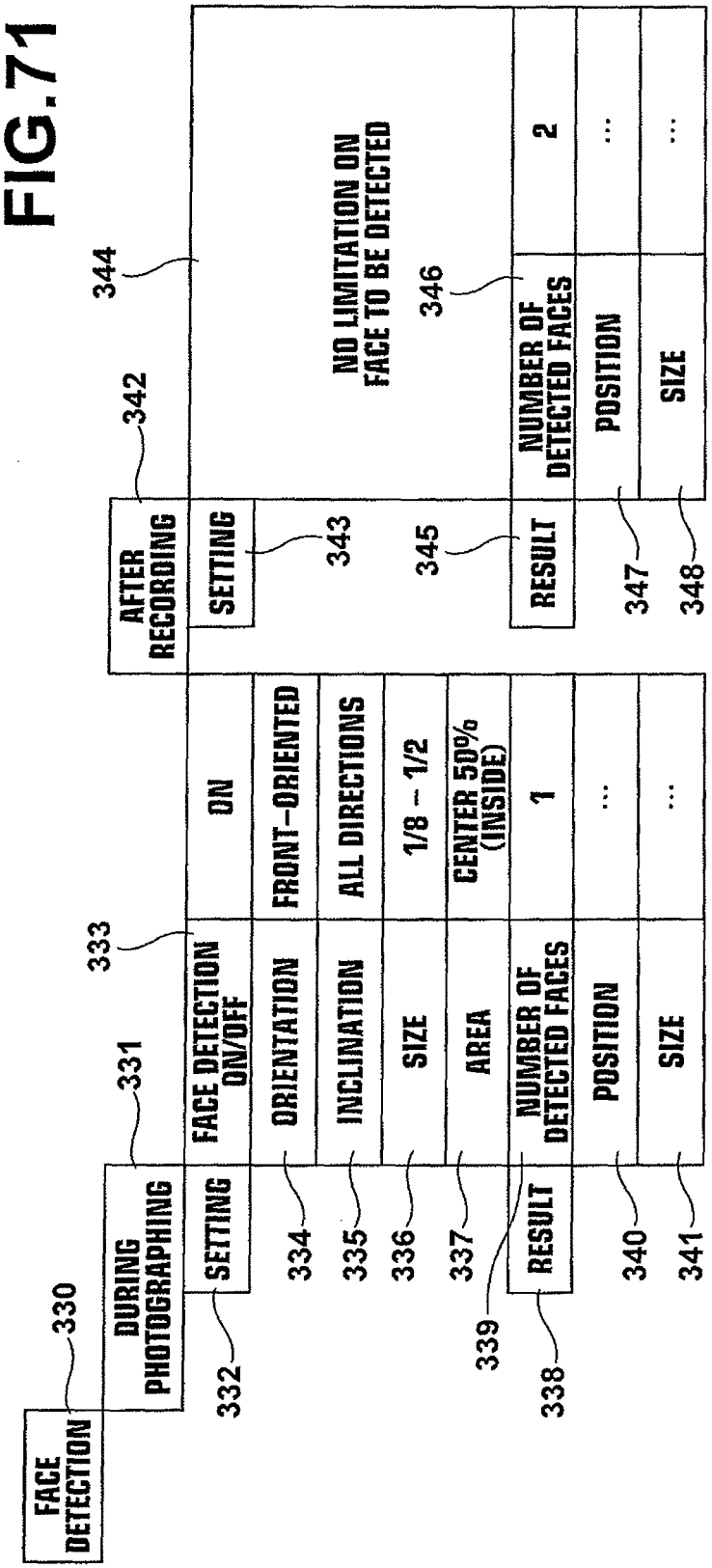
FIG. 71 illustrates one example of added tag information.

FIG. 71 illustrates one example of the added tag information. As shown in FIG. 71, for example, the tag information includes, with respect to a "face detection" item 330, items under "setting" 332 for "during photographing" 331 such as "face detection ON/OFF" 333, "orientation" 334, "inclination" 335, "size" 336 and "area" 337. In this example, the "face detection ON/OFF" 333 is "ON", the "orientation" 334 is "front-oriented", the "inclination" 335 is "all directions", the "size" 336 is "1/8-1/2", and the "area" 337 is "center 50% (inside)". The tag information further includes items for "result" 338 of the face detection such as "number of detected faces" 339, "position" 340 and "size" 341. In this example (the example of the result shown in FIG. 69A), the "number of detected faces" 339 is "1", the "position" 340 is "face F1[lower left (XL,YL) upper right (XR,YR)]" (not shown), which may be represented by coordinates with the origin set at the center of the screen, for example, and the "size" 341 is "face F1[1/3]" (not shown).

The added tag information includes, as "setting" 343 for "after recording" 342, "no limitation on face to be detected" 344, and as items for "result" 345 of the face detection, "number of detected faces" 346 being "2", "position" 347 being "face F1[lower left (XL1,YL1) upper right (XR1, YR1)], face F2[lower left (XL2,YL2) upper right (XR2, YR2)]" (not shown) and "size" 348 being "face F1[1/3], face F2[1/4]" (not shown). In this manner, the face detection after recording is carried out.

Although the tag information in this embodiment contains the face detection information obtained after recording added to the setting made and the face detection information (the result of the face detection) obtained during the photographing operation, as shown in FIG. 71, the tag information may be overwritten so that the latest face detection information such as the face detection information obtained after recording is retained.

Figure 72:
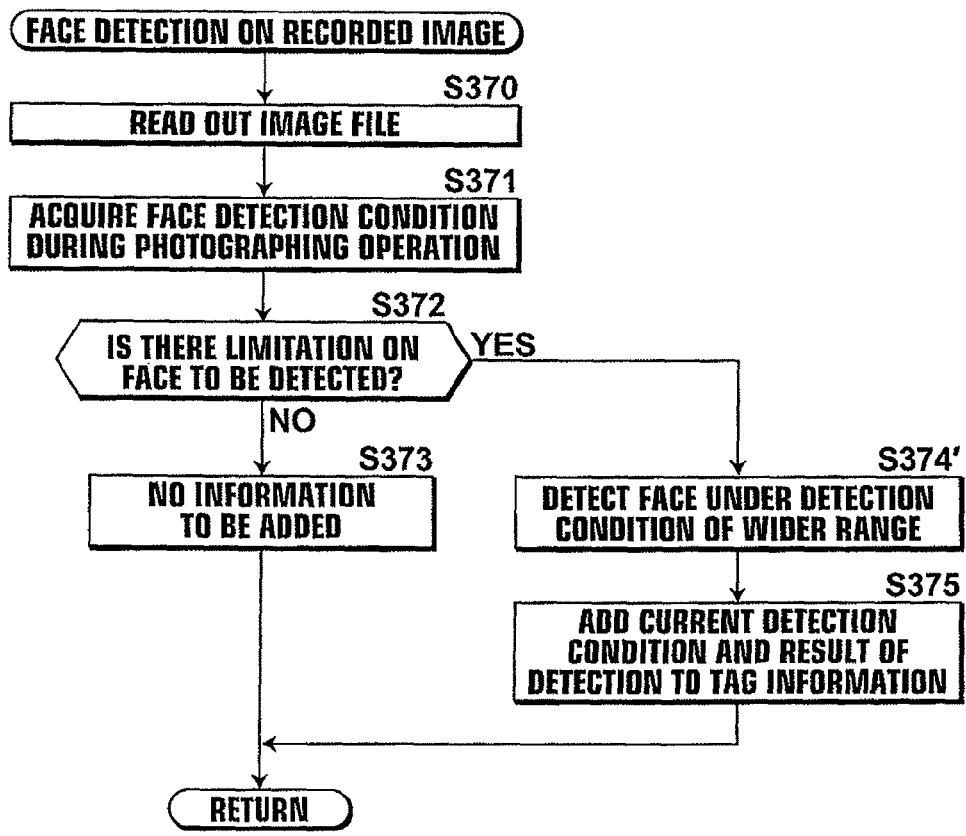
FIG. 72 is a flow chart of another face detection process that is carried out on the recorded image data.

FIG. 72 is a flow chart of another face detection process carried out on recorded image data. It should be noted that operations in the flow chart of FIG. 72 that are the same as those in the flow chart of FIG. 70 are designated by the same step numbers and are not described again here.

As shown in FIG. 72, in the face detection after recording, if it is determined in step S372 that there is a limitation on the face to be detected (step S372: YES), this means that the face detection during the photographing operation was carried out under the detection conditions limiting the face to be detected. Therefore, the detection condition setting unit 366 resets the detection conditions so that a face(s) (if any) which was not detected during the photographing operation is detected, and the face detection unit 65 carries out the face detection on the image data being played back based on the reset detection conditions (step S374').

In this manner, the face F2 (see FIG. 69B), which was not detected during the photographing operation, can be detected in addition to the face F1 which was detected during the photographing operation (see FIG. 69A), and the information of the face F2 can be added to the "result" 345 of the face detection (see FIG. 71) of the tag information.

By carrying out the face detection on the recorded image data with resetting the detection conditions as described above, a face(s) (if any) which was not detected during the photographing operation can be detected from the recorded image data. Thus, the result of the face detection can be used by an application for, for example, lightness correction or color correction to apply more appropriate image processing.

Although the detection condition setting unit 366 in this embodiment resets the detection conditions to widen the detection range from that of the detection conditions written in the tag information of the image file, this is not intended to limit the invention. The detection conditions may be reset to narrow the detection range. In this case, if an erroneous result of detection that was made during the photographing operation is found after the image data has been recorded, the erroneously detected face may possibly be excluded.

Figure 73:
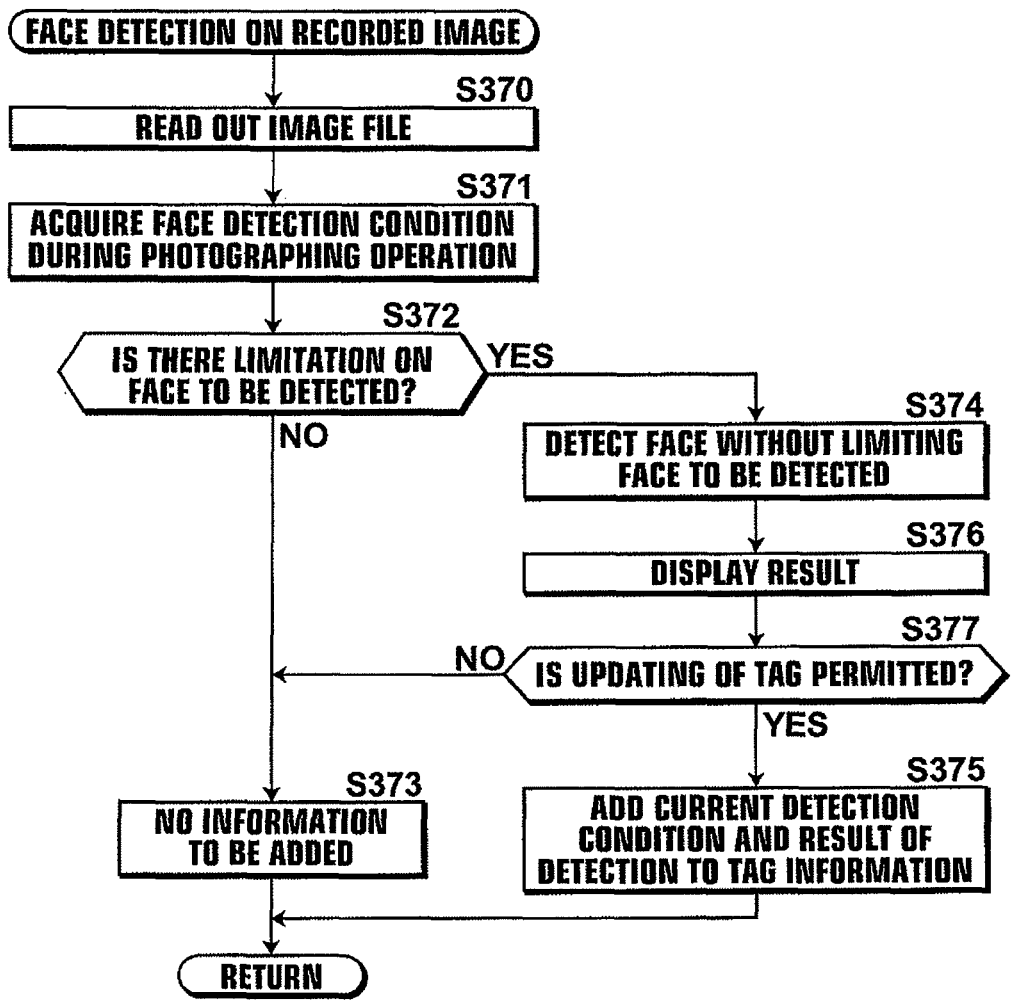
FIG. 73 is a flow chart of yet another face detection process that is carried out on the recorded image data.

FIG. 73 is a flow chart of yet another face detection process carried out on recorded image data. It should be noted that operations in the flow chart of FIG. 73 that are the same as those in the flow chart of FIG. 70 are designated by the same step numbers and are not described again here.

As shown in FIG. 73, in the face detection after recording, if it is determined in step S372 that there is a limitation on the face to be detected (step S372: YES), the detection condition setting unit 366 resets the detection conditions so as not to limit the face to be detected, and the face detection unit 65 carries out the face detection on the image data being played back based on the reset detection conditions (step S374). Thereafter, the CPU 75 displays the result of the face detection on the monitor 18 via the display controlling unit 71 (step S376).

Then, the CPU 75 determines whether or not updating of the tag information is permitted by the user (step S377). The permission by the user may be achieved such that, for example, an item to prompt the user to select whether or not to permit updating of the tag information is displayed on the monitor 18, and the user makes selection through manipulation of a suitable button and/or lever.

If the CPU 75 determines that updating of the tag information is permitted (step S377: YES), the tag information writing unit 378 adds the reset detection conditions and the current result of detection to the tag information (step S375).

In contrast, if it is determined that updating of the tag information is not permitted (step S377: NO), no information is added to the tag information (step S373).

In this case, if the result of the face detection carried out on the recorded image data is different from a result desired by the user, such that an erroneous result of detection, which was not detected in the face detection during the photographing operation, is newly introduced, the user can determine not to add the reset detection conditions and the result to the tag information.

By resetting the detection conditions, after the image file has been recorded, to detection conditions that are different from those used during the photographing operation through which the image file was acquired, and carrying out the face detection on the image data of the played back image file based on the reset detection conditions, as described above, a more appropriate result of the face detection can be obtained from the image data.

Next, a digital camera 300-5 according to a fifth embodiment of the third aspect of the invention will be described in detail. The functional configuration of the digital camera 300-5 of this embodiment is substantially the same as the functional configuration of the digital camera 300-4 of the above-described embodiment, and therefore is not shown in the drawing.

Figure 74:
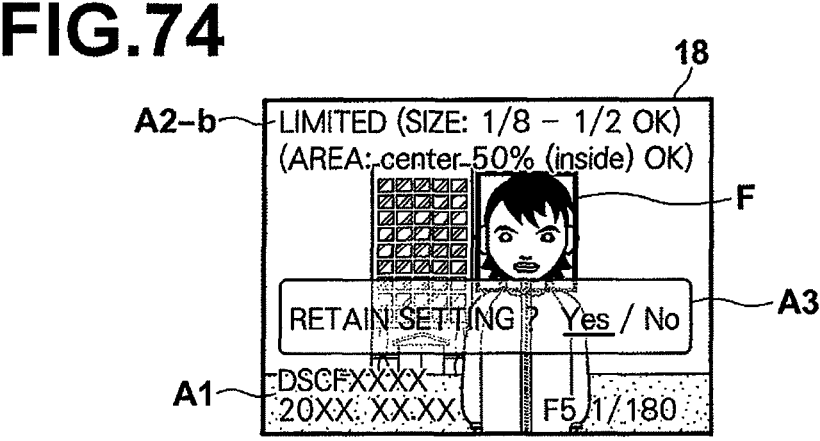
FIG. 74 illustrates a display example of an image file being played back.
Figure 75:
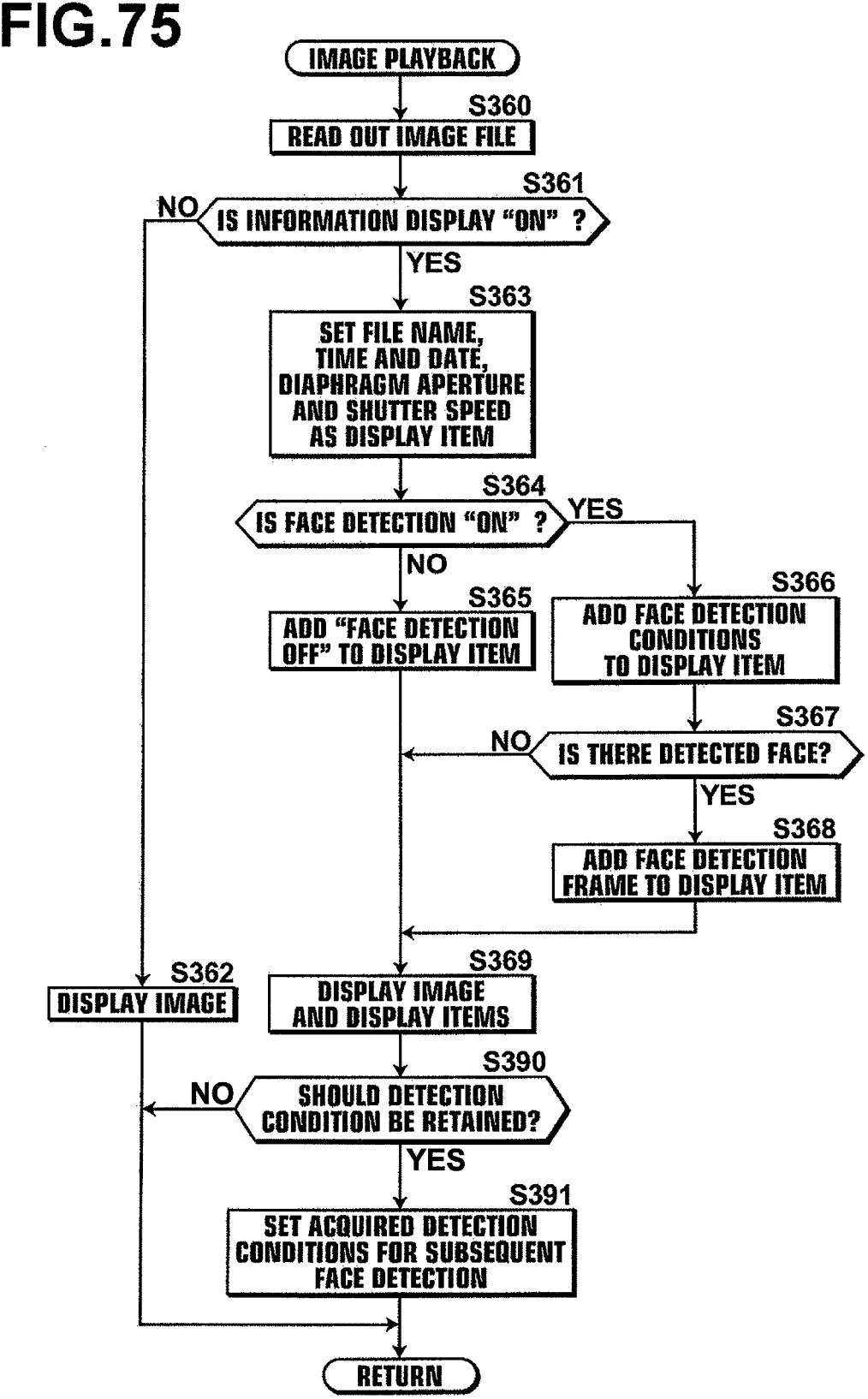
FIG. 75 is a flow chart of another image playback process.

In the digital camera 300-5 of this embodiment, the detection condition setting unit 366 can acquire the detection conditions written in the tag information of the image file and retain the acquired detection conditions, and the face detection unit 65 carries out the face detection based on the retained detection conditions. FIG. 74 illustrates a display example of the image file being played back, and FIG. 75 is a flow chart of an image playback process according to this embodiment. It should be noted that operations in the flow chart of FIG. 75 that are the same as those in the flow chart of FIG. 68 are designated by the same step numbers and are not described again here.

As shown in FIG. 75, in the image playback process carried out in the digital camera 300-5, if it is determined in step S364 that "ON" is set for the face detection (step S364: YES), the tag information display controlling unit 379 displays, on the monitor 18, the image, the display items A1 and A2-b including the detection conditions written in the tag information, and, if a face has been detected, the detection frame F, which is another display item, as shown in FIG. 74 (step S369). Further, an item A3 to prompt the user to select whether or not the detection conditions written in the tag information should be retained is displayed on the monitor 18.

Then, the CPU 75 determines whether or not the user has selected to retain the detection conditions (step S390). If the user has selected to retain the detection conditions (step S390: YES), the detection condition setting unit 366 reads out and acquires the detection conditions written in the tag information and retains the acquired detection conditions to set them as the detection conditions to be used for subsequent face detection operations (step S391).

In contrast, if the user has selected not to retain the detection conditions (step S390: NO), detection conditions according to a default setting, for example, are set, and the process ends.

As described above, when an image file is played back, the detection conditions and the detection frame F as the result of the face detection during the photographing operation, through which the image file was acquired, are displayed on the monitor 18, and the user checks whether a desired result of the face detection is obtained under the detection conditions displayed on the monitor 18. If the desired result is obtained, the user can determine to retain the detection conditions so that these detection conditions are applied to the subsequent face detection operations. Thus, the face detection unit 65 can stably carry out the face detection in a manner desired by the user.

The retained detection conditions may be used for the face detection carried out by the face detection unit 65 on image data acquired by the CCD 58, such as the live view, during a next photographing operation, or may be used for the face detection carried out on played back image data after the image data has been recorded in the external recording medium 70 or the internal memory (not shown).

By retaining the detection conditions which are confirmed by the user as providing a desired result in this manner in the case where the user can set the detection conditions individually via the detection condition setting unit 366, the face detection unit 65 can stably carry out the face detection in a manner desired by the user.

It should be understood that the photographing apparatus of the invention is not limited to the digital cameras of the above-described embodiments, and design changes may be made, as appropriate, without departing from the spirit and scope of the invention.

According to one aspect of the photographing apparatus of the invention, the user is allowed to arbitrarily set the detection condition for the object detection unit. Therefore, the user can set the detection condition for the object detection unit by himself or herself so that the object detection unit detects an object intended by the user. Thus, a balance between the detection rate and the detection speed of the object detection can be set as desired by the user. Therefore, in a case where it is known in advance that only faces having large sizes are photographed, for example, the object detection may be carried out under the detection condition which is set so as not to detect faces having small sizes. In this manner, unnecessary face detection operations can be avoided, thereby preventing erroneous detection and shortening the processing time.

According to another aspect of the photographing apparatus of the invention, the user is allowed to set the detection condition for the object detection unit by selecting one of the detection rate-priority and the detection speed-priority. Thus, user can set the detection condition simply by selecting one of the "detection rate-priority" and the "detection speed-priority", which explicitly tell the effect achieved by the detection condition being set. Therefore, such a situation that the user is confused about the effect of the setting when the user widens or narrows the range of the face to be detected can be avoided, and the user can easily set the detection condition depending on the scene to be photographed with a desired balance between the detection rate and the detection speed.

According to yet another aspect of the photographing apparatus of the invention, the user is allowed to set the detection condition for the object detection unit by selecting one of levels set in a stepwise fashion between detection rate-priority and detection speed-priority, the levels including maximum levels of the detection rate-priority and the detection speed-priority. Thus, the user can set the detection condition by simply selecting one of the levels set in a stepwise fashion between detection rate-priority and detection speed-priority, which explicitly tell the effect achieved by the detection condition being set. Therefore, such a situation that the user is confused about the effect of the setting when the user widens or narrows the range of the face to be detected can be avoided, and the user can easily set the detection condition depending on the scene to be photographed with a desired balance between the detection rate and the detection speed.

Thus, the user can simply select the "detection speed-priority" to photograph an active scene, such as an athletic meet, to increase the speed of the face detection, or can simply select the "detection rate-priority" to photograph, for example, a group photo to increase the rate of the face detection.

According to still another aspect of the photographing apparatus of the invention, the detection condition for the object detection unit is allowed to be set according to a photographing mode. Therefore, the detection condition can be set for each photographing mode with an appropriate balance between the detection rate and the detection speed.

For example, by setting the detection condition to put a priority on the detection speed to increase the detection speed for the sports mode that may be selected to photograph an active scene such as an athletic meet, the time taken for the face detection can be shortened to improve followability. In contrast, by setting the detection condition to put a priority on the detection rate to increase the detection rate for the person mode that may be selected to take a group photo, for example, all the faces in the image can be detected, thereby improving accuracy of the detection.

What is claimed is:

1. A photographing apparatus comprising:
    an imaging unit to photograph a subject to acquire image data;
    an object detection unit to detect a predetermined object from the image data; and
    a detection condition setting unit to allow a detection condition for the object detection unit to be set according to a photographing mode that is selected from a plurality of preexisting photographing modes,
    wherein
    the detection condition limits at least one of an orientation of the object, a size of the object, an inclination of the object and a detection area,
    said plurality of preexisting photographing modes include two or more modes from among:
        a person mode,
        a sports mode,
        a party mode,
        a landscape mode, and
        a night-scene mode, and
    the selected photographing mode is selected from said plurality of preexisting photographing modes, and
    the detection condition setting unit sets the detection condition by selecting, for each selected photographing mode from said plurality of preexisting photographing modes, one of:
        a detection rate-priority,
        a detection speed-priority, and
        a detection-off in which said detection rate-priority and said detection speed-priority are unselected, and
    wherein the detection condition setting unit sets the detection condition before the photographing apparatus photographs the subject.

2. The photographing apparatus as claimed in claim 1, further comprising a detection condition displaying unit to display the detection condition set via the detection condition setting unit.

3. The photographing apparatus as claimed in claim 2, wherein the detection condition displaying unit displays a pictorial display of the detection condition.

4. The photographing apparatus as claimed in claim 2, wherein the detection condition displaying unit displays the detection condition during a photographing operation carried out by the imaging unit.

5. The photographing apparatus as claimed in claim 1, further comprising:
a recording unit to record an image file generated from the image data in an external recording medium or an internal memory; and
a tag information writing unit to write the detection condition in tag information of the image file when the image file is recorded.

6. The photographing apparatus as claimed in claim 5, further comprising:
a displaying unit;
a display controlling unit to display, on the displaying unit, the image file recorded in the external recording medium or the internal memory; and
a tag information display controlling unit to display, on the displaying unit, the detection condition written in the tag information of the image file when the image file is displayed on the displaying unit.

7. The photographing apparatus as claimed in claim 5, wherein
the detection condition setting unit is able to reset the detection condition written in the tag information of the image file to a different detection condition, and
the object detection unit carries out the detection on image data of the image file recorded in the external recording medium or the internal memory based on the detection condition reset by the detection condition setting unit.

8. The photographing apparatus as claimed in claim 7, wherein a detection range of the different detection condition is wider than a detection range of the detection condition written in the tag information of the image file.

9. The photographing apparatus as claimed in claim 7, wherein a detection range of the different detection condition is narrower than a detection range of the detection condition written in the tag information of the image file.

10. The photographing apparatus as claimed in claim 5, wherein
the detection condition setting unit is able to acquire the detection condition written in the tag information of the image file and retain the acquired detection condition, and
the object detection unit carries out the detection based on the retained detection condition.

11. The photographing apparatus as claimed in claim 10, wherein the detection based on the retained detection condition is carried out on the image data acquired by the imaging unit.

12. The photographing apparatus as claimed in claim 10, wherein the detection based on the retained detection condition is carried out on image data of the image file recorded in the external recording medium or the internal memory.

13. The photographing apparatus as claimed in claim 1, wherein
said plurality of preexisting photographing modes include the sports mode, the party mode, the landscape mode, and the night-scene mode, and
the selected photographing mode is selected to be one of:
the sports mode,
the party mode,
the landscape mode, and
the night-scene mode.

14. The photographing apparatus as claimed in claim 1, wherein each photographing mode is associated with a separate detection condition that selects a predetermined combination of the detection rate-priority, the detection speed-priority and the detection-off.

15. A photographing apparatus comprising:
an imaging unit to photograph a subject to acquire image data;
an object detection unit to detect a predetermined object from the image data; and
a detection condition setting unit to allow a detection condition for the object detection unit to be set according to a photographing mode that is selected from a plurality of preexisting photographing modes,
wherein
the detection condition limits at least one of an orientation of the object, a size of the object, an inclination of the object and a detection area,
said plurality of preexisting photographing modes include two or more modes from among:
a person mode,
a sports mode,
a party mode,
a landscape mode and
a night-scene mode, and
the selected photographing mode is selected from said plurality of preexisting photographing modes, and
the detection condition setting unit sets the detection condition by selecting, for each selected photographing mode from said plurality of preexisting photographing modes, one of a plurality of levels set in a stepwise fashion between a detection rate-priority and a detection speed-priority, the plurality of levels including:
maximum levels of the detection rate-priority and the detection speed-priority, and
one or more intermediate levels between said maximum levels, wherein each of said one or more intermediate levels sets a detection condition that is a mixture of the detection rate-priority and the detection speed-priority, and
wherein the detection condition setting unit sets the detection condition before the photographing apparatus photographs the subject.

16. The photographing apparatus as claimed in claim 15, further comprising a detection condition displaying unit to display the detection condition set via the detection condition setting unit.

17. The photographing apparatus as claimed in claim 16, wherein the detection condition displaying unit displays a pictorial display of the detection condition.

18. The photographing apparatus as claimed in claim 16, wherein the detection condition displaying unit displays the detection condition during a photographing operation carried out by the imaging unit.

19. The photographing apparatus as claimed in claim 15, further comprising:
a recording unit to record an image file generated from the image data in an external recording medium or an internal memory; and
a tag information writing unit to write the detection condition in tag information of the image file when the image file is recorded.

20. The photographing apparatus as claimed in claim 19, wherein
the detection condition setting unit is able to reset the detection condition written in the tag information of the image file to a different detection condition, and
the object detection unit carries out the detection on image data of the image file recorded in the external recording medium or the internal memory based on the detection condition reset by the detection condition setting unit.

21. The photographing apparatus as claimed in claim 19, wherein the detection condition setting unit is able to acquire the detection condition written in the tag information of the image file and retain the acquired detection condition, and the object detection unit carries out the detection based on the retained detection condition.

22. The photographing apparatus as claimed in claim 15, wherein said plurality of preexisting photographing modes include the sports mode, the party mode, the landscape mode, and the night-scene mode, and the selected photographing mode is selected to be one of:
the sports mode,
the party mode,
the landscape mode, and
the night-scene mode.

* * * * *